United States Patent
Nakamura et al.

(10) Patent No.: US 9,350,626 B2
(45) Date of Patent: May 24, 2016

(54) COMMUNICATION MANAGEMENT APPARATUS, COMMUNICATION NODE, AND COMMUNICATION SYSTEM, AND DATA COMMUNICATION METHOD

(75) Inventors: Masato Nakamura, Chiyoda-ku (JP); Tatsumi Yabusaki, Nagoya (JP); Tomitsugu Sugimoto, Nagoya (JP)

(73) Assignee: MITSUBISHI ELECTRIC CORP., Tokyo (JP)

( * ) Notice: Subject to any disclaimer, the term of this patent is extended or adjusted under 35 U.S.C. 154(b) by 419 days.

(21) Appl. No.: 13/334,863

(22) Filed: Dec. 22, 2011

(65) Prior Publication Data
US 2012/0099480 A1  Apr. 26, 2012

Related U.S. Application Data

(63) Continuation of application No. 13/142,192, filed as application No. PCT/JP2008/073631 on Dec. 25, 2008.

(51) Int. Cl.
*H04L 12/26* (2006.01)
*H04L 12/42* (2006.01)
(Continued)

(52) U.S. Cl.
CPC ............ *H04L 43/00* (2013.01); *H04L 12/2602* (2013.01); *H04L 12/4035* (2013.01);
(Continued)

(58) Field of Classification Search
CPC ......... H04L 45/02; H04L 45/48; H04L 45/28; H04L 45/18; H04L 41/12; H04L 12/44; H04L 12/462; H04L 45/12; H04L 45/745; H04L 12/2801; H04L 12/4641; H04L 47/829; H04L 409/201; H04L 45/34; G06F 17/30625

USPC ......... 370/449, 450, 451, 452, 459, 460, 403, 370/407, 408; 709/208, 251, 252, 253
See application file for complete search history.

(56) References Cited

U.S. PATENT DOCUMENTS 5,210,632 A    5/1993 Murakami et al.
5,379,291 A *  1/1995 Herzberg et al. ............. 370/404
(Continued)

FOREIGN PATENT DOCUMENTS

CN    1617520 A    5/2005
JP    2-119341 A    5/1990
(Continued)

OTHER PUBLICATIONS

Osamu Ishida, et al., "Impress Standard Textbook Series Revised Edition 10 Gigabit Ethernet Textbook", Kabushiki Kaisha Impress Net work Business Company, Apr. 11, 2005, pp. 40-53.
(Continued)

*Primary Examiner* — Yee Lam
(74) *Attorney, Agent, or Firm* — Sughrue Mion, PLLC; Richard C. Turner

(57) ABSTRACT

The communication management apparatus includes a network-presence-check processing unit that performs network presence check processing for generating network presence information, a token-circulation-order determining unit that determines token circulation order using the network presence information, a setup processing unit that notifies each of communication nodes in the network of token circulation destination information, a token-frame processing unit that, after transmission of a data frame by a data-frame-communication processing unit, transmits, based on the token circulation order, a token frame including information concerning a transmission right acquiring apparatus that acquires a transmission right next and determines whether the transmission right acquiring apparatus of the transmission right acquiring apparatus information of the received token frame is the own apparatus, and the data-frame-communication processing unit that performs transmission and reception processing for a data frame for acquiring the transmission right.

13 Claims, 65 Drawing Sheets

(51) Int. Cl.
*H04L 12/417* (2006.01)
*H04L 12/433* (2006.01)
*H04L 12/403* (2006.01)
*H04L 12/24* (2006.01)

(52) U.S. Cl.
CPC .............. *H04L12/417* (2013.01); *H04L 12/42* (2013.01); *H04L 12/433* (2013.01); *H04L 41/08* (2013.01); *H04L 41/0806* (2013.01)

(56) References Cited

U.S. PATENT DOCUMENTS

| | | | | |
|---|---|---|---|---|
| 5,606,669 | A | * | 2/1997 | Bertin et al. ................... 709/223 |
| 5,734,824 | A | * | 3/1998 | Choi .............................. 709/224 |
| 6,047,331 | A | * | 4/2000 | Medard et al. ................ 709/239 |
| 6,269,080 | B1 | * | 7/2001 | Kumar .................. H04L 1/1614 370/236 |
| 7,218,663 | B1 | * | 5/2007 | Yokota et al. ................. 375/130 |
| 7,965,727 | B2 | * | 6/2011 | Sakata .................... H04H 20/82 370/236 |
| 2002/0112065 | A1 | * | 8/2002 | Denecheau et al. .......... 709/230 |
| 2007/0053299 | A1 | | 3/2007 | Khan et al. |
| 2007/0211681 | A1 | * | 9/2007 | Sun et al. ...................... 370/338 |
| 2007/0268913 | A1 | * | 11/2007 | Denecheau et al. .......... 370/397 |
| 2008/0222235 | A1 | * | 9/2008 | Hurst et al. ................... 709/201 |
| 2010/0097969 | A1 | * | 4/2010 | De Kimpe et al. ............ 370/311 |

FOREIGN PATENT DOCUMENTS

| | | |
|---|---|---|
| JP | 3-72747 A | 3/1991 |
| JP | 2005-39783 A | 2/2005 |
| JP | 2005-39783 A | 2/2005 |
| JP | 2007-074011 | 3/2007 |

OTHER PUBLICATIONS

Japanese Office Action issued May 25, 2012 in corresponding Japanese Patent Application No. 2011-139192.
Office Action dated Feb. 24, 2014, issued in corresponding U.S. Appl. No. 13/142,192.
Office Action date Aug. 11, 2014 issued by the United States Patent and Trademark Office in counterpart U.S. Appl. No. 13/142,192.
Communication from the Taiwan Intellectual Property Office issued Aug. 6, 2014 in a counterpart Taiwanese Patent Application No. 101108048.

* cited by examiner

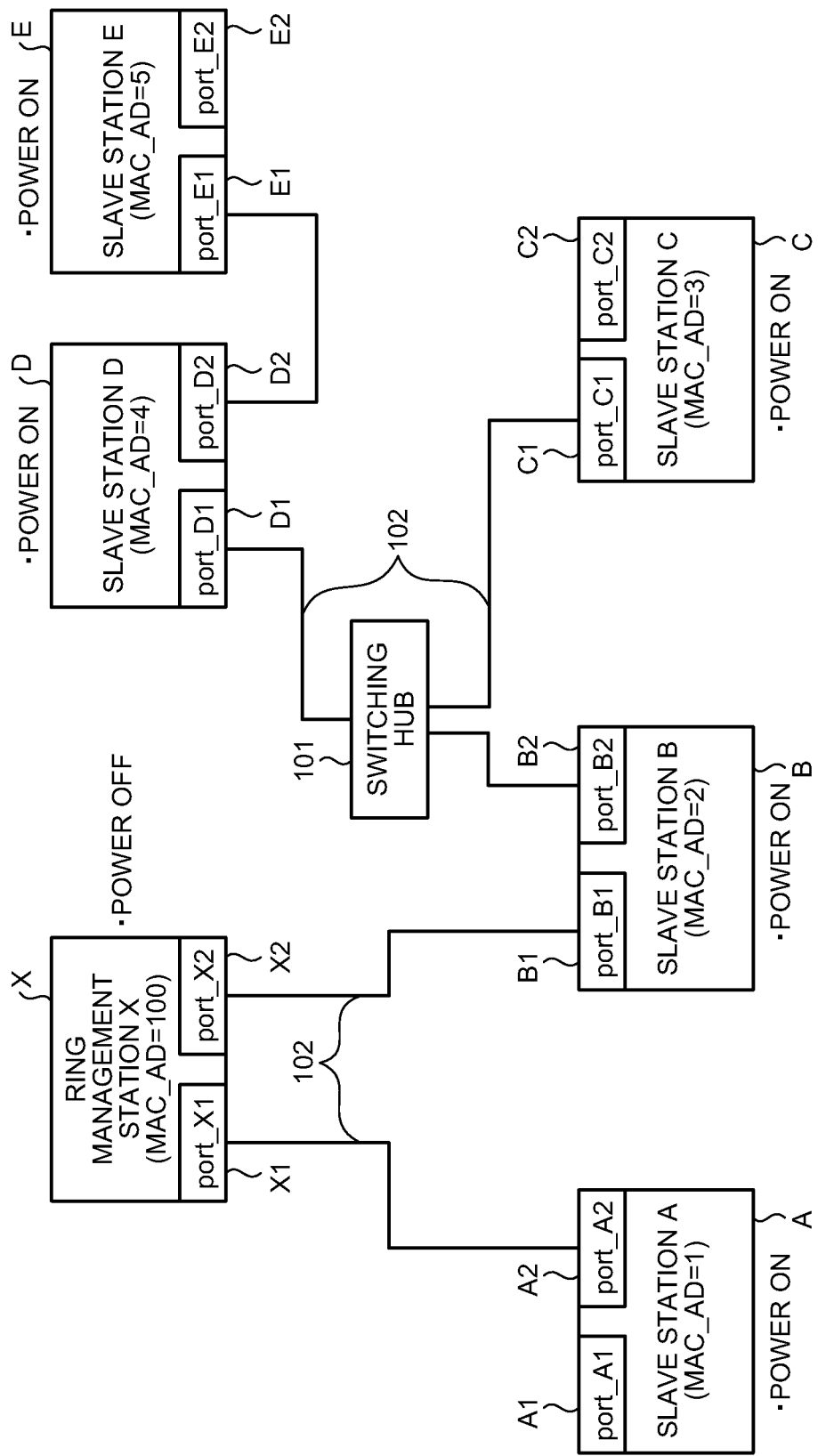

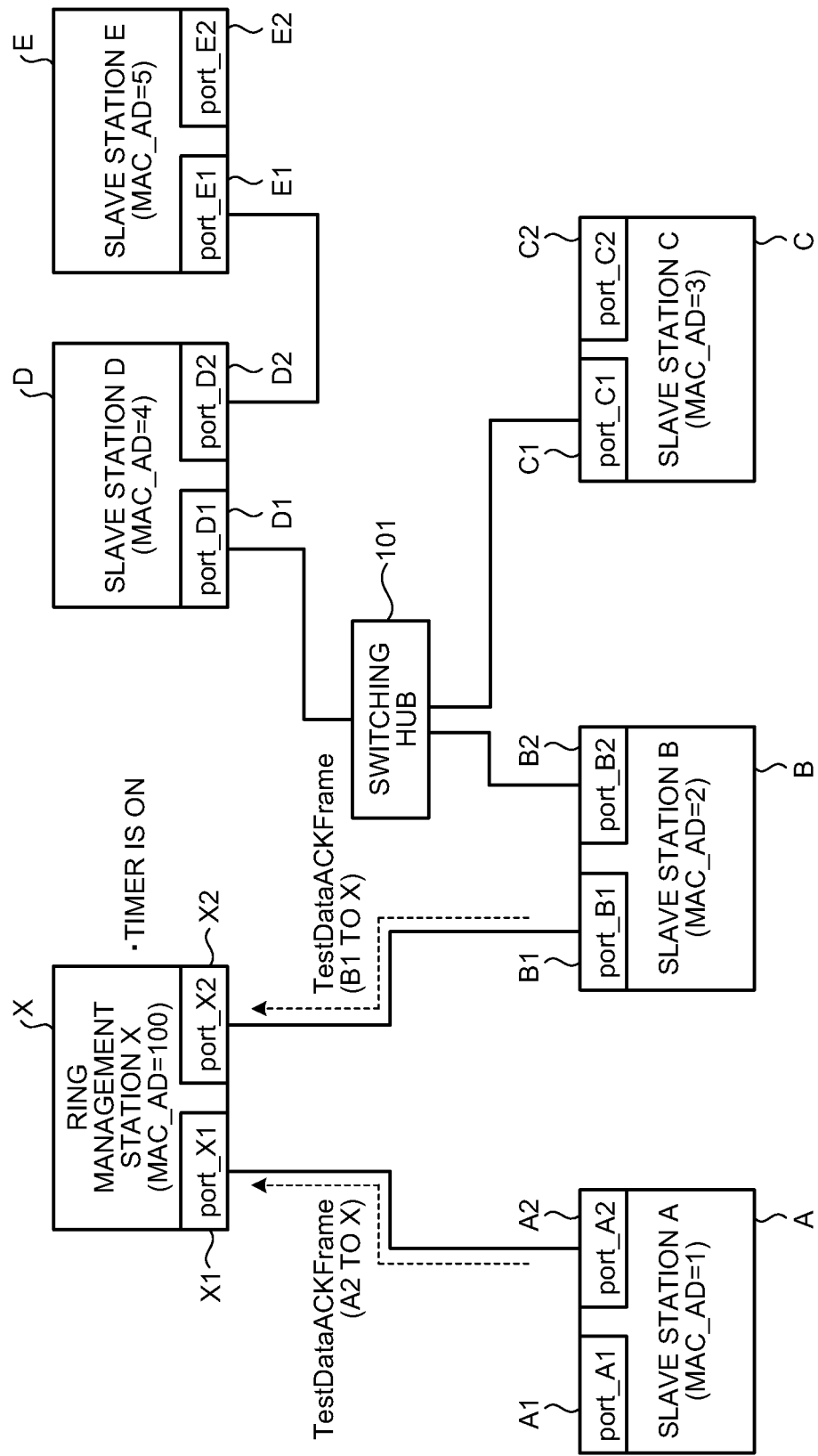

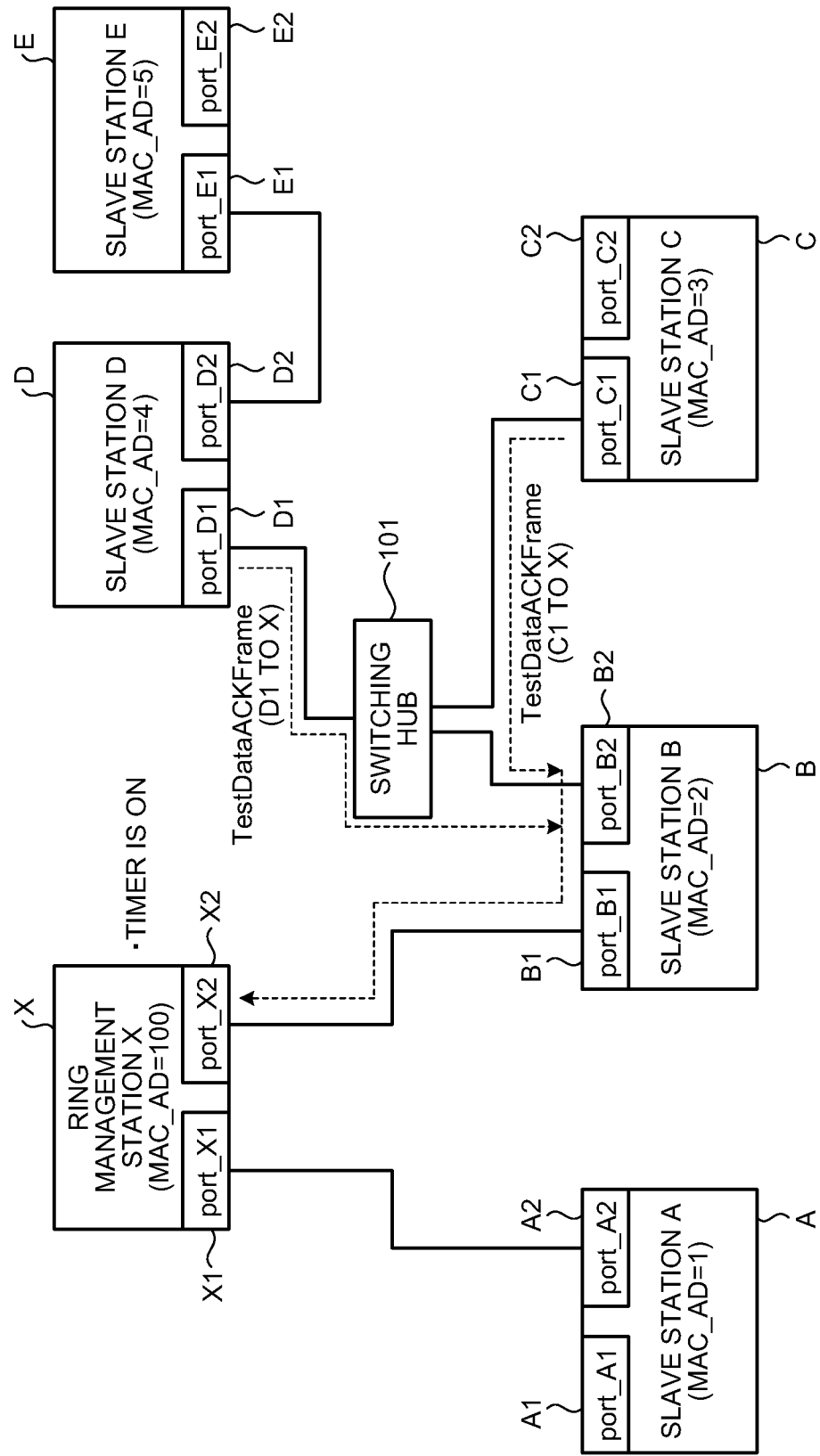

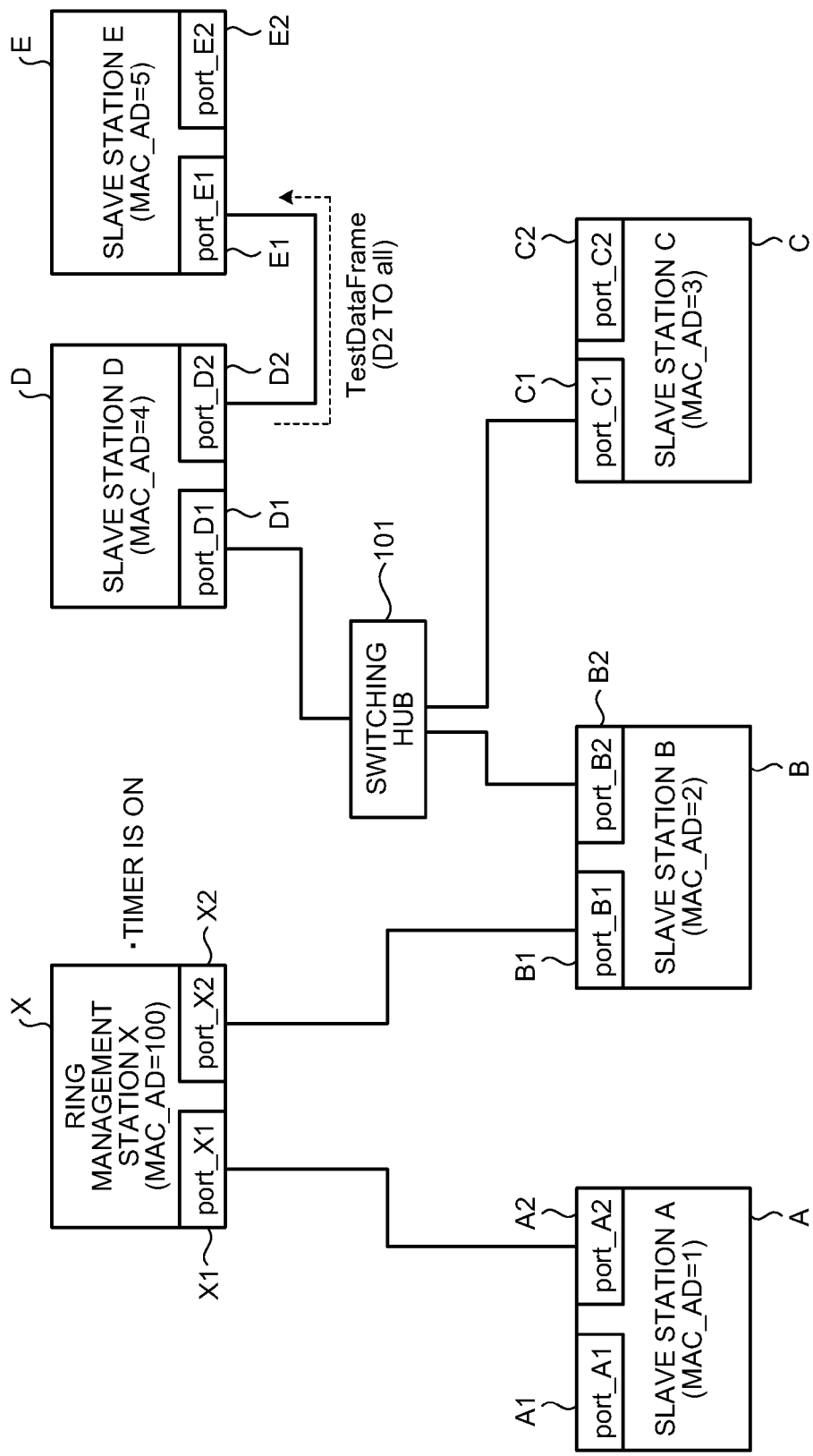

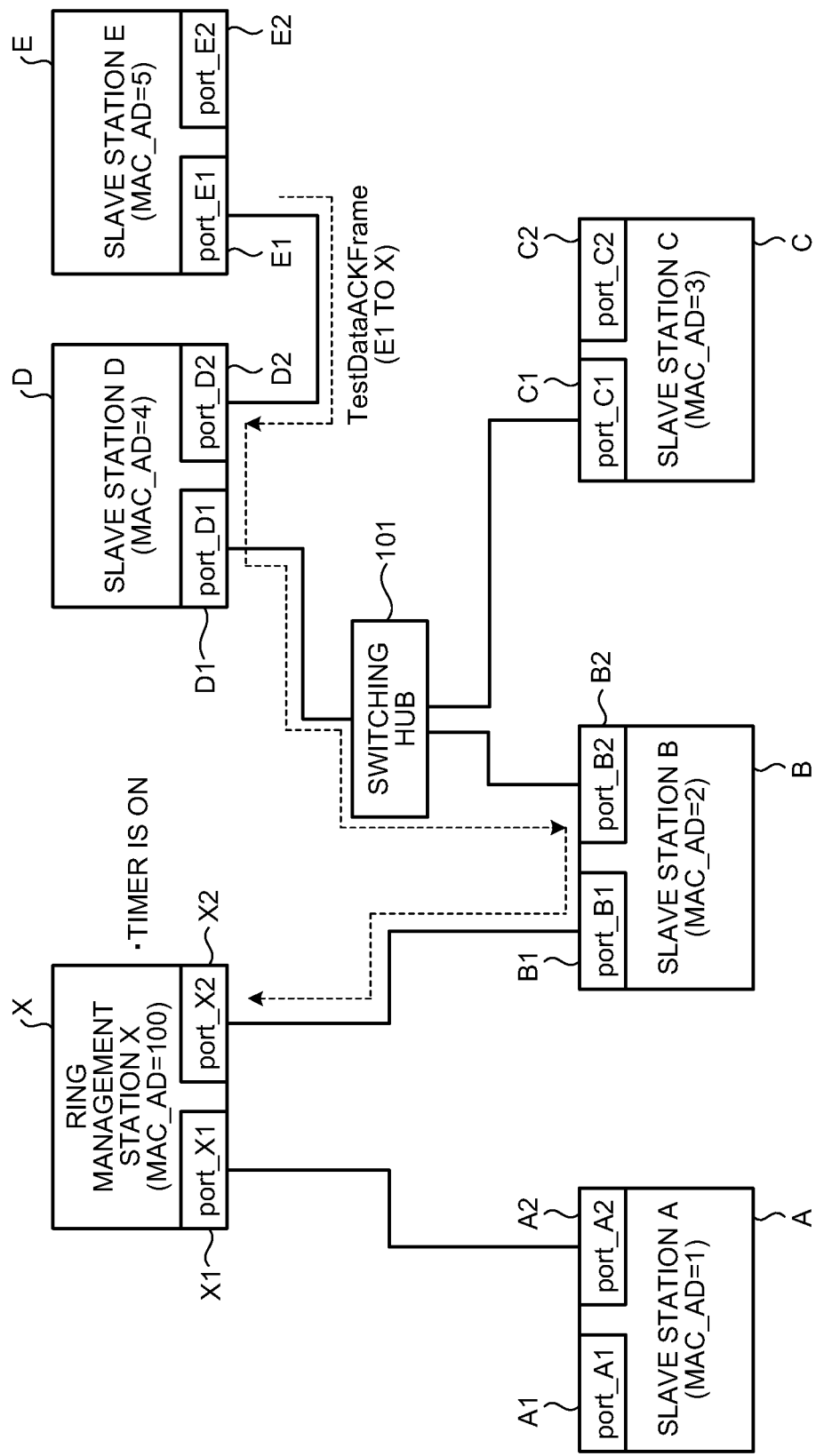

FIG.5-1

| NETWORK PRESENCE CHECK FRAME | DA | SA | type | FRAME IDENTIFI-CATION INFORMATION | MAC ADDRESS OF RING MANAGEMENT STATION | TRANSMISSION PORT INFORMATION OF NETWORK PRESENCE CHECK FRAME OF OWN STATION |
|---|---|---|---|---|---|---|
| TestDataFrame (X1 TO all) | F | 100 | ** | TestData | 100 | port_X1 |
| TestDataFrame (X2 TO all) | F | 100 | ** | TestData | 100 | port_X2 |

FIG.5-2

| NETWORK PRESENCE CHECK FRAME | DA | SA | type | FRAME IDENTIFI-CATION INFORMATION | SA INFORMATION IN RECEIVED NETWORK PRESENCE CHECK FRAME | PORT INFORMATION OF STATION THAT TRANSMITS NETWORK PRESENCE CHECK FRAME |
|---|---|---|---|---|---|---|
| TestDataACKFrame (A2 TO X) | 100 | 1 | ** | TestDataACK | 100 | port_X1 |
| TestDataACKFrame (B1 TO X) | 100 | 2 | ** | TestDataACK | 100 | port_X2 |

FIG.5-3

| NETWORK PRESENCE CHECK FRAME | DA | SA | type | FRAME IDENTIFI-CATION INFORMATION | MAC ADDRESS OF RING MANAGEMENT STATION | TRANSMISSION PORT INFORMATION OF NETWORK PRESENCE CHECK FRAME OF OWN STATION |
|---|---|---|---|---|---|---|
| TestDataFrame (B2 TO all) | F | 2 | ** | TestData | 100 | port_B2 |

FIG.5-4

| NETWORK PRESENCE CHECK FRAME | DA | SA | type | FRAME IDENTIFI- CATION INFORMATION | SA INFORMATION IN RECEIVED NETWORK PRESENCE CHECK FRAME | PORT INFORMATION OF STATION THAT TRANSMITS NETWORK PRESENCE CHECK FRAME |
|---|---|---|---|---|---|---|
| TestDataACKFrame (C1 TO X) | 100 | 3 | ** | TestDataACK | 2 | port_B2 |
| TestDataACKFrame (D1 TO X) | 100 | 4 | ** | TestDataACK | 2 | port_B2 |

FIG.5-5

| NETWORK PRESENCE CHECK FRAME | DA | SA | type | FRAME IDENTIFI- CATION INFORMATION | MAC ADDRESS OF RING MANAGEMENT STATION | TRANSMISSION PORT INFORMATION OF NETWORK PRESENCE CHECK FRAME OF OWN STATION |
|---|---|---|---|---|---|---|
| TestDataFrame (D2 TO all) | F | 4 | ** | TestData | 100 | port_D2 |

FIG.5-6

| NETWORK PRESENCE ACKNOWLEDGE FRAME | DA | SA | type | FRAME IDENTIFI- CATION INFORMATION | SA INFORMATION IN RECEIVED NETWORK PRESENCE CHECK FRAME | PORT INFORMATION OF STATION THAT TRANSMITS NETWORK PRESENCE CHECK FRAME |
|---|---|---|---|---|---|---|
| TestDataACKFrame (E1 TO X) | 100 | 5 | ** | TestDataACK | 4 | port_D2 |

FIG.5-7

| SETUP FRAME | DA | SA | type | FRAME IDENTIFICATION INFORMATION | TOKEN FRAME DESTINATION MAC ADDRESS SETTING INFORMATION |
|---|---|---|---|---|---|
| SetupFrame (X TO B) | 2 | 100 | ** | Setup | 3 |
| SetupFrame (X TO C) | 3 | 100 | ** | Setup | 4 |
| SetupFrame (X TO D) | 4 | 100 | ** | Setup | 5 |
| SetupFrame (X TO E) | 5 | 100 | ** | Setup | 1 |
| SetupFrame (X TO A) | 1 | 100 | ** | Setup | 100 |

FIG.5-8

| SETUP RESPONSE FRAME | DA | SA | type | FRAME IDENTIFICATION INFORMATION |
|---|---|---|---|---|
| SetupACKFrame (A TO X) | 100 | 1 | ** | SetupACK |
| SetupACKFrame (B TO X) | 100 | 2 | ** | SetupACK |
| SetupACKFrame (C TO X) | 100 | 3 | ** | SetupACK |
| SetupACKFrame (D TO X) | 100 | 4 | ** | SetupACK |
| SetupACKFrame (E TO X) | 100 | 5 | ** | SetupACK |

FIG.5-9

| TOKEN FRAME | DA | SA | type | FRAME IDENTIFICATION INFORMATION | MAC ADDRESS INFORMATION FOR TOKEN-ADDRESSED-TO-OWN-STATION DETERMINATION |
|---|---|---|---|---|---|
| TokenFrame (X TO B) | F | 100 | ** | token | 2 |
| TokenFrame (B TO C) | F | 2 | ** | token | 3 |
| TokenFrame (C TO D) | F | 3 | ** | token | 4 |
| TokenFrame (D TO E) | F | 4 | ** | token | 5 |
| TokenFrame (E TO A) | F | 5 | ** | token | 1 |
| TokenFrame (A TO X) | F | 1 | ** | token | 100 |

FIG.6

| SA | SA INFORMATION IN RECEIVED NETWORK PRESENCE CHECK FRAME | PORT INFORMATION OF STATION THAT TRANSMITS NETWORK PRESENCE CHECK FRAME | |
|---|---|---|---|
| 1 | 100 | port_X1 | 301 |
| 2 | 100 | port_X2 | 302 |
| 3 | 2 | port_B2 | 303 |
| 4 | 2 | port_B2 | 304 |
| 5 | 4 | port_D2 | 305 |

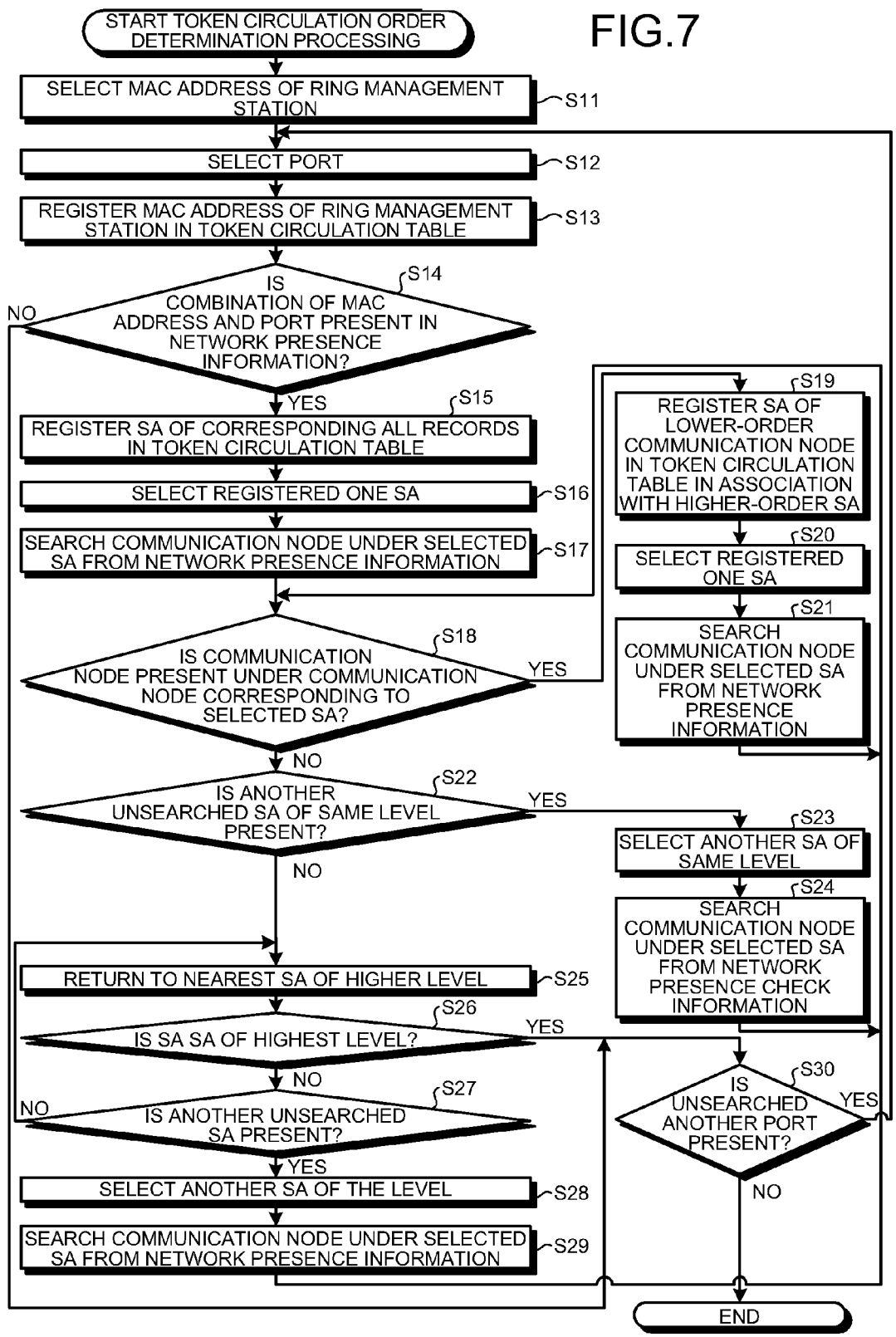

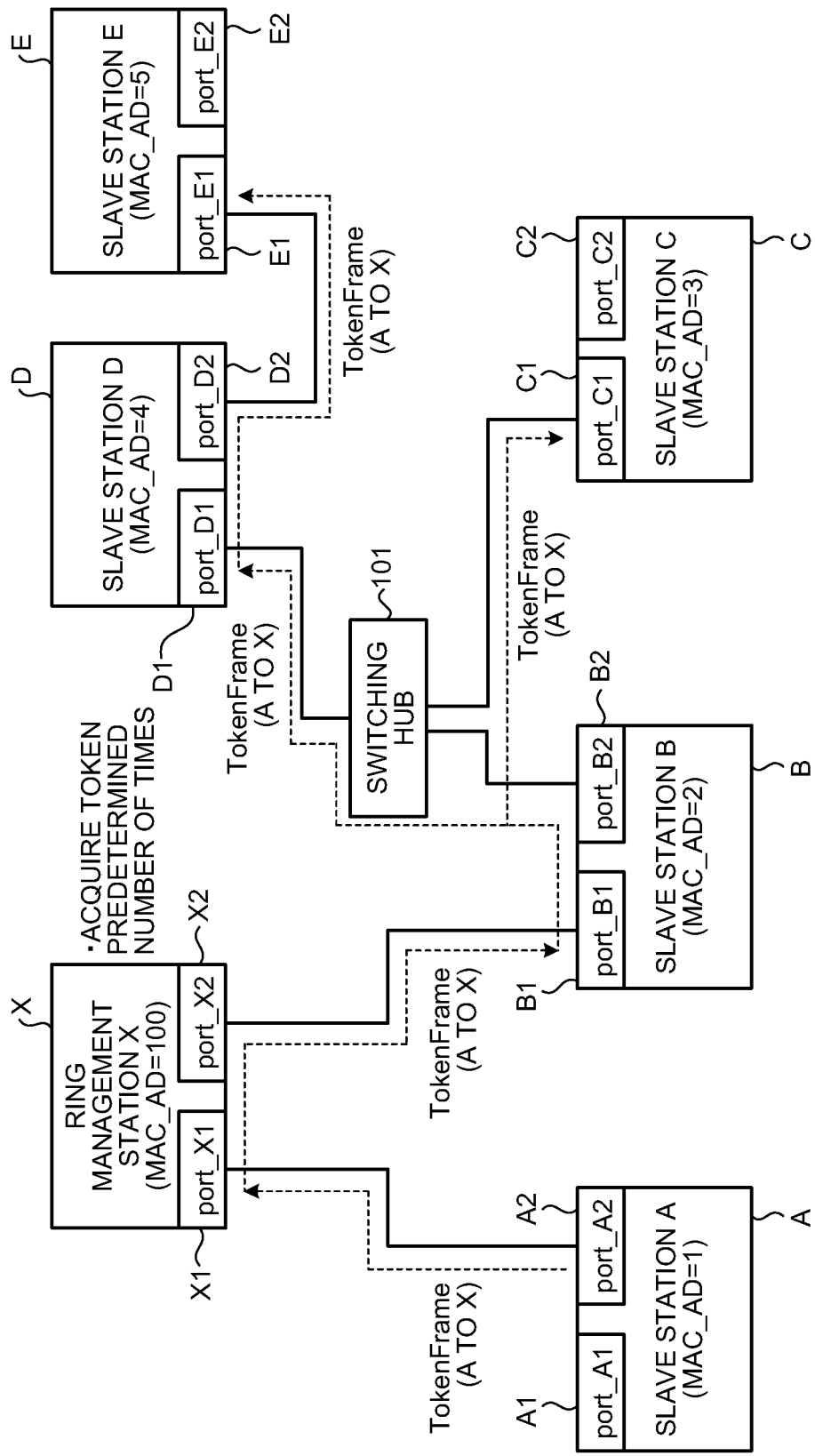

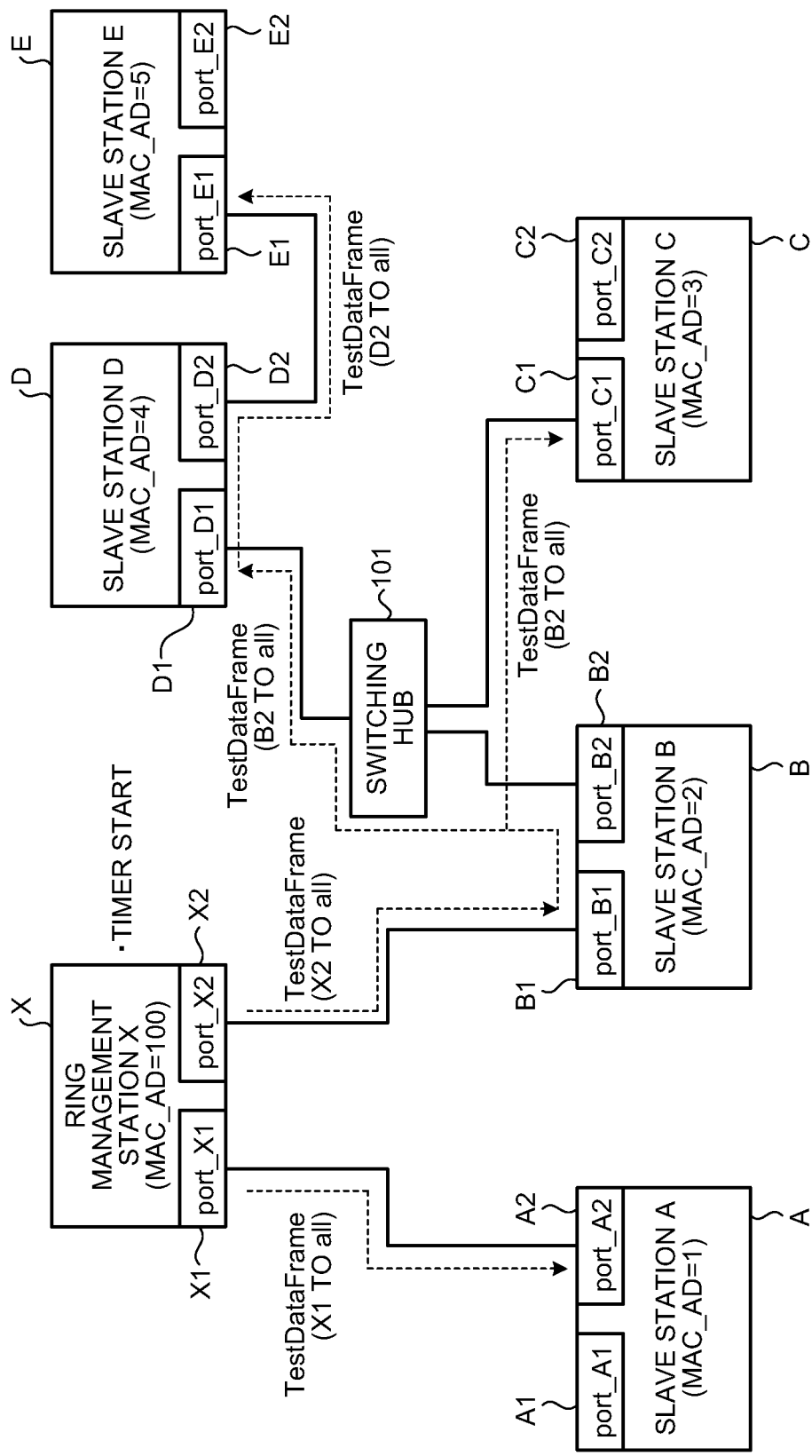

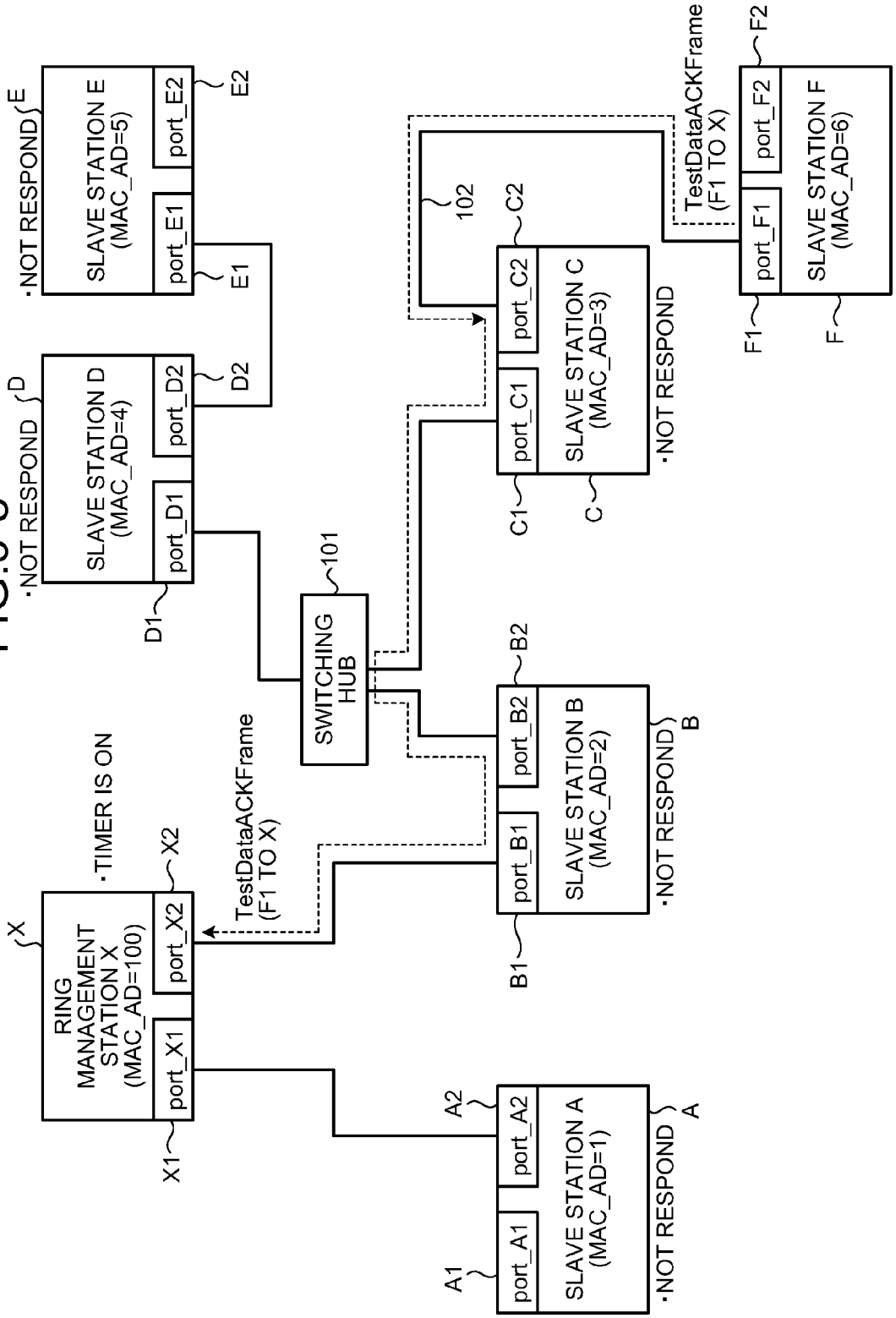

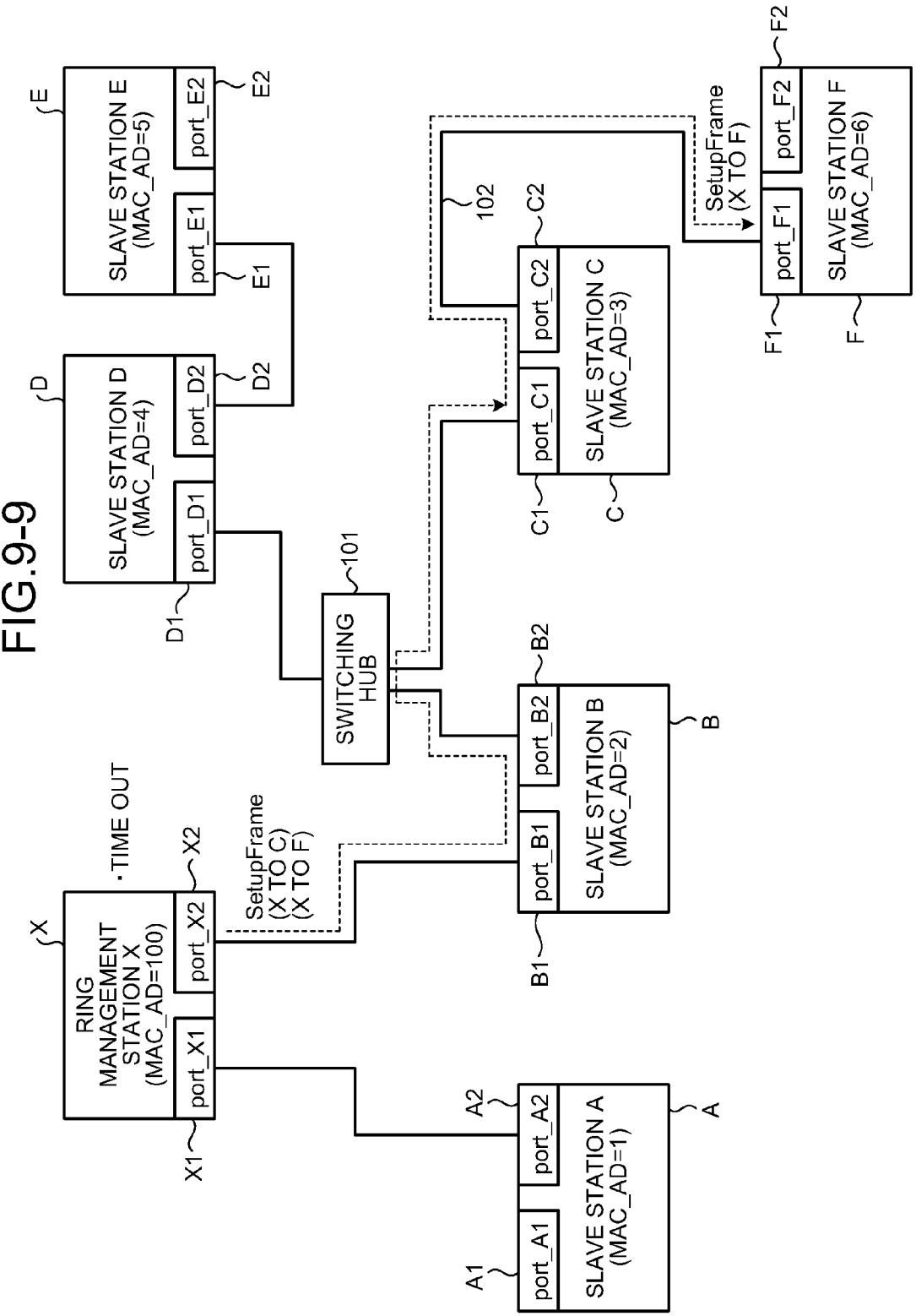

FIG.10

| NETWORK PRESENCE ACKNOWLEDGE FRAME | DA | SA | type | FRAME IDENTIFICATION INFORMATION | SA INFORMATION IN RECEIVED NETWORK PRESENCE CHECK FRAME | PORT INFORMATION OF STATION THAT TRANSMITS NETWORK PRESENCE CHECK FRAME |
|---|---|---|---|---|---|---|
| TestDataACKFrame (F1 TO X) | 100 | 6 | ** | TestDataACK | 3 | port_C2 |

FIG.11

| SA | SA INFORMATION IN RECEIVED NETWORK PRESENCE CHECK FRAME | PORT INFORMATION OF STATION THAT TRANSMITS NETWORK PRESENCE CHECK FRAME |
|---|---|---|
| 1 | 100 | port_X1 |
| 2 | 100 | port_X2 |
| 3 | 2 | port_B2 |
| 4 | 2 | port_B2 |
| 5 | 4 | port_D2 |
| 6 | 3 | port_C2 |

| SETUP FRAME | DA | SA | type | FRAME IDENTIFICATION INFORMATION | TOKEN FRAME DESTINATION MAC ADDRESS SETTING INFORMATION |
|---|---|---|---|---|---|
| SetupFrame (X TO C) | 3 | 100 | ** | Setup | 6 |
| SetupFrame (X TO F) | 6 | 100 | ** | Setup | 4 |

FIG.13

| SA | SA INFORMATION IN RECEIVED NETWORK PRESENCE CHECK FRAME | PORT INFORMATION OF STATION THAT TRANSMITS NETWORK PRESENCE CHECK FRAME | END OF CONFIGURATION PROCESSING FOR LOGICAL RING | |
|---|---|---|---|---|
| 1 | 100 | port_X1 | ○ | ← 301 |
| 2 | 100 | port_X2 | ○ | ← 302 |
| 3 | 2 | port_B2 | ○ | ← 303 |
| 4 | 2 | port_B2 | ○ | ← 304 |
| 5 | 4 | port_D2 | ○ | ← 305 |
| 6 | 3 | port_C2 | ○ | ← 306 |
| 21 | 6 | port_F2 | | |
| 22 | 21 | port_Q2 | | |
| 23 | 22 | port_R2 | | ← 307 |
| 24 | 23 | port_S2 | | |
| 25 | 24 | port_T2 | | |
| 26 | 25 | port_U2 | | |
| 27 | 26 | port_V2 | | |
| 28 | 27 | port_W2 | | ← 308 |
| 29 | 28 | port_Y2 | | |
| 30 | 29 | port_Z2 | | |

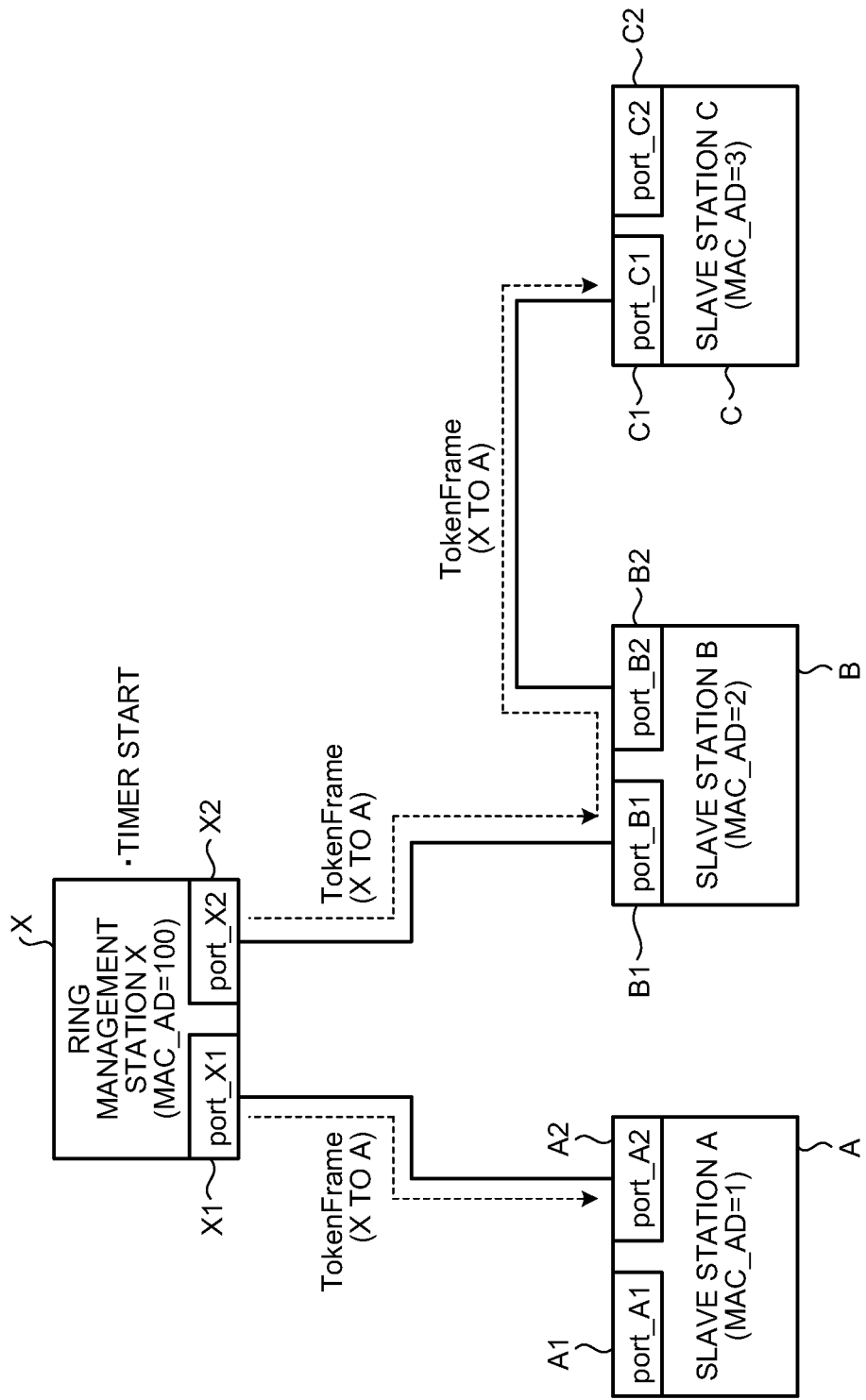

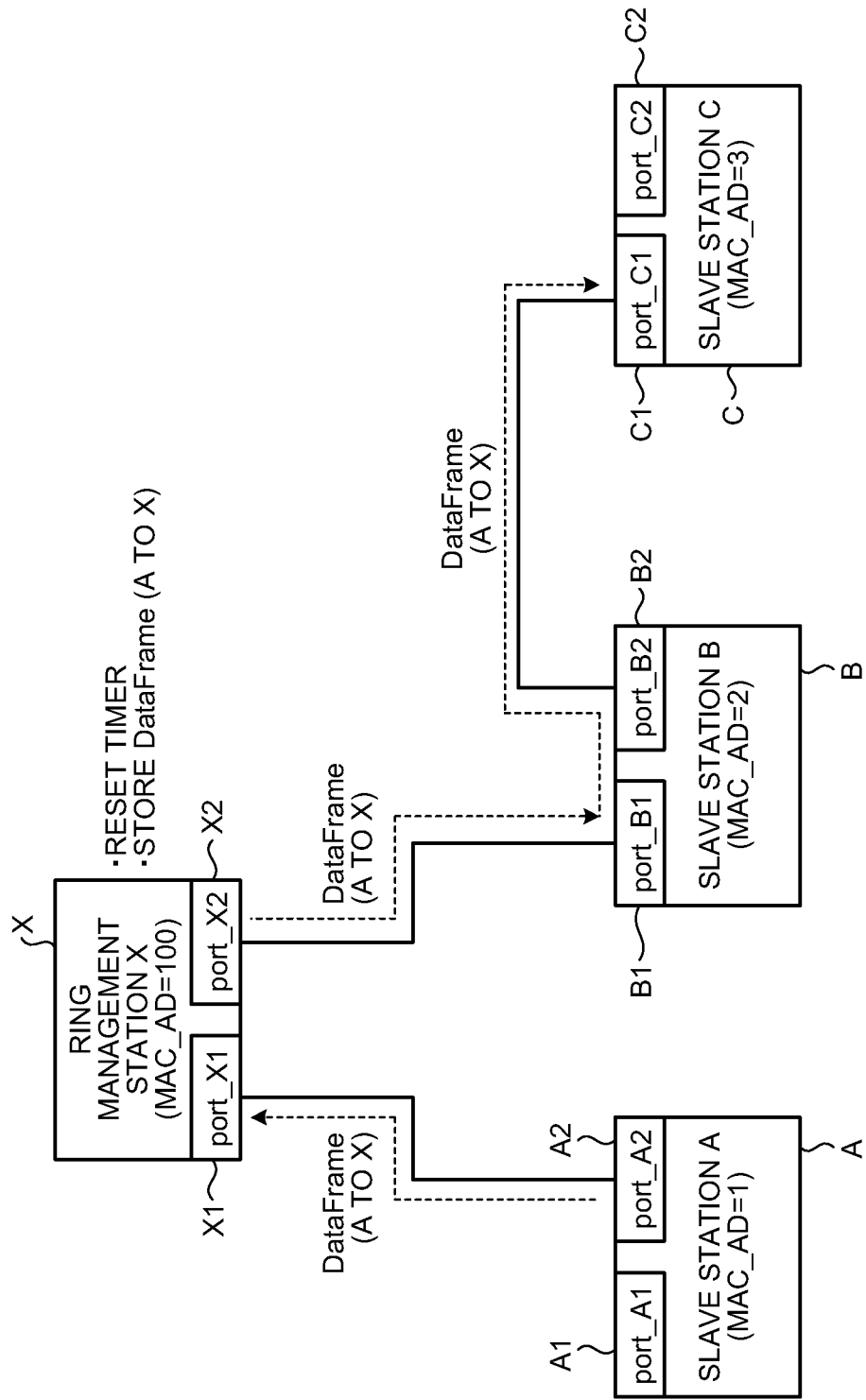

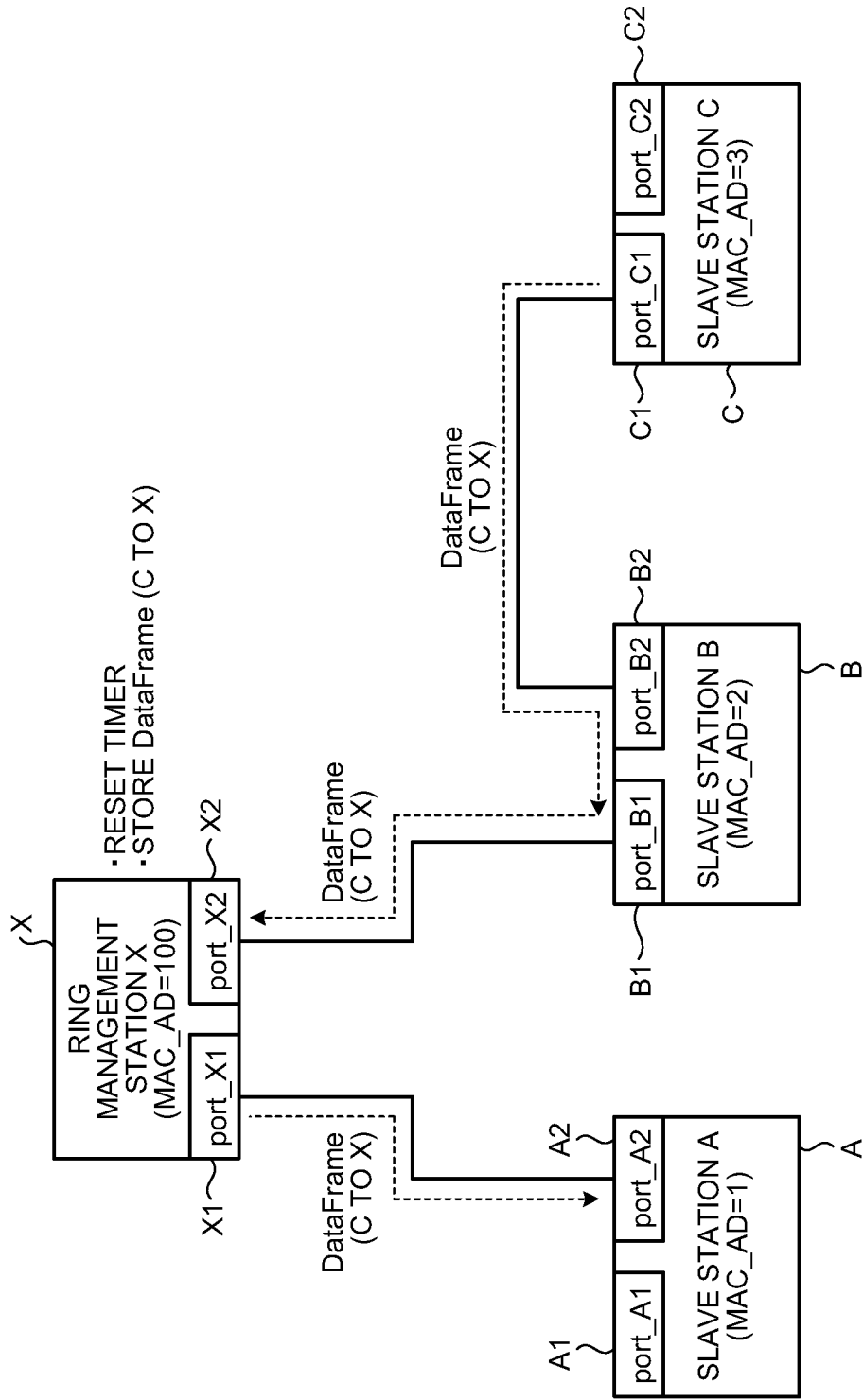

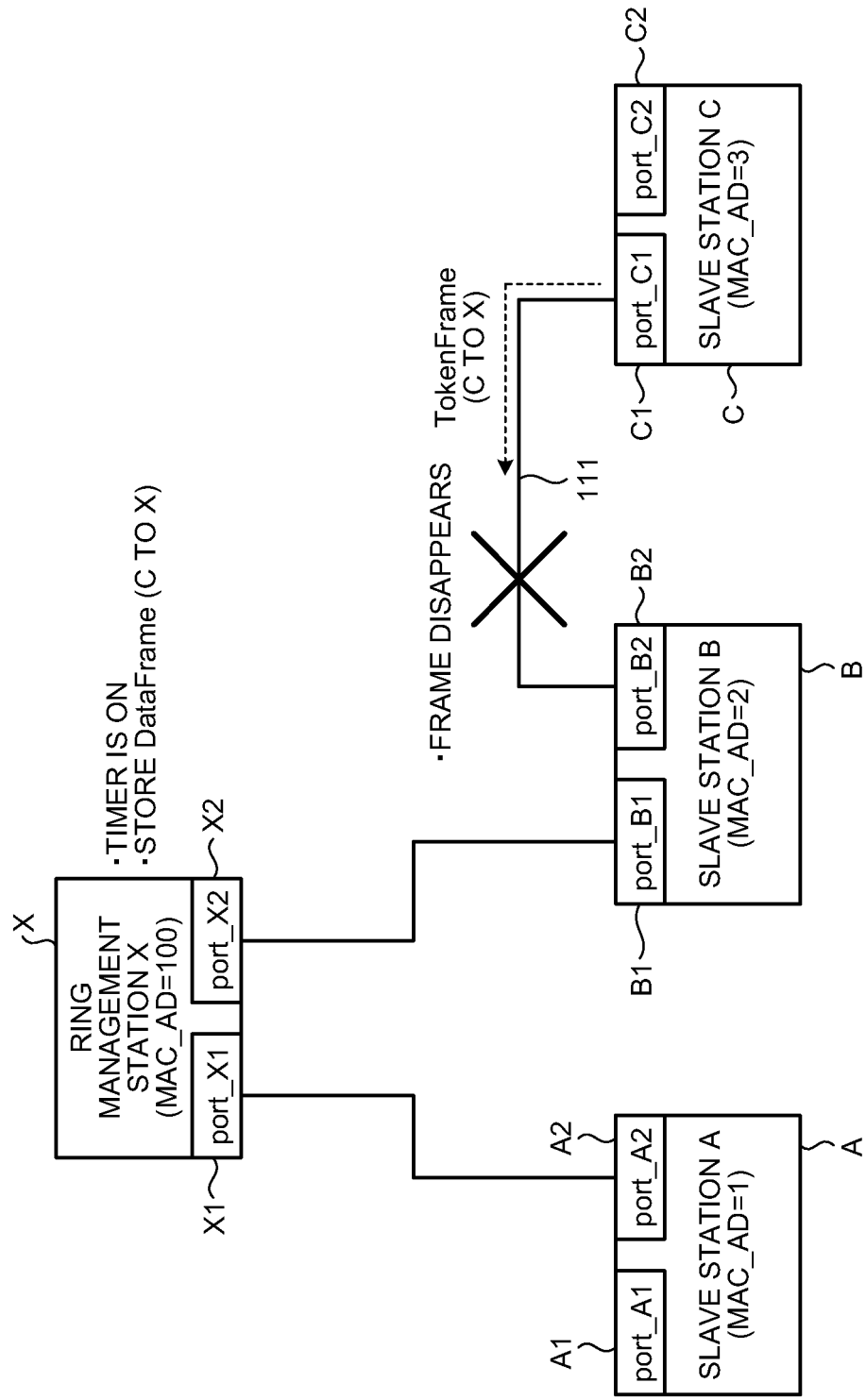

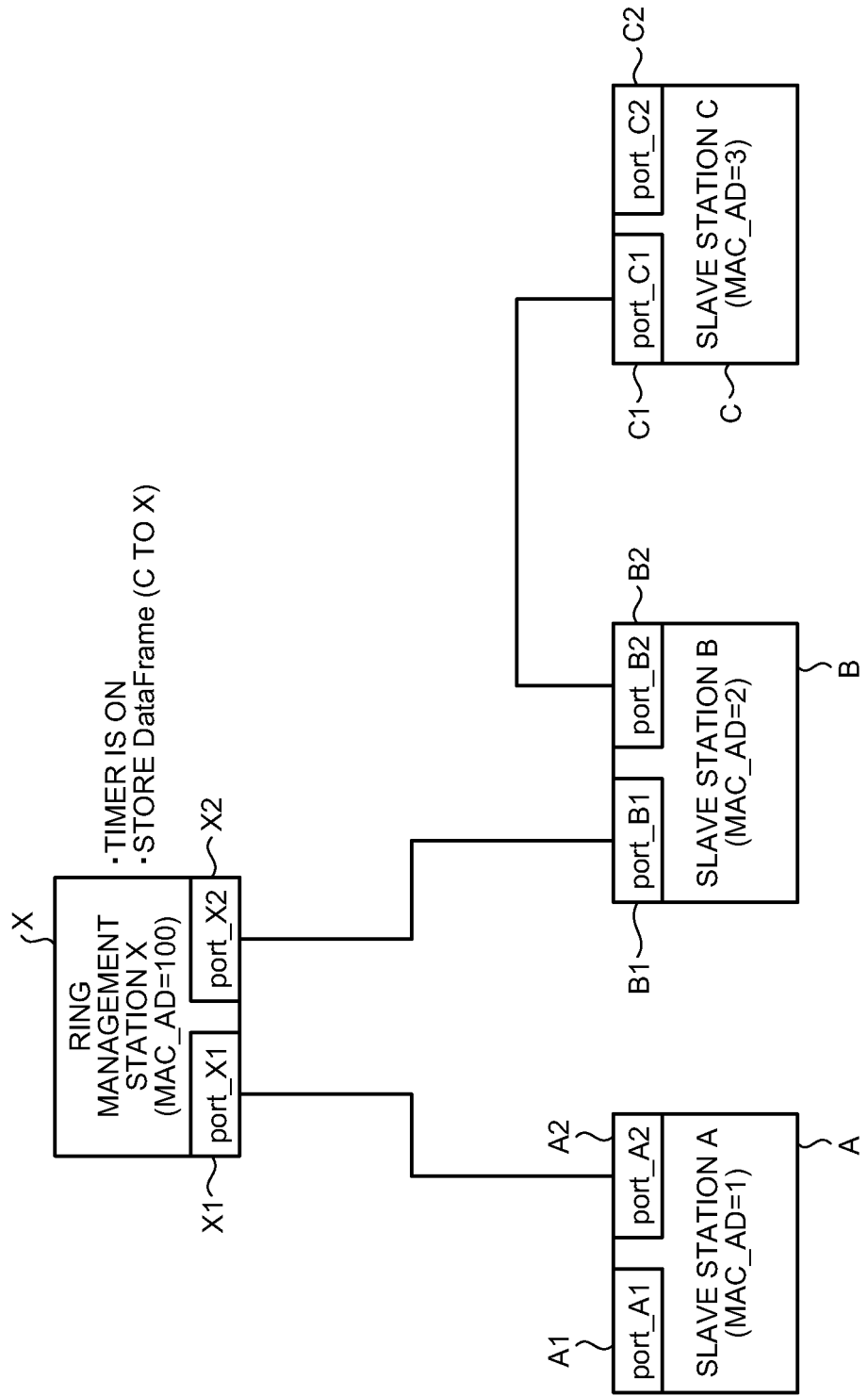

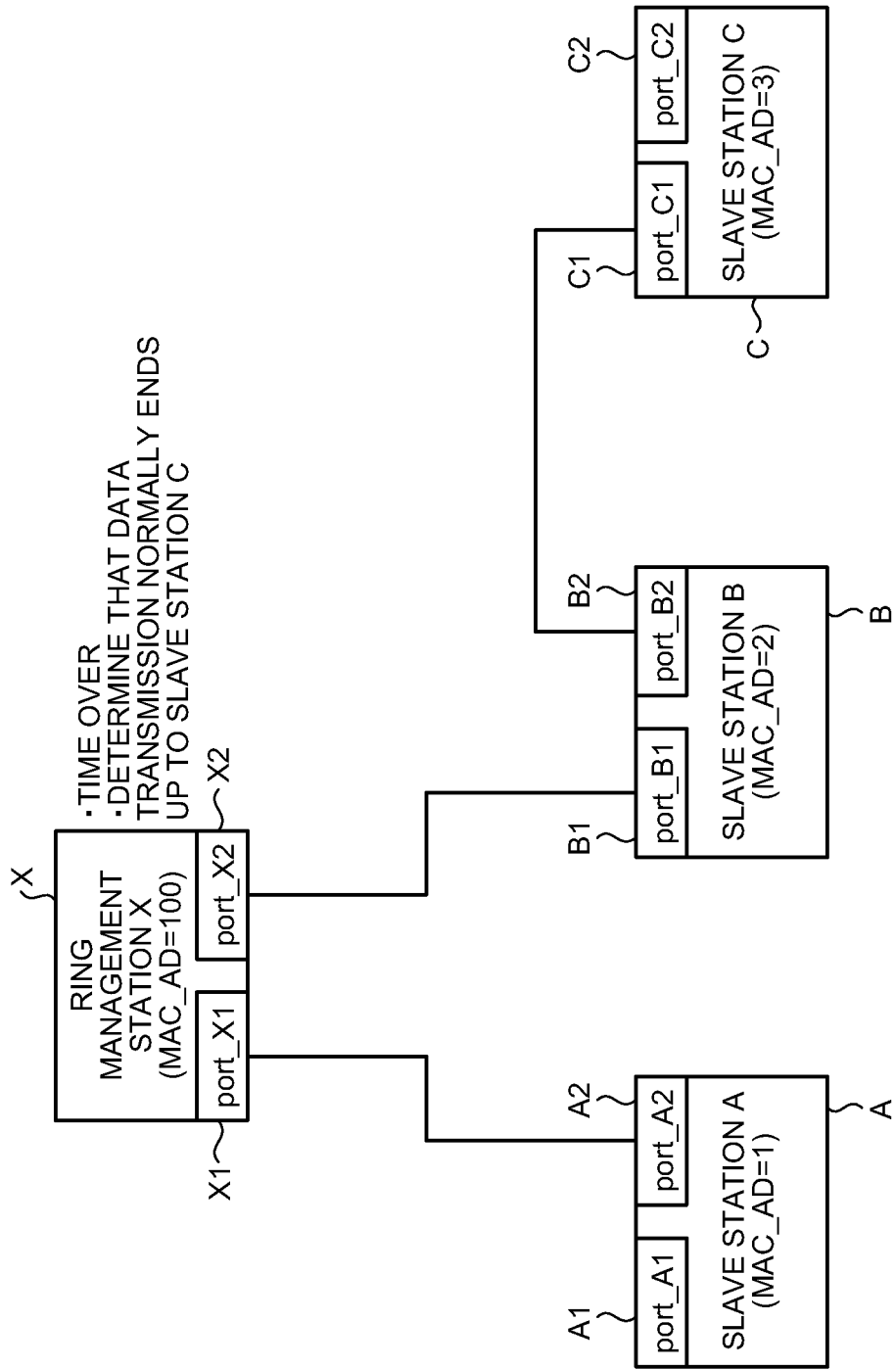

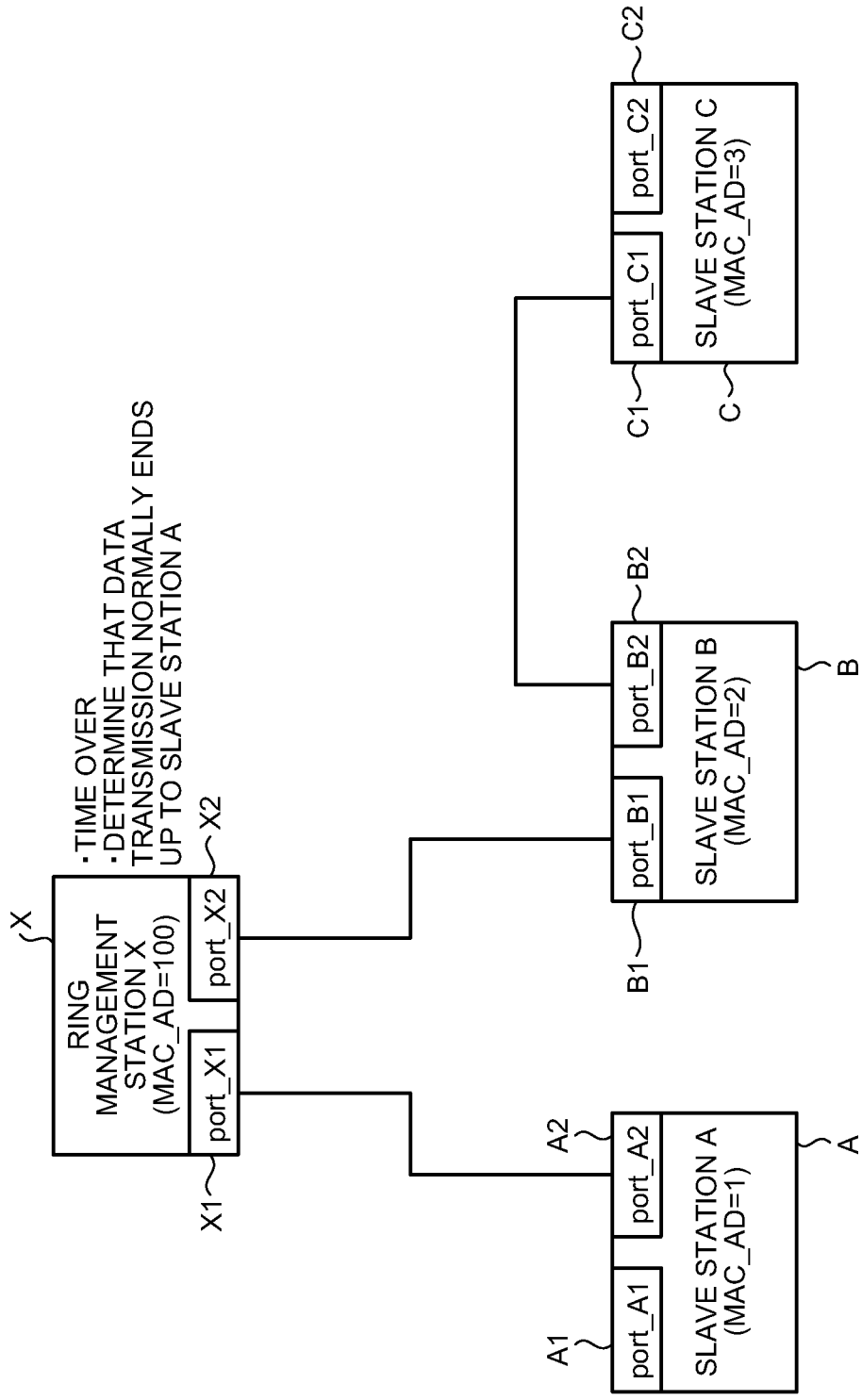

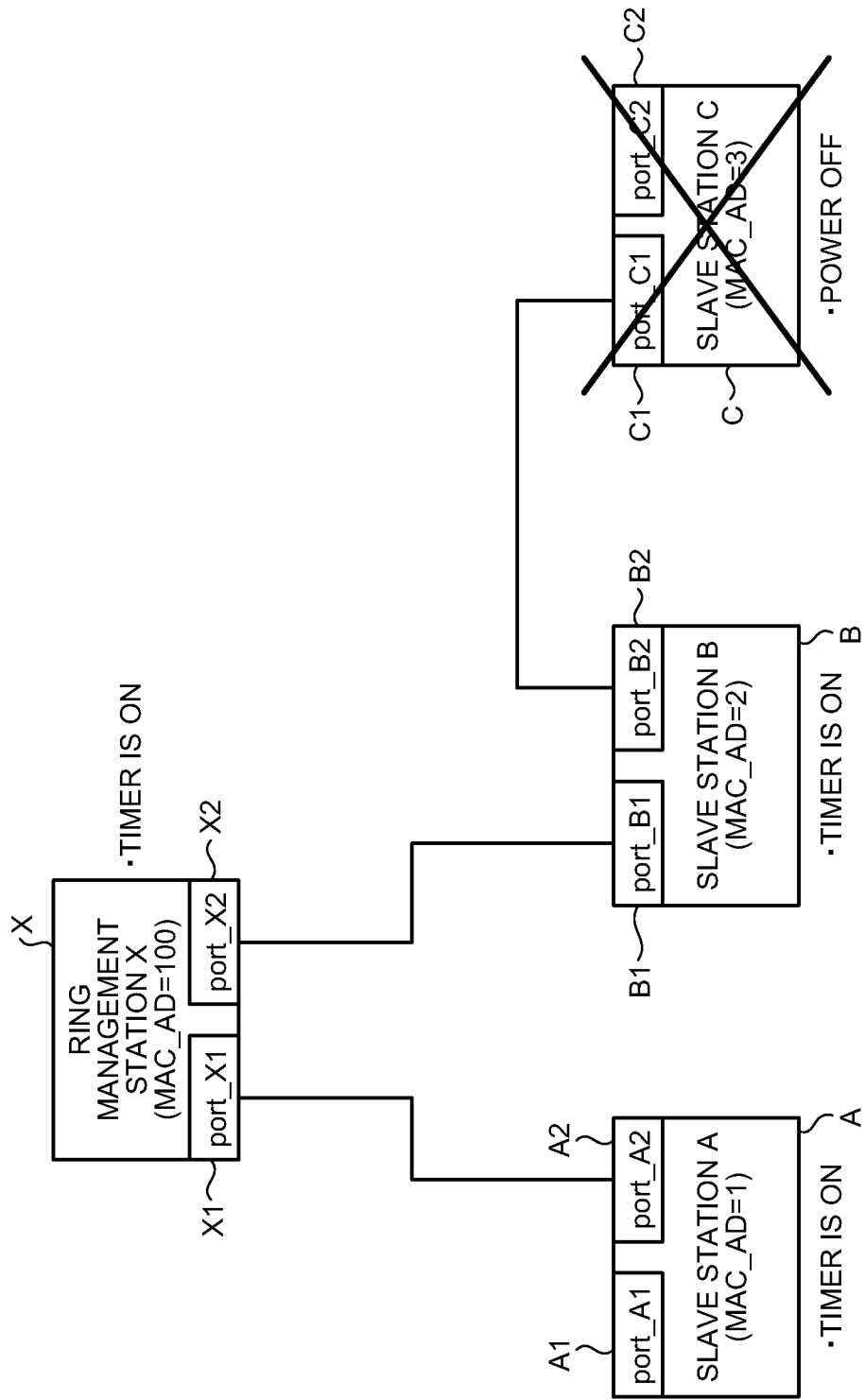

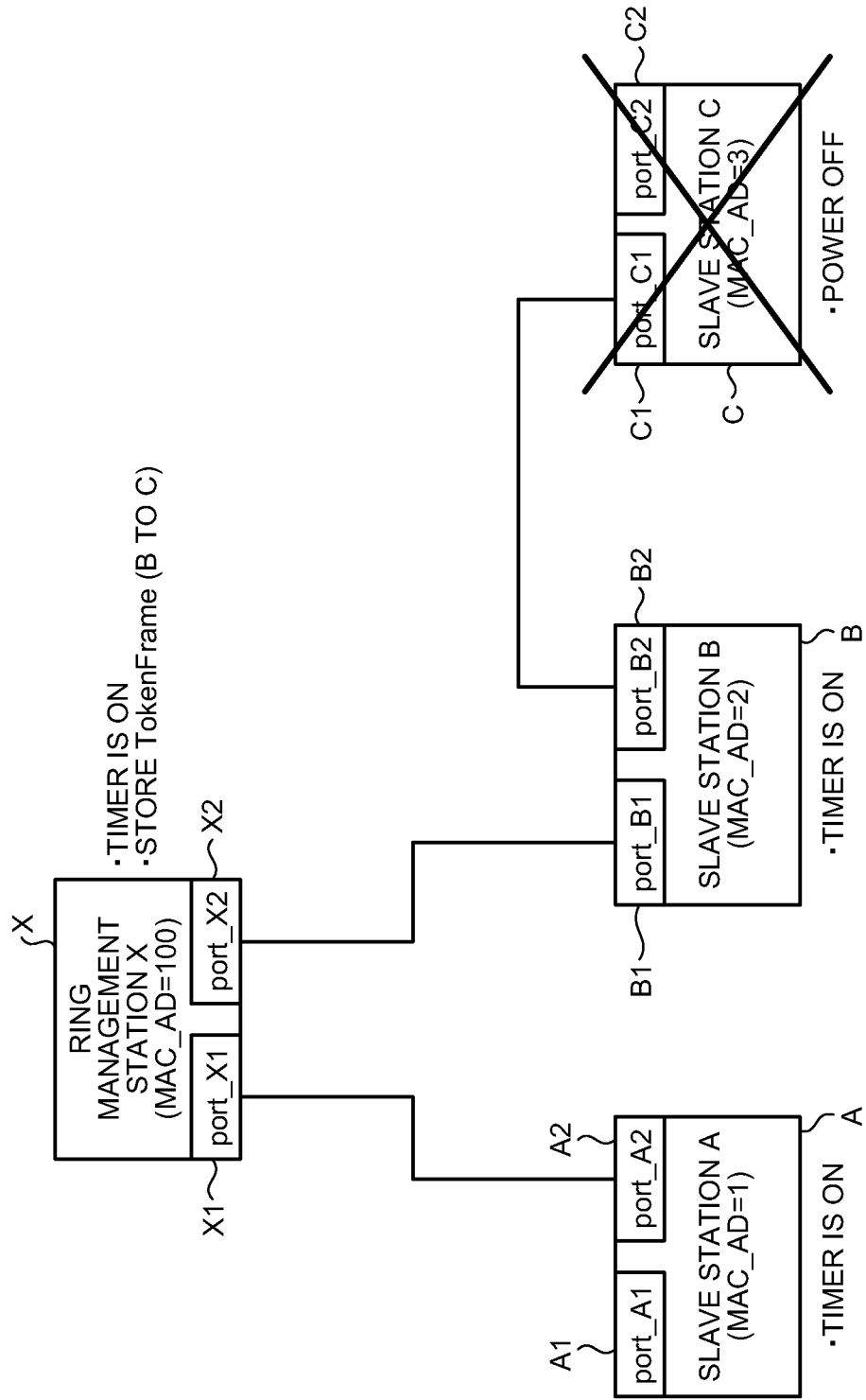

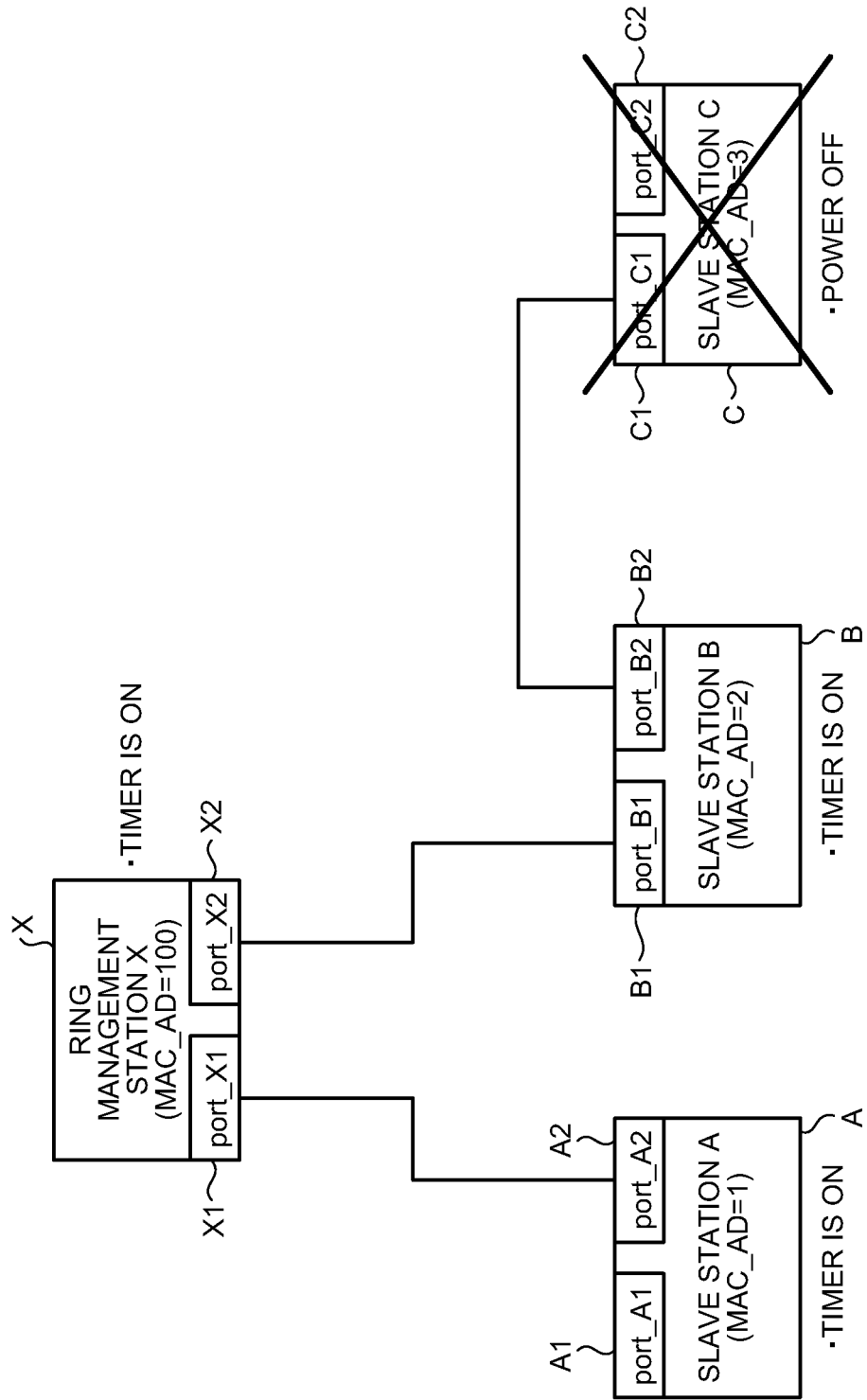

COMMUNICATION MANAGEMENT APPARATUS, COMMUNICATION NODE, AND COMMUNICATION SYSTEM, AND DATA COMMUNICATION METHOD

CROSS REFERENCE TO RELATED APPLICATION

This is a Continuation Application of U.S. application Ser. No. 13/142,192 filed Jun. 24, 2011 which is a National Stage of International Application No. PCT/JP2008/073631 filed Dec. 25, 2008, the contents of all of which are incorporated herein by reference in their entirety.

TECHNICAL FIELD

The present invention relates to a communication management apparatus, a communication node, and a communication system, and a data communication method for performing communication using a token frame among communication nodes connected by an Ethernet.

BACKGROUND ART

In the past, an Ethernet, the same applies in the following explanation) is known as a system for performing transmission and reception of data between communication nodes connected by a cable. As a connection form of communication nodes in the Ethernet, bus topology, star topology, line topology, and the like are known (see, for example, Non-Patent Literature 1).

The bus topology is configured by, with one cable serving as a trunk line set as the center, extending branch cables from the center at appropriate intervals and arranging a plurality of communication nodes. In this bus topology, when the communication nodes simultaneously transmit data, collision of the data occurs. Therefore, a CSMA/CD (Carrier Sense Multiple Access/Collision Detection) system for, while avoiding collision, securing a transmission right and propagating the data to all connected communication nodes is adopted to perform transmission of the data.

However, as a connection form of communication nodes in recent years, the star topology is mainly used. This star topology has a configuration in which, with a communication node called switching hub having a plurality of ports set as the center, other communication nodes are connected to the ports of the switching hub via a cable such as a UTP cable (Unshielded Twisted Pair Cable). The switching hub also has a buffer memory. Even when a plurality of communication nodes simultaneously transmit data, after accumulating the data in the buffer memory, the switching hub transmits the data to all ports other than a port at a transfer destination or an arrival port. Therefore, unlike the bus topology, it is unnecessary to take into account collision of the data.

Non-Patent Literature: "Impress Standard Textbook Series Revised Edition 10 Gigabit Ethernet Textbook", compiled under the supervision of Osamu Ishida and Koichiro Seto, Kabushiki Kaisha Impress Network Business Company, Apr. 11, 2005

DISCLOSURE OF INVENTION

Problem to be Solved by the Invention

In recent years, even in a network connecting FA (Factory Automation) apparatuses (hereinafter referred to as FA network) in which real-time properties are requested, it is a general practice to connect the apparatuses through the Ethernet and perform control. For example, a control system is established in which communication units of programmable controllers that control control targets (hereinafter referred to as master stations) are connected and a communication unit of a programmable controller (a master station) and communication units of input and output apparatuses (hereinafter referred to as slave stations) are connected by the Ethernet.

Because real-time properties are requested, the control system performs, within a predetermined time, a series of processing for transmitting data from the slave stations to the master station and, in the master station, performing predetermined arithmetic processing using the data received from the slave stations to calculate control data and transmitting the control data to the slave stations and repeatedly performs the series of processing.

In general, a large number of slave stations are connected to the control system. A large number of data are transmitted from the slave stations to the master station in a short time. At this point, when the control system adopts the star topology, even if the slave stations simultaneously transmit data, the data is accumulated in a buffer memory of a switching hub and transmitted to the master station in order. However, when a large number of slave stations are connected to the control system, the number of data accumulated in the buffer memory increases and a delay occurs in the data relayed to the master station. In the worst case, there is a problem in that the data transmission to the master station does not end within the predetermined time and the real-time properties of the control system are spoiled. Discarding of frames due to exhaustion of the buffer memory of the switching hub occurs and the data from the slave stations is temporarily concentrated on the master station. Depending on processing speed of the master station, it is likely that a loss of frames occurs in the master station as well.

The present invention has been devised in view of the above problems and it is an object of the present invention to obtain a communication management apparatus, a communication node, and a communication system, and a data communication method that can perform transmission and reception of frames without causing a data delay when the transmission and reception of the frames is performed using the Ethernet.

Means for Solving Problem

In order to attain the object, a communication management apparatus according to the present invention is a communication management apparatus that manages transmission of data in a network of the same segment in which a plurality of communication nodes are connected in a star shape or a line shape by an Ethernet cable, the communication management apparatus including: a network-presence-check processing unit that performs network presence check processing for acquiring, from the communication node, the communication nodes present in the network and a connection relation among the communication nodes and generating network presence information; a token-circulation-order determining unit that determines token circulation order using the network presence information to minimize the number of times a token frame, which is a transmission right of data, passes a transmission line between an adjacent pair of the communication nodes; a setup processing unit that notifies, based on the token circulation order, each of the communication nodes in the network of information concerning a token circulation destination that is a communication node to which the transmission right is given after the communication node; a tokenframe processing unit that compares transmission right acquiring apparatus information in the received token frame and a MAC address of the own apparatus to determine whether the transmission right is obtained and, when the transmission right is obtained, after transmission of a data frame by a data-frame-communication processing unit, transmits a token frame in which, based on the token circulation order, the next communication node is set in the transmission right acquiring apparatus information; and the data-frame-communication processing unit that transmits the data frame when the transmission right is acquired and receives data frames from the other communication nodes.

Effect of the Invention

According to the present invention, the token frame is circulated to the communication nodes in the order for minimizing the number of times the token frame passes the transmission line between the communication nodes. Therefore, there are effects that, when transmission and reception of frames is performed using the Ethernet in a network in which real-time properties are requested, it is possible to realize optimum real-time performance adjusted to a connection state of the network and perform the transmission and reception of the frames without causing a data delay by preventing collision of the frames.

BRIEF DESCRIPTION OF DRAWINGS

FIG. 2-1 is a schematic block diagram of a functional configuration of a ring management station.

FIG. 2-2 is a schematic block diagram of a functional configuration of a slave station.

FIG. 3-1 is a diagram of an example of a format of a network presence check frame.

FIG. 3-2 is a diagram of an example of a format of a network presence acknowledge frame.

FIG. 3-3 is a diagram of an example of a format of a setup frame.

FIG. 3-4 is a diagram of an example of a format of a setup response frame.

FIG. 3-5 is a diagram of an example of a format of a token frame.

FIG. 4-1 is a schematic diagram of an example of an establishing method for a logical ring and a communication method employing a token according to the first embodiment (first).

FIG. 4-2 is a schematic diagram of the example of the establishing method for a logical ring and the communication method employing a token according to the first embodiment (second).

FIG. 4-3 is a schematic diagram of the example of the establishing method for a logical ring and the communication method employing a token according to the first embodiment (third).

FIG. 4-4 is a schematic diagram of the example of the establishing method for a logical ring and the communication method employing a token according to the first embodiment (fourth).

FIG. 4-5 is a schematic diagram of the example of the establishing method for a logical ring and the communication method employing a token according to the first embodiment (fifth).

FIG. 4-6 is a schematic diagram of the example of the establishing method for a logical ring and the communication method employing a token according to the first embodiment (sixth).

FIG. 4-7 is a schematic diagram of the example of the establishing method for a logical ring and the communication method employing a token according to the first embodiment (seventh).

FIG. 4-8 is a schematic diagram of the example of the establishing method for a logical ring and the communication method employing a token according to the first embodiment (eighth).

FIG. 4-9 is a schematic diagram of the example of the establishing method for a logical ring and the communication method employing a token according to the first embodiment (ninth).

FIG. 4-10 is a schematic diagram of the example of the establishing method for a logical ring and the communication method employing a token according to the first embodiment (tenth).

FIG. 4-11 is a schematic diagram of the example of the establishing method for a logical ring and the communication method employing a token according to the first embodiment (eleventh).

FIG. 4-12 is a schematic diagram of the example of the establishing method for a logical ring and the communication method employing a token according to the first embodiment (twelfth).

FIG. 4-13 is a schematic diagram of the example of the establishing method for a logical ring and the communication method employing a token according to the first embodiment (thirteenth).

FIG. 4-14 is a schematic diagram of the example of the establishing method for a logical ring and the communication method employing a token according to the first embodiment (fourteenth).

FIG. 4-15 is a schematic diagram of the example of the establishing method for a logical ring and the communication method employing a token according to the first embodiment (fifteenth).

FIG. 5-1 is a schematic diagram of an example of network presence check frames transmitted from a ring management station X.

FIG. 5-2 is a schematic diagram of an example of network presence acknowledge frames transmitted from slave stations A and B.

FIG. 5-3 is a schematic diagram of an example of a network presence check frame transmitted by the slave station B.

FIG. 5-4 is a schematic diagram of an example of network presence acknowledge frames transmitted from slave stations C and D.

FIG. 5-5 is a schematic diagram of an example of a network presence check frame transmitted by the slave station D.

FIG. 5-6 is a schematic diagram of an example of a network presence acknowledge frame transmitted from a slave station E.

FIG. 5-7 is a schematic diagram of an example of setup frames transmitted from the ring management station X to the slave stations.

FIG. 5-8 is a schematic diagram of an example of setup response frames transmitted from the slave stations.

FIG. 5-9 is a schematic diagram of an example of token frames generated by communication nodes.

FIG. 6 is a diagram of an example of network presence information generated by the ring management station X.

FIG. 7 is a flowchart for explaining an example of a processing procedure for determining circulating order of a token.

FIG. 8-1 is a schematic diagram of an example of a creation process for a token circulation table (first).

FIG. 8-2 is a schematic diagram of the example of the creation process for a token circulation table (second).

FIG. 8-3 is a schematic diagram of the example of the creation process for a token circulation table (third).

FIG. 8-4 is a schematic diagram of the example of the creation process for a token circulation table (fourth).

FIG. 8-5 is a schematic diagram of the example of the creation process for a token circulation table (fifth).

FIG. 8-6 is a schematic diagram of the example of the creation process for a token circulation table (sixth).

FIG. 8-7 is a schematic diagram of the example of the creation process for a token circulation table (seventh).

FIG. 8-8 is a schematic diagram of the example of the creation process for a token circulation table (eighth).

FIG. 8-9 is a schematic diagram of the example of the creation process for a token circulation table (ninth).

FIG. 9-1 is a diagram of an example of a processing procedure of a method of establishing a logical ring when a slave station is added to the communication system anew (first).

FIG. 9-2 is a diagram of the example of the processing procedure of the method of establishing a logical ring when a slave station is added to the communication system anew (second).

FIG. 9-3 is a diagram of the example of the processing procedure of the method of establishing a logical ring when a slave station is added to the communication system anew (third).

FIG. 9-4 is a diagram of the example of the processing procedure of the method of establishing a logical ring when a slave station is added to the communication system anew (fourth).

FIG. 9-5 is a diagram of the example of the processing procedure of the method of establishing a logical ring when a slave station is added to the communication system anew (fifth).

FIG. 9-6 is a diagram of the example of the processing procedure of the method of establishing a logical ring when a slave station is added to the communication system anew (sixth).

FIG. 9-7 is a diagram of the example of the processing procedure of the method of establishing a logical ring when a slave station is added to the communication system anew (seventh).

FIG. 9-8 is a diagram of the example of the processing procedure of the method of establishing a logical ring when a slave station is added to the communication system anew (eighth).

FIG. 9-9 is a diagram of the example of the processing procedure of the method of establishing a logical ring when a slave station is added to the communication system anew (ninth).

FIG. 9-10 is a diagram of the example of the processing procedure of the method of establishing a logical ring when a slave station is added to the communication system anew (tenth).

FIG. 9-11 is a diagram of the example of the processing procedure of the method of establishing a logical ring when a slave station is added to the communication system anew (eleventh).

FIG. 10 is a schematic diagram of an example of a network presence acknowledge frame transmitted from a slave station F.

FIG. 11 is a diagram of an example of network presence information after the network presence acknowledge frame is received from the slave station F.

FIG. 12 is a schematic diagram of an example of setup frames transmitted from the ring management station X to the slave stations C and F.

FIG. 13 is a diagram of an example of the structure of network presence information according to a third embodiment.

FIG. 14 is a flowchart for explaining an example of a reconfiguration processing for a logical ring by a ring management station.

FIG. 15 is a schematic block diagram of an example of a functional configuration of a ring management station according to a fourth embodiment.

FIG. 16-1 is a schematic diagram of an example of a procedure of reissue processing for a token frame according to the fourth embodiment (first).

FIG. 16-2 is a schematic diagram of the example of the procedure of the reissue processing for a token frame according to the fourth embodiment (second).

FIG. 16-3 is a schematic diagram of the example of the procedure of the reissue processing for a token frame according to the fourth embodiment (third).

FIG. 16-4 is a schematic diagram of the example of the procedure of the reissue processing for a token frame according to the fourth embodiment (fourth).

FIG. 16-5 is a schematic diagram of the example of the procedure of the reissue processing for a token frame according to the fourth embodiment (fifth).

FIG. 16-6 is a schematic diagram of the example of the procedure of the reissue processing for a token frame according to the fourth embodiment (sixth).

FIG. 16-7 is a schematic diagram of the example of the procedure of the reissue processing for a token frame according to the fourth embodiment (seventh).

FIG. 16-8 is a schematic diagram of the example of the procedure of the reissue processing for a token frame according to the fourth embodiment (eighth).

FIG. 17-1 is a schematic diagram of another example of the procedure of the reissue processing for a token frame according to the fourth embodiment (first).

FIG. 17-2 is a schematic diagram of the other example of the procedure of the reissue processing for a token frame according to the fourth embodiment (second).

FIG. 17-3 is a schematic diagram of the other example of the procedure of the reissue processing for a token frame according to the fourth embodiment (third).

FIG. 17-4 is a schematic diagram of the other example of the procedure of the reissue processing for a token frame according to the fourth embodiment (fourth).

FIG. 17-5 is a schematic diagram of the other example of the procedure of the reissue processing for a token frame according to the fourth embodiment (fifth).

FIG. 19-1 is a schematic diagram of an example of a procedure of determination processing for leaving off the slave station and reconfiguration processing for a logical ring according to the fifth embodiment (first).

FIG. 19-2 is a schematic diagram of the example of the procedure of the determination processing for leaving off the slave station and reconfiguration processing for a logical ring according to the fifth embodiment (second).

FIG. 19-3 is a schematic diagram of the example of the procedure of the determination processing for leaving off the slave station and reconfiguration processing for a logical ring according to the fifth embodiment (third).

FIG. 19-4 is a schematic diagram of the example of the procedure of the determination processing for leaving off the slave station and reconfiguration processing for a logical ring according to the fifth embodiment (fourth).

FIG. 19-5 is a schematic diagram of the example of the procedure of the determination processing for leaving off the slave station and reconfiguration processing for a logical ring according to the fifth embodiment (fifth).

FIG. 19-6 is a schematic diagram of the example of the procedure of the determination processing for leaving off the slave station and reconfiguration processing for a logical ring according to the fifth embodiment (sixth).

FIG. 19-7 is a schematic diagram of the example of the procedure of the determination processing for leaving off the slave station and reconfiguration processing for a logical ring according to the fifth embodiment (seventh).

FIG. 19-8 is a schematic diagram of the example of the procedure of the determination processing for leaving off the slave station and reconfiguration processing for a logical ring according to the fifth embodiment (eighth).

FIG. 19-9 is a schematic diagram of the example of the procedure of the determination processing for leaving off the slave station and reconfiguration processing for a logical ring according to the fifth embodiment (ninth).

FIG. 19-10 is a schematic diagram of the example of the procedure of the determination processing for leaving off the slave station and reconfiguration processing for a logical ring according to the fifth embodiment (tenth).

EXPLANATIONS OF LETTERS OR NUMERALS

Figure 1:
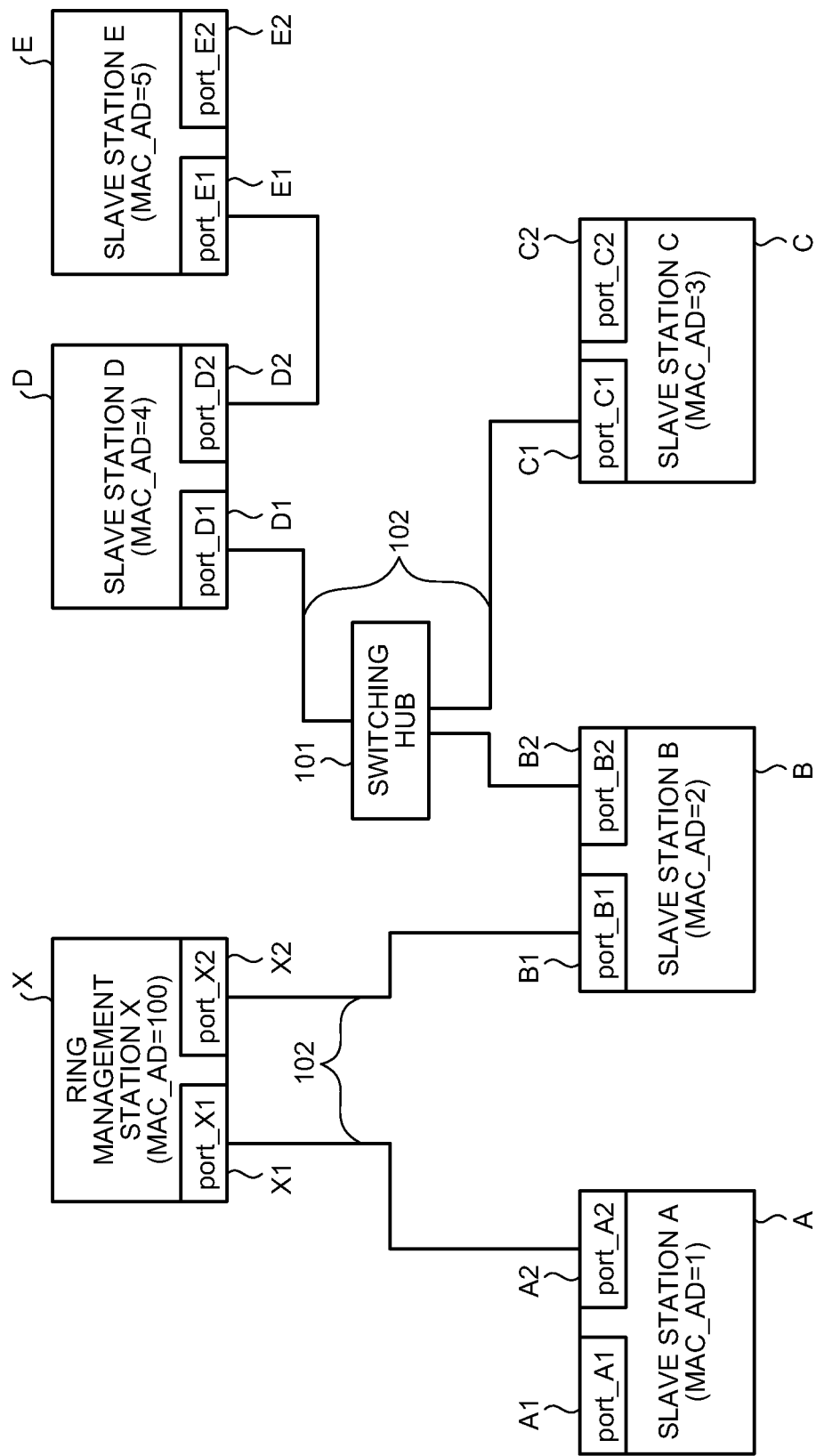
FIG. 1 is a schematic diagram of an example of a communication system in which communication is performed using a token according to a first embodiment.

A to F Slave stations
X Ring management station
11-1, 11-2, 51-1, 51-2 Ports
20, 20A, 60, 60A Communication processing units
21, 65 Timers
22 Network-presence-check processing unit
23 Network-presence-information storing unit
24 Token-circulation-order determining unit
25 Token-circulation-order-information storing unit
26 Setup processing unit
27, 63 Token-frame processing units
28, 64 Data-frame-communication processing units
29 Network monitoring unit
30 Frame storing unit
51 Port
61 Control-frame response unit
62 Token-circulation-destination-information storing unit
66 Reset processing unit
101 Switching hub
102 Cable
111, 112 Transmission lines
200 Network presence check frame
220 Network presence acknowledge frame
240 Setup frame
260 Setup response frame
280 Token frame

BEST MODE(S) FOR CARRYING OUT THE INVENTION

Preferred embodiments of a communication management apparatus, a communication node, and a communication system, and a data communication method according to the present invention are explained in detail below with reference to the accompanying drawings. The present invention is not limited by these embodiments.

First Embodiment

FIG. 1 is a schematic diagram of an example of a communication system in which communication is performed using a token according to a first embodiment. This communication system includes a network of the same segment in which a plurality of communication nodes are connected in a line shape or a star shape by an Ethernet, the same applies in the following explanation). Each of the communication nodes includes two ports. The ports of the communication nodes are connected via a cable 102 capable of performing full duplex communication such as a twist pair cable or an optical fiber. In this example, as the communication node, one ring management station X functioning as a communication management apparatus that manages transmission and reception of data (frames) in the network of the same segment and five slave stations A to E that perform, based on setting by the ring management station X, transmission of data (frames) are provided.

As shown in FIG. 1, the ring management station X and the slave stations A and B are connected in a line shape. Specifically, a first port X1 of the ring management station X and a second port A2 of the slave station A are connected and a second port X2 of the ring management station X and a first port B1 of the slave station B are connected.

The slave stations B, C, and D are connected in a star shape by a switching hub 101. Specifically, a second port B2 of the slave station B, a first port C1 of the slave station C, and a first port D1 of the slave station D are connected via the switching hub 101.

The slave stations D and E are connected in a line shape. Specifically, a second port D2 of the slave station D and a first port E1 of the slave station E are connected.

MAC (Media Access Control) addresses (in the figures, represented as MAC_AD) of the communication nodes are set as follows:
  ring management station X=100
  slave station A=1
  slave station B=2
  slave station C=3
  slave station D=4
  slave station E=5

In the first embodiment, in such a communication system in which the communication nodes are connected by the Ethernet in a star shape or a line shape, the communication nodes do not freely perform transmission of data, a frame for obtaining a data transmission right called token (a token frame) is transmitted to the nodes in the communication system in order, and the communication node that acquires the token can perform transmission of data to the other communication nodes. Transmission order of the token frame is, for example, as indicated by (A) below.

Ring management station X→slave station B→slave station C→slave station D→slave station E→slave station A→ring management station X (A)

In this way, the communication system does not have a ring configuration in a physical network configuration. However, the communication system is configured to circulate the data transmission right (the token frame) in order among the communication nodes in the communication system and return the transmission right to the ring management station X to thereby repeat the transmission right in a logical ring configuration.

Figures 1, 2:
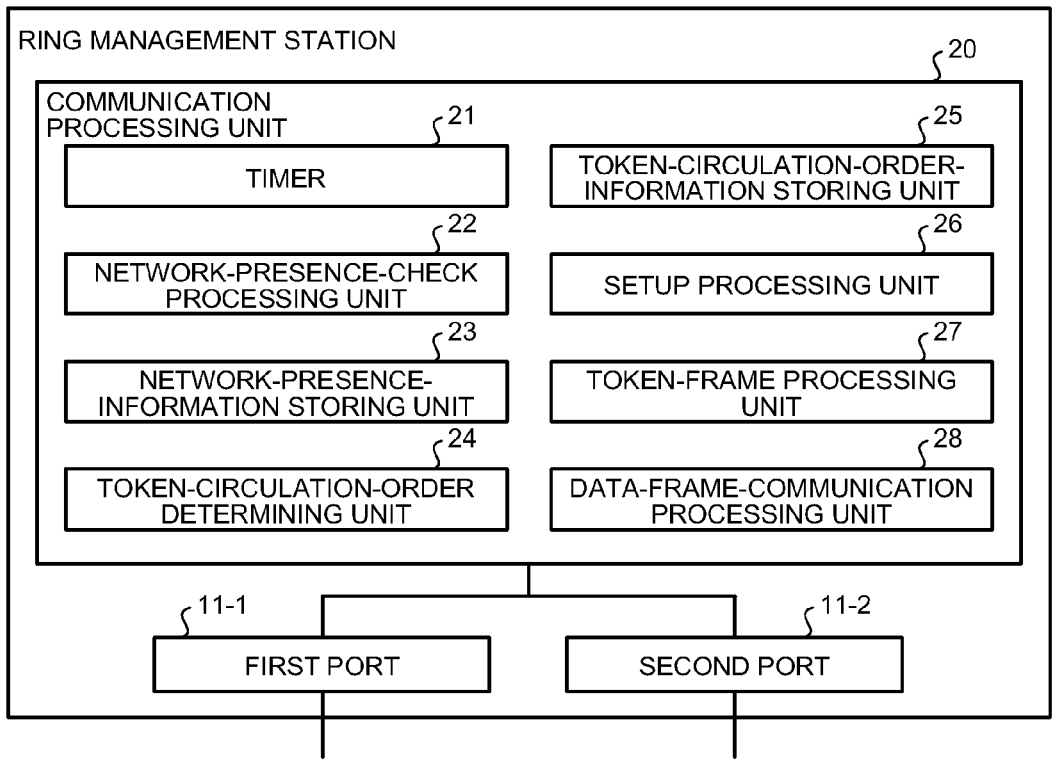
Figure 2:
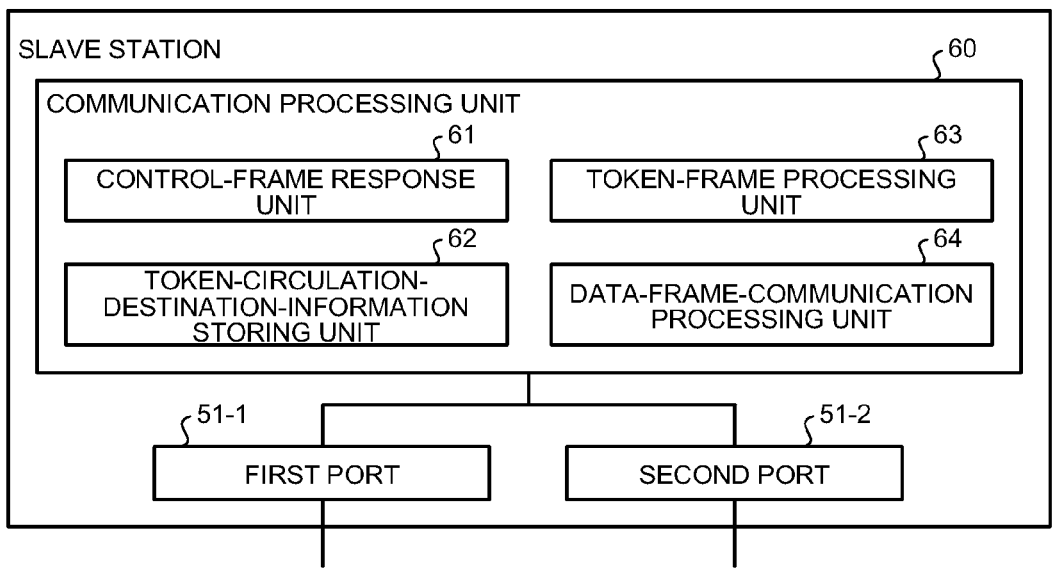

FIG. 2-1 is a schematic block diagram of a functional configuration of a ring management station. The ring management station X includes two ports 11-1 and 11-2 for connecting an Ethernet cable between the ring management station and the adjacent communication nodes (the slave stations A to E) or the switching hub 101 and a communication processing unit 20 that performs, for example, transmission and reception processing for frames via the ports 11-1 and 11-2 and processing for establishing transmission order of the token frame.

The ports 11-1 and 11-2 include two ports of a first port 11-1 and a second port 11-2. At least one port of these two ports 11-1 and 11-2 only has to be connected to a port of a slave station adjacent thereto (or a port of a slave station via a switching hub).

The communication processing unit 20 includes a timer 21, a network-presence-check processing unit 22, a network-presence-information storing unit 23, a token-circulation-order determining unit 24, a token-circulation-order-information storing unit 25, a setup processing unit 26, a token-frame processing unit 27, and a data-frame-communication processing unit 28.

The timer 21 is started by a processing unit in the communication processing unit 20 and has a function of measuring a predetermined time. In the first embodiment, the timer 21 counts time until the predetermined time elapses after a network presence check frame is transmitted by the network-presence-check processing unit 22.

The network-presence-check processing unit 22 performs, after a power supply for the own apparatus (the ring management station X) is turned on or after a predetermined state occurs, network presence check processing for detecting a connection state of the communication nodes included in the communication system (the network of the same segment). Specifically, the network-presence-check processing unit 22 creates a network presence check frame and transmits the network presence check frame in broadcast and generates network presence information from information included in a network presence acknowledge frame, which is a response to a network presence check frame from a communication node present in the communication system. This processing is performed until the predetermined time elapses after the timer 21 is started when the network presence check frame is transmitted.

Figures 1, 3:
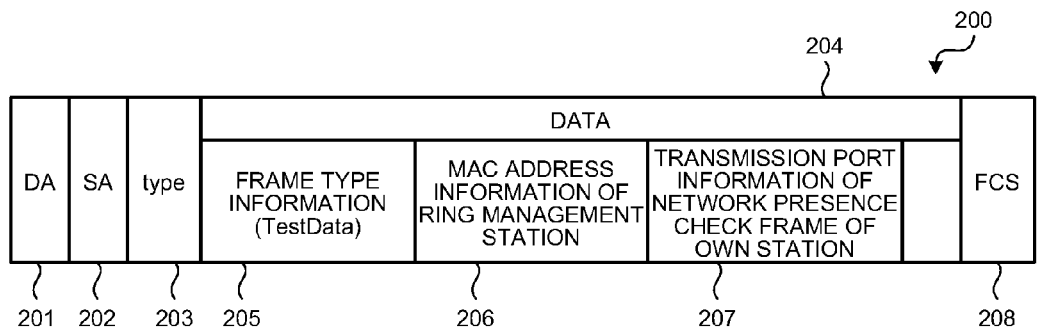
Figures 2, 3:
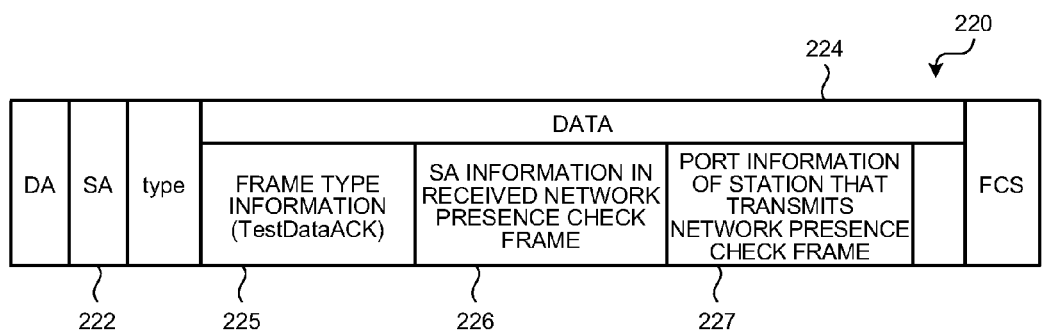
Figure 3:
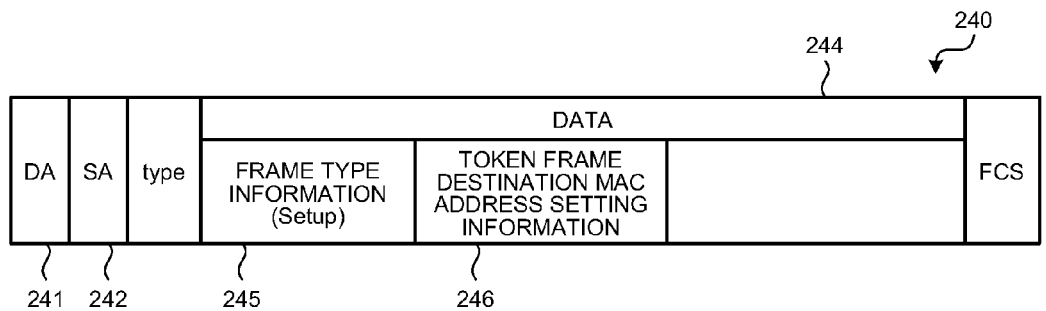

FIG. 3-1 is a diagram of an example of a format of the network presence check frame. A network presence check frame 200 is an Ethernet frame and includes a destination MAC address (hereinafter referred to as DA) 201, a transmission source MAC address (hereinafter referred to as SA) 202, an Ethernet type (type) 203, data 204 in which data of upper layers is stored, and an FCS (Frame Check Sequence) 208 in which a check result concerning whether an error is present in information stored in the DA 201 to the data 204 of the own frame is stored.

In the first embodiment, frame type information 205, MAC address information 206 of the ring management station, and transmission port information 207 of the network presence check frame of the own station are stored in a part of the data 204.

The frame type information 205 is information for identifying what kind of a frame the own Ethernet frame is. Information indicating that a frame is the network presence check frame is stored in the frame type information 205. In this example, the network presence check frame is represented as "TestData".

A MAC address of the ring management station X is stored in the MAC address information 206 of the ring management station. Port information indicating from which port a communication node transmits the network presence check frame 200 is stored in the transmission port information 207 of the network presence check frame of the own station.

FIG. 3-2 is a diagram of an example of a format of the network presence acknowledge frame. This network presence acknowledge frame 220 is also an Ethernet frame. Information used in the first embodiment is defined in data 224. Specifically, frame type information 225, SA information 226 in the received network presence check frame, and port information 227 of a station that transmits the network presence check frame are stored in a part of the data 224.

Information indicating that a frame is the network presence acknowledge frame 220 is stored in the frame type information 225. In this specification, the network presence acknowledge frame is represented as "TestDataACK". A MAC address stored in the SA 202 area of the network presence check frame 200 received by a communication node (a slave station) is stored in the "SA information in the received network presence check frame" 226. Further, port information stored in the "transmission port information of the network presence check frame of the own station" 207 of the data 204 area in the network presence check frame 200 received by the communication node (the slave station) is stored in the "port information of the station that transmits the network presence check frame" 227.

When the network-presence-check processing unit 22 receives the network presence acknowledge frame 220, the network-presence-check processing unit 22 generates network presence information in which the "SA information in the received network presence check frame" 226 and the "port information of the station that transmits the network presence check frame" 227 are associated with an "SA" 222 of the received network presence acknowledge frame 220 and stores the network presence information in the network-presence-information storing unit 23.

The network-presence-information storing unit 23 stores the network presence information generated by the network-presence-check processing unit 22. As explained above, this network presence information includes a MAC address (the SA 222) of a communication node (a slave station) that transmits the network presence acknowledge frame 220, the "SA information in the received network presence check frame" 226, and the "port information of the station that transmits the network presence check frame" 227.

After the timer 21 started by the network-presence-check processing unit 22 times out, the token-circulation-order determining unit 24 grasps a connection state among the communication nodes included in the communication system using the network presence information stored in the network-presence-information storing unit 23 and performs processing for configuring a logical ring, i.e., processing for determining circulation order of a token frame. In the processing for configuring a logical ring, the token-circulation-order determining unit 24 establishes a logical ring such that the number of communication nodes that a token as a transmission right passes while circulating once is minimized (when a cable (including a switching hub) connecting two communication nodes is referred to as a transmission line, the number of transmission lines that the token passes while circulating once is minimized). As a method of determining circulation order of the token that satisfies such a condition, the communication nodes only have to be drawn with a single stroke of the brush in the network belonging to the same segment. A method of determining the circulation order of the token by this method of the drawing with a single stroke of the brush is explained later. The determined circulation order of the token frame is stored in the token-circulation-order-information storing unit 25 as token circulation order information.

When the token circulation order information is determined by the token-circulation-order determining unit 24, the setup processing unit 26 generates, with respect to each of the communication nodes (slave stations) in the communication system, a setup frame including information concerning a communication node to which the transmission right is given after the communication using the token circulation order information and transmits the setup frame to the communication nodes. The setup processing unit 26 determines whether setup response frames, which are responses to the setup frame, are received from all the communication nodes. When the setup response frames are received from all the communication nodes, the setup processing unit 26 notifies the token-frame processing unit 27 to that effect.

FIG. 3-3 is a diagram of an example of a format of the setup frame. This setup frame 240 is also an Ethernet frame. Frame type information 245 and token frame destination MAC address setting information 246 are stored in a part of a data 244 area.

Because this setup frame 240 is set with respect to the communication nodes, a MAC address of a slave station that the ring management station X is about to set is set in a DA 241. Information indicating that a frame is the setup frame 240 is stored in the frame type information 245. In this specification, the setup frame 240 is represented as "Setup". When the transmission right is controlled by a token frame, a MAC address of a slave station that is given the transmission right after a communication node at a transmission destination of this setup frame 240 or the ring management station X is stored in the token frame destination MAC address setting information 246.

Figures 3, 4:
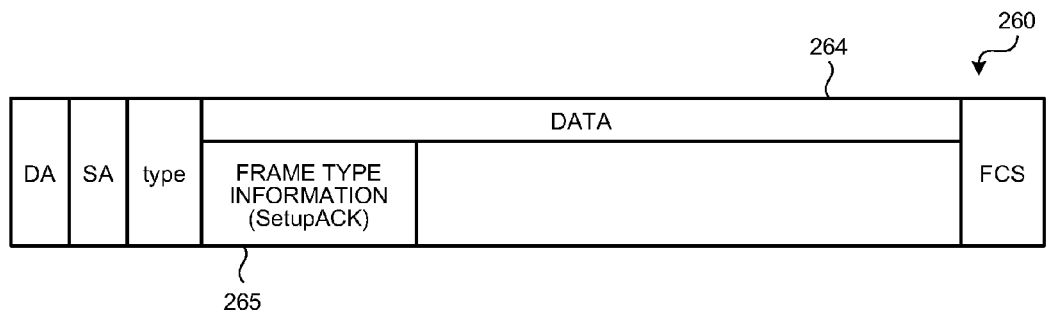

FIG. 3-4 is a diagram of an example of a format of the setup response frame. This setup response frame 260 is also an Ethernet frame. Frame type information 265 indicating that the own frame is the setup response frame 260 is stored in a part of a data 264 area. The setup response frame 260 is represented as "SetupACK".

The setup processing unit 26 can check, for example, by setting a flag indicating that the setup response frame 260 is received in the network presence information of the network-presence-information storing unit 23, whether the setup response frame 260 is received from all the communication nodes in the communication system.

When it is notified by the setup processing unit 26 that the setup response frame 260 is received from all the communication nodes in the communication system, the token-frame processing unit 27 generates a token frame according to the token circulation order information of the token-circulation-order-information storing unit 25 and transmits the token frame from all the ports 11-1 and 11-2 of the own station in broadcast.

Figures 3, 4, 5:
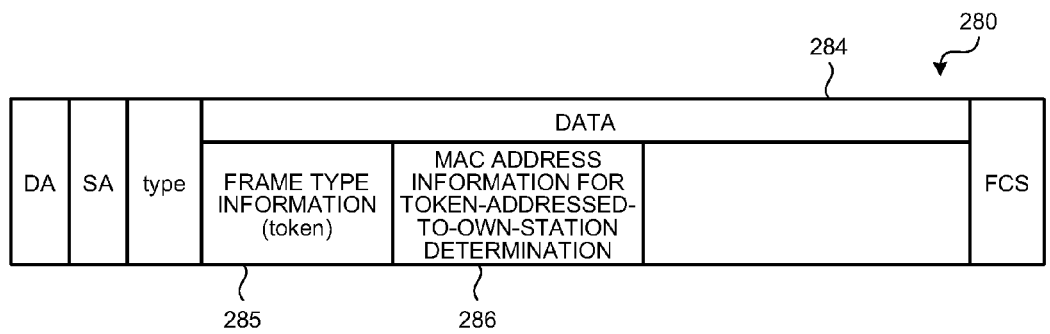

FIG. 3-5 is a diagram of an example of a format of the token frame. This token frame 280 is also an Ethernet frame. Frame type information 285 and MAC address information for token-addressed-to-own-station determination 286 are stored in a part of a data 284 area.

Information indicating that a frame is the token frame 280 is stored in the frame type information 285. In this specification, the token frame 280 is represented as "Token". A MAC address of a communication node having the transmission right is stored in the MAC address information for token-addressed-to-own-station determination 286.

When the token-frame processing unit 27 receives the token frame 280 transmitted from another communication node, the token-frame processing unit 27 compares the MAC address information for token-addressed-to-own-station determination 286 in the data 284 of the token frame 280 and a MAC address of the own station (the ring management station X). When the MAC address information for token-addressed-to-own-station determination 286 and the MAC address coincide with each other, the token-frame processing unit 27 determines that the transmission right is obtained. The transmission processing for a data frame by the data-frame-communication processing unit 28 is performed. When the MAC address information for token-addressed-to-own-station determination 286 and the MAC address do not coincide with each other, the token-frame processing unit 27 determines that the transmission right is not obtained yet. In both the cases, the received token frame 280 is transferred (repeated) from another port that is not the port where the token frame 280 is received.

The data-frame-communication processing unit 28 performs transmission and reception processing for a data frame. For example, in an FA network, the data-frame-communication processing unit 28 calculates, at a predetermined period, data set in the slave stations A to E, converts the data into a data frame, and transmits the data frame to the slave stations A to E. The data-frame-communication processing unit 28 also has a function of receiving data frames transmitted from the slave stations A to E and transferring (repeating) data frames addressed to other slave stations by the slave stations A to E.

"TestData", "TestDataACK", and the like are stored in the frame type information 205, 225, 245, 265, and 285 of the frames shown in FIGS. 3-1 to 3-5 to identify the respective frames. However, numerical values for uniquely identifying the frames can be set for the respective frames and stored in the frame type information 205, 225, 245, 265, and 285.

FIG. 2-2 is a schematic block diagram of a functional configuration of a slave station. The slave stations A to E include two ports 51-1 and 51-2 for connecting an Ethernet cable between each of the slave stations and the adjacent communication nodes (the ring management station X and the slave stations) or the switching hub 101 and a communication processing unit 60 that performs transmission and reception processing for frames via the ports 51-1 and 51-2.

As in the ring management station X, the ports 51-1 and 51-2 include two ports of a first port 51-1 and a second port 51-2. At least one port of these two ports 51-1 and 51-2 only has to be connected to a communication node.

The communication processing unit 60 includes a control-frame response unit 61, a token-circulation-destination-information storing unit 62, a token-frame processing unit 63, and a data-frame-communication processing unit 64.

The control-frame response unit 61 performs response from the ring management station X to control frames such as the network presence check frame 200 and the setup frame 240. For example, when the control-frame response unit 61 receives the network presence check frame 200, the control-frame response unit 61 generates the network presence acknowledge frame 220 shown in FIG. 3-2 and returns the network presence acknowledge frame 220 to the ring management station X. When the control-frame response unit 61 receives the setup frame 240, the control-frame response unit 61 extracts the token frame destination MAC address setting information 246 in the data 244 of the setup frame 240 and stores the token frame destination MAC address setting information 246 in the token-circulation-destination-information storing unit 62 as token circulation destination information. The control-frame response unit 61 generates the setup response frame 260 shown in FIG. 3-4 and returns the setup response frame 260 to the ring management station X. In this specification, a frame exchanged between the ring management station X and the slave stations A to E in the network presence check processing and the logical ring configuration processing is referred to as control frame. A frame transmitted by acquiring a token frame after a logical ring is configured is referred to as data frame.

The control-frame response unit 61 also has a function of, according to a frame type of a control frame received from the ring management station X or another slave station, reconfiguring and transmitting a frame or simply repeating a frame. For example, when the network presence check frame 200 is received from the ring management station X, if a transmission line is established in a port other than a port where the frame is received, the control-frame response unit 61 performs processing for rewriting the SA 202 shown in FIG. 3-1 of the received network presence check frame and transmission port information 207 of the network presence check frame of the own station in the data 204, reconfigures a network presence check frame, and outputs the network presence check frame from a port other than the reception port.

The control-frame response unit 61 has a function of, for example, when a control frame including the setup frame 240 from the ring management station X or the network presence acknowledge frame 220 and the setup response frame 260 from another slave station is received, performing no processing for the frame and simply repeating the frame.

The token-circulation-destination-information storing unit 62 stores a MAC address of a communication node that obtains the transmission right after the own communication node (slave station). As the MAC address, as explained above, contents of the token frame destination MAC address setting information 246 in the data 244 of the setup frame 240 are stored. In the first embodiment, only a MAC address of a communication node to which a token should be transmitted next is stored. Therefore, it is possible to hold down a data amount compared with the token circulation order storage information stored by the ring management station X.

When the token-frame processing unit 63 receives the token frame 280 transmitted from another communication node, the token-frame processing unit 63 compares the MAC address information for token-addressed-to-own-station determination 286 in the data 284 of the token frame 280 and a MAC address of the own station (slave station). When the MAC address information for token-addressed-to-own-station determination 286 and the MAC address coincide with each other, the token-frame processing unit 63 determines that the transmission right is obtained. Transmission processing for a data frame by the data-frame-communication processing unit 64 is performed. Thereafter, the token-frame processing unit 63 generates, in the MAC address information for token-addressed-to-own-station determination 286 in the data 284 of the token frame 280, the token frame 280 in which the token circulation destination information stored in the token-circulation-destination-information storing unit 62 is stored and transmits the token frame 280 from all the ports 51-1 and 51-2 of the own station in broadcast. On the other hand, when the MAC address information for token-addressed-to-own-station determination 286 in the data 284 of the received token frame 280 and the MAC address of the own station (slave station) do not coincide with each other, the token-frame processing unit 63 determines that the transmission right is not obtained yet. In both the cases, the received token frame 280 is repeated to another port that is not a port where the token frame 280 is received.

The data-frame-communication processing unit 64 performs transmission and reception processing for a data frame. Specifically, the data-frame-communication processing unit 64 performs transmission and reception processing for a data frame between the ring management station X and the other slave stations.

An establishing method for a logical ring in such a communication system and a communication method employing a token are explained below. FIGS. 4-1 to 4-15 are schematic diagrams of an example of an establishing method for a logical ring and a communication method employing a token according to the first embodiment.

First, as shown in FIG. 4-1, after the slave stations A to E are connected to the ring management station X by an Ethernet cable, power supplies for the slave stations A to E are turned on. In this state, the slave stations A to E wait for reception of a network presence check frame from the ring management station X.

Thereafter, when a power supply for the ring management station X is turned on, the ring management station X recognizes slave stations connected on the network of the same segment including the ring management station X and, to establish a logical ring, performs processing explained below. First, after starting the timer 21, as shown in FIG. 4-2, the network-presence-check processing unit 22 of the ring management station X generates a network presence check frame (in the figure, represented as TestDataFrame) and transmits the network presence check frame from all the ports X1 and X2 in broadcast.

FIG. 5-1 is a schematic diagram of an example of a network presence check frame transmitted from the ring management station X. In a network presence check frame transmitted from the first port X1 of the ring management station X, as indicated by "TestDataFrame(X1→all)", a broadcast address (for example, 2-byte notation, "FFFF (all F)" is set in a DA, a MAC address "100" of the ring management station X is set in an SA, "TestData" is stored in frame type information, the MAC address "100" of the own station is stored in MAC address information of a ring management station, and "port_X1" indicating the first port X1 is set in transmission port information of network presence check frame of the own station.

In a network presence check frame transmitted from the second port X2 of the ring management station X, as indicated by "TestDataFrame(X2→all)", items other than the transmission port information of a network presence check frame of the own station are the same as those of the network presence check frame "TestDataFrame(X1→all)" transmitted from the first port X1. "port_X2" indicating the second port X2 is set in transmission port information of a network presence check frame of the own station.

In this way, the network presence check frame transmitted from the first port X1 of the ring management station X is received in the second port A2 of the slave station A and the network presence check frame transmitted from the second port X2 of the ring management station X is received in the first port B1 of the slave station B.

As shown in FIG. 4-3, the control-frame response units 61 of the slave stations A and B, which receive the network presence check frame from the ring management station X, generate network presence acknowledge frames (in the figure, represented as TestDataACKFrame) and return the network presence acknowledge frame to the ring management station X.

FIG. 5-2 is a schematic diagram of an example of network presence acknowledge frames transmitted from the slave stations A and B. In the network presence acknowledge frame transmitted from the second port A2 of the slave station A, as indicated by "TestDataACKFrame(A2→X)", the MAC address "100" of the ring management station X is set in a DA, a MAC address "1" of the own station is set in an SA, and "TestDataACK" is stored in frame type information. In SA information of the received network presence check frame and port information of a station that transmits the network presence check frame, "100" and "port_X1" are respectively set with reference to the SA and the transmission port information of the network presence check frame of the own station of the received network presence check frame "TestDataFrame(X1→all)" shown in FIG. 5-1.

In a network presence acknowledge frame transmitted from the first port B1 of the slave station B, as indicated by "TestDataACKFrame(B1→X)", a MAC address "2" of the own station is set in a SA. "port_X2" is set in port information of a station that transmits the network presence check frame with reference to transmission port information of the network presence check frame of the own station of the network presence check frame "TestDataFrame(X2→all)" shown in FIG. 5-1. Otherwise, the network presence acknowledge frame is the same as "TestDataACKFrame(A2→X)".

When the slave station A that receives the network presence check frame from the ring management station X returns a network presence acknowledge frame to the ring management station X, the slave station A changes to a state of waiting for setting from the ring management station X.

As shown in FIG. 4-4, the control-frame response unit 61 of the slave station B that receives the network presence check frame from the ring management station X generates a network presence check frame (in the figure, represented as TestDataFrame(B2→all)) obtained by rewriting the network presence check frame received from the first port B1 and attempts to transmit the network presence check frame to the second port B2 of the own station other than the first port B1. As a result, when a transmission line is established in the second port B2, the network presence check frame is transmitted. When a transmission line is not established, the network presence check frame is not transmitted. Because a transmission line is established in the second port B2, the control-frame response unit 61 performs processing for transmitting the network presence check frame from the second port B2.

FIG. 5-3 is a schematic diagram of an example of the network presence check frame transmitted by the slave station B. As shown in the figure, the network presence check frame "TestDataFrame(B2→all)" is a frame obtained by rewriting the SA of the received network presence check frame "TestDataFrame(X2→all)" to the MAC address "2" of the own station and rewriting transmission port information of the network presence check frame of the own station to "port_B2".

When the slave station C receives a network presence check frame from the first port C1, as shown in FIG. 4-5, the slave station C returns a network presence acknowledge frame, which is a response to the network presence check frame, from the first port C1. Like the slave station C, when the slave station D receives a network presence check frame from the first port D1, the slave station D returns a network presence acknowledge frame, which is a response to the network presence check frame, from the port D1.

FIG. 5-4 is a schematic diagram of an example of network presence acknowledge frames transmitted from the slave stations C and D. In a network presence acknowledge frame transmitted from the first port C1 of the slave station C, as indicated by "TestDataACKFrame(C1→X)", a MAC address "3" of the own station is set in an SA, "TestDataACK" is stored in frame type information, and "100", "2", and "port_B2" are respectively set in a DA, SA information in the received network presence check frame, and port information of a station, which transmits the network frame presence check frame, with reference to the MAC address of the ring management station, the SA, and the transmission port information of the network presence check frame of the own station of the received network presence check frame "TestDataFrame(B2→all)" shown in FIG. 5-3.

A network presence acknowledge frame is transmitted from the first port D1 of the slave station D as well. As indicated by "TestDataACKFrame(D1→X)", this network presence acknowledge frame has the same contents as the network presence acknowledge frame "TestDataACKFrame (C1→X)" transmitted from the slave station C except that a MAC address "4" of the own station is set in an SA.

Thereafter, the control-frame response unit 61 of the slave station B determines frame type information of the network presence acknowledge frames received from the slave stations C and D. Because the frame type information is the network presence acknowledge frame, the control-frame response unit 61 directly repeats the network presence acknowledge frames to the ring management station X.

When the slave station C that receives the network presence check frame from the slave station B returns the network presence acknowledge frame to the ring management station X, the slave station C changes to a state of waiting for setting from the ring management station X.

Figures 2, 4:
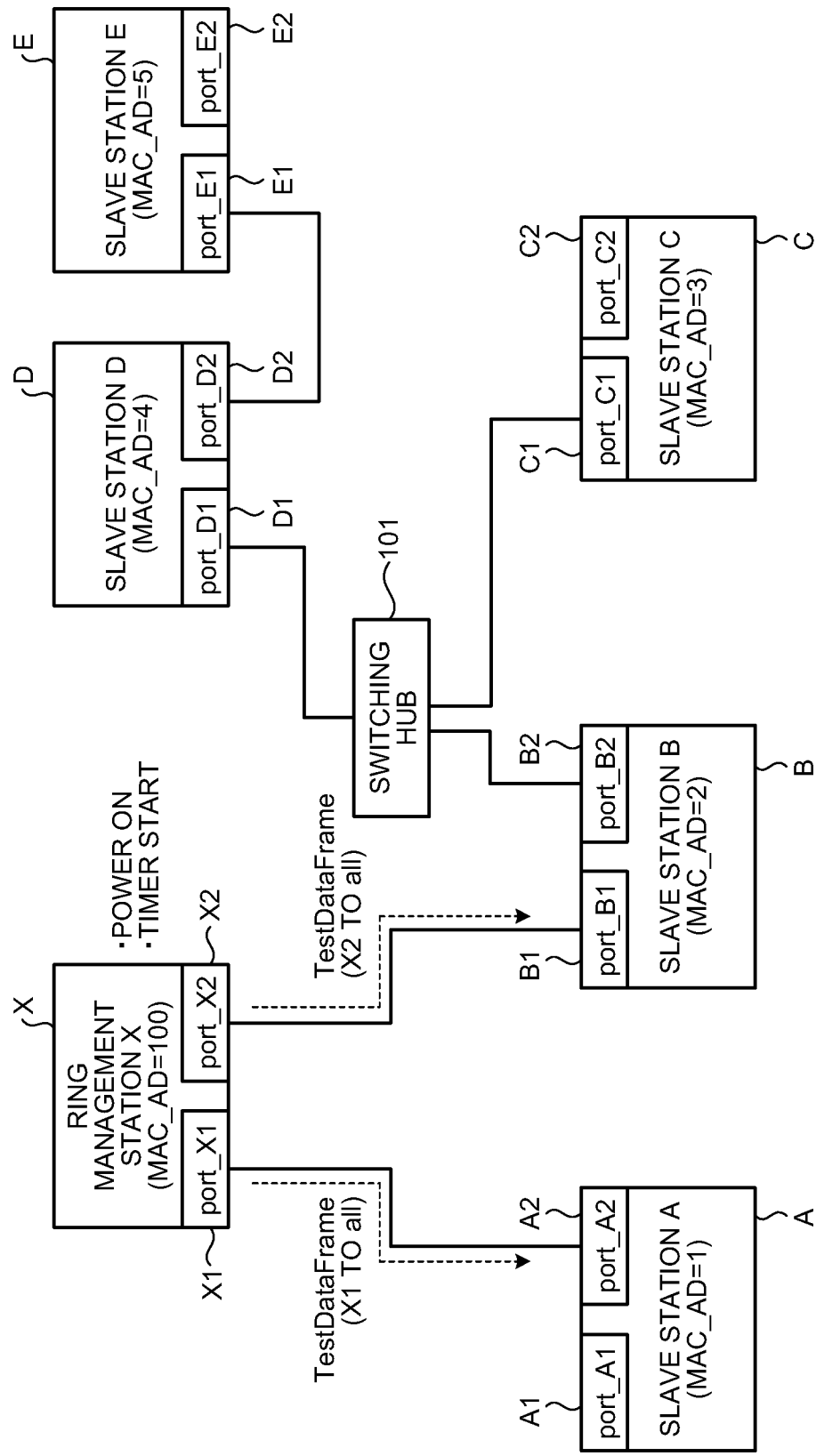
Figure 4:
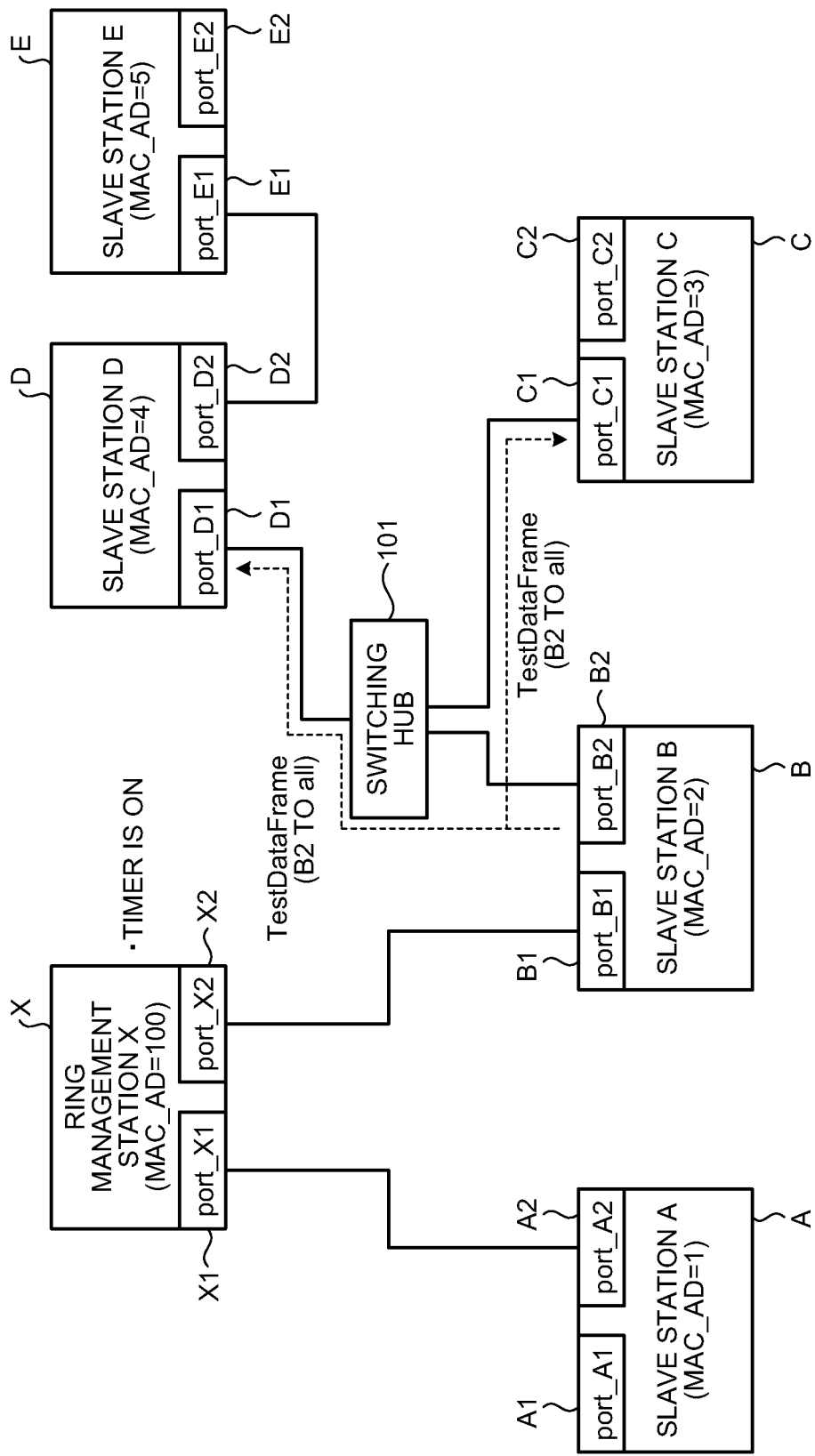
Figures 4, 5, 6, 7, 8:
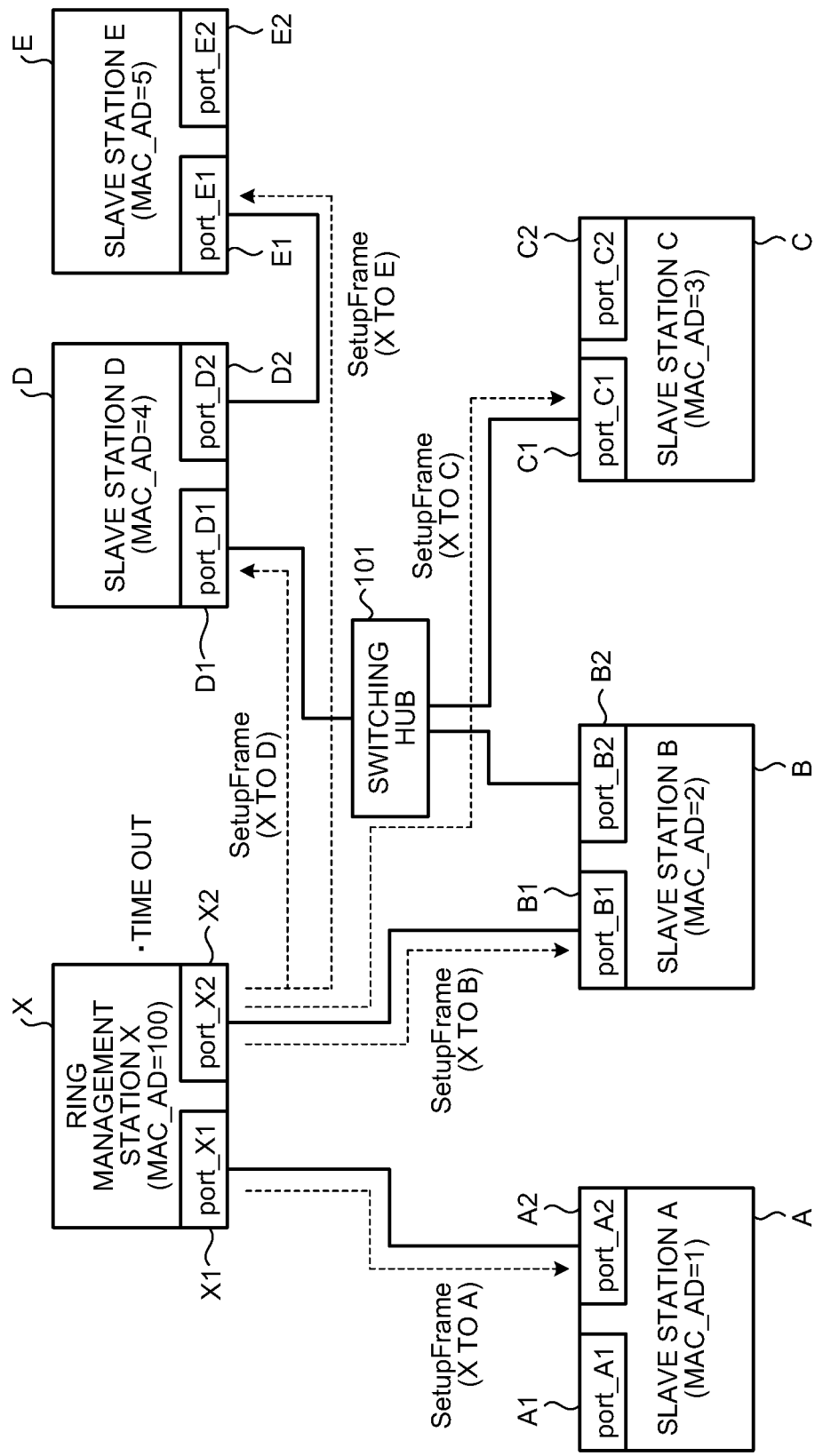

As shown in FIG. 4-6, the control-frame response unit 61 of the slave station D that receives the network presence check frame from the slave station B generates a network presence check frame (in the figure, represented as TestDataFrame(D2→all)) obtained by rewriting the network presence check frame received from the first port D1 and attempts transmission of the network presence check frame to the second port D2 of the own station other than the first port D1. As a result, when a transmission line is established in the second port D2, the network presence check frame is transmitted. When a transmission line is not established, the network presence check frame is not transmitted. Because a transmission line is established in the second port D2, the control-frame response unit 61 performs processing for outputting the network presence check frame from the second port D2.

FIG. 5-5 is a schematic diagram of an example of the network presence check frame transmitted by the slave station D. As shown in the figure, the network presence check frame "TestDataFrame(D2→all)" is a network presence check frame obtained by rewriting the SA of the received network presence check frame "TestDataFrame(B2→all)" to the MAC address "4" of the own station and rewriting the transmission port information of the network presence check frame of the own station to "port_D2".

When the slave station E receives a network presence check frame from the first port E1, as shown in FIG. 4-7, the slave station E returns a network presence acknowledge frame, which is a response to the network presence check frame, (in the figure, represented as TestDataACKFrame (E1→X)) from the first port E1.

FIG. 5-6 is a schematic diagram of an example of the network presence acknowledge frame transmitted from the slave station E. In the network presence acknowledge frame transmitted from the first port E1 of the slave station E, a MAC address "5" of the own station is set in an SA, "TestDataACK" is stored in frame type information, and "100", "4", and "port_D2" are respectively set in a DA, SA information in the received network presence check frame, and port information of a station, which transmits the network presence check frame, with reference to the MAC address of the ring management station, the SA, and the transmission port information of the network presence check frame of the own station of the received network presence check frame "TestDataFrame(D2→all)" shown in FIG. 5-5.

The control-frame response units 61 of the slave stations D and B determine frame type information of the network presence acknowledge frame transmitted from the slave station E. Because the frame type information is the network presence acknowledge frame, the control-frame response unit 61 performs processing for directly repeating the network presence acknowledge frames to the ring management station X.

When the slave station E that receives the network presence check frame from the slave station D returns the network presence acknowledge frame to the ring management station X, the slave station E changes to a state of waiting for setting from the ring management station X.

It is assumed that the network-presence-check processing unit 22 of the ring management station X receives the network presence acknowledge frames from the slave stations A to E, which are the communication nodes in the network of the same segment, during the start of the timer 21 when a network presence acknowledge frame set in FIG. 4-1 is waited.

When the network-presence-check processing unit 22 of the ring management station X receives the network presence acknowledge frames from the slave stations A to E during the start of the timer 21, the network-presence-check processing unit 22 generates network presence information from the frame and stores the network presence information in the network-presence-information storing unit 23.

FIG. 6 is a diagram of an example of network presence information generated by the ring management station X. This network presence information includes items of an SA, SA information in a received network presence check frame, and port information of a station that transmits the network presence check frame. The network-presence-check processing unit 22 of the link management station X acquires respective kinds of information from areas in which the items are defined in the received network presence acknowledge frame and stores the information in the network presence information.

Thereafter, when the timer 21 detects that the predetermined time for waiting for a network presence acknowledge frame elapses, the token-circulation-order determining unit 24 of the ring management station X performs processing for configuring a logical ring using network presence information accumulated in the network-presence-information storing unit 23 until the timer 21 times out. The ring management station X establishes a logical ring such that the number of communication nodes that a token as a transmission right passes while circulating once is, for example, minimized (when the cable 102 (including a cable in which the switching hub 101 is included between cables 102) connecting two communication nodes is referred to as transmission line, such that the number of transmission lines that a token frame passes while circulating once is, for example, minimized). As a method of determining circulation order of a token frame that satisfies such a condition, communication nodes only have to be connected by drawing with a single stroke of the brush (in such a manner as to turn around a tree) in a network belonging to the same segment. A method of determining circulation order of a token with this method of the drawing with a single stroke of the brush is explained below.

FIG. 7 is a flowchart for explaining an example of a processing procedure for determining circulation order of a token. First, the token-circulation-order determining unit 24 of the ring management station X selects a MAC address of the own station (step S11) and selects one port among ports of the own station (step S12). The token-circulation-order determining unit 24 registers a combination of the selected MAC address of the own station and the selected port in a token circulation table, which is token circulation order information, of the token-circulation-order-information storing unit 25 (step S13).

Subsequently, the token-circulation-order determining unit 24 performs a search in order to determine whether a record of a combination of "SA information in the received network presence check frame" and "port information of a station that transmits the network presence check frame", which is the same as the combination of the selected MAC address and the selected port, is present in the network presence information of the network-presence-information storing unit 23 (step S14). As a result of the search, when the record of the same combination is present (Yes at step S14), the token-circulation-order determining unit 24 registers SAs of all corresponding records in the token circulation table, which is the token circulation order information, of the token-circulation-order-information storing unit 25 such that the SAs are connected to the MAC address of the ring management station X registered at step S13 (step S15).

Thereafter, the token-circulation-order determining unit 24 selects one SA among the SAs (MAC addresses) of communication nodes registered in the token circulation table (step S16). Subsequently, the token-circulation-order determining unit 24 searches in order through the network presence information to determine whether a record having same "SA information in the received network presence check frame" as the selected SA is present, i.e., whether a lower-order communication node of the selected SA is present (step S17).

The token-circulation-order determining unit 24 determines whether a communication node is present under a communication node corresponding to the selected SA (step S18). When a communication node is present under the selected SA (Yes at step S18), the token-circulation-order determining unit 24 registers an SA of a record corresponding to the lower-order communication node in the token circulation table such that the SA is connected to the SA of the communication node (the slave station) selected at step S16 (step S19).

Subsequently, the token-circulation-order determining unit 24 selects one SA among the SAs registered at step S19 (step S20) and searches in order through the network presence information to determine whether a record having same "SA information in the received network presence check frame" as the selected SA is present, i.e., whether a communication node under a communication node corresponding to the selected SA is present (step S21). Thereafter, the token-circulation-order determining unit 24 returns to step S18 and repeatedly performs the processing at steps S18 to S21 until the processing reaches a lowest-order communication node in one branch selected out of branches branching in order from the ring management station X in a tree-like network structure.

When the processing reaches a lowest-order communication node of a certain branch in the tree-like network configuration, a lower-order communication node is not present in the processing for searching for a lower-order communication node of the selected SA at step S21. Therefore, when a lower-order communication node is not present in the selected SA at step S18 (No at step S18), the processing shifts.

In this case, the token-circulation-order determining unit 24 determines whether another unsearched SA of the same level as an SA selected last at step S16 or S20 is present (step S22). The level means, when SAs are connected in a tree shape from the ring management station X, the number of communication nodes in a path leading from the ring management station X to a certain SA.

When another unsearched SA at the same level as the SA selected last is present (Yes at step S22), the token-circulation-order determining unit 24 selects another SA registered in the token circulation table of the same level as the SA selected last (step S23). Subsequently, the token-circulation-order determining unit 24 searches in order through the network presence information to determine whether a record having same "SA information in the received network presence check frame" as the selected SA is present, i.e., whether a lower-order communication node of the selected SA is present (step S24). Thereafter, the token-circulation-order determining unit 24 returns to step S18.

On the other hand, when another unsearched SA of the same level as the SA selected last is not present (No at step S22), the token-circulation-order determining unit 24 returns to an SA of a higher level nearest to the SA selected last (step S25). Thereafter, the token-circulation-order determining unit 24 determines whether the SA to which the token-circulation-order determining unit 24 returns is an SA of a highest level, i.e., whether the SA is the MAC address of the ring management station X (step S26). When the SA to which the token-circulation-order determining unit 24 returns is not the SA of the highest level (No at step S26), the token-circulation-order determining unit 24 determines whether an unsearched SA registered in the token circulation level of the same level as the SA to which the token-circulation-order determining unit 24 returns is present (step S27).

When an unsearched SA registered in the token circulation table of the same level as the SA to which the token-circulation-order determining unit 24 returns is present (Yes at step S27), the token-circulation-order determining unit 24 selects another unsearched SA registered in the token circulation table of the same level as the SA to which the token-circulation-order determining unit 24 returns (step S28). Subsequently, the token-circulation-order determining unit 24 searches in order through the network presence information to determine whether a record having same "SA information in the received network presence check frame" as the selected SA is present, i.e., whether a lower-order communication node of the selected SA is present (step S29). Thereafter, the token-circulation-order determining unit 24 returns to step S18.

When an unsearched SA registered in the token circulation table of the same level as the SA to which the token-circulation-order determining unit 24 returns is not present at step S27 (No at step S27), the token-circulation-order determining unit 24 returns to step S25.

According to the execution of the processing explained above, all communication nodes connected to the port selected at step S12 of the ring management station having the MAC address selected at step S11 are extracted in a tree shape.

When a record of a combination of "SA information in the received network presence check frame" and "port information of a station that transmits the network presence check frame", which is the same as the combination of the selected MAC address and the selected port, is not present in the network presence information at step S14 (No at step S14) or when the SA to which the token-circulation-order determining unit 24 returns is the highest-order level at step S26 (Yes at step S26), the token-circulation-order determining unit 24 determines whether there is an unsearched port of the ring management station X (step S30). When there is an unsearched port (Yes at step S30), the token-circulation-order determining unit 24 returns to step S12. The processing explained above is performed concerning the unsearched port of the ring management station X. When there is no unsearched port (No at step S30), because the registration processing in the token circulation table is performed concerning all the communication nodes, the processing for determining a circulation order of a token ends.

According to the processing explained above, in the network configuration in which the communication nodes are connected in a tree shape while branching from the ring management station X, when a path leading from the ring management station X to a lowest-order communication node immediately under the ring management station X is established, the token-circulation-order determining unit 24 returns to a communication node branching in a position closest to the lowest-order communication node and establishes a path leading from the position to another lowest-order communication node. The token-circulation-order determining unit 24 repeats such processing in order and establishes paths leading to all the lowest-order communication node. Consequently, in the network including the communication nodes connected in a tree shape, the communication nodes can be connected by the method of drawing with a single stroke of the brush. The number of communication nodes that a token as a transmission right passes is minimized in a path starting from the ring management station X established in this way and returning to the ring management station X.

Figures 4, 5, 6, 7, 8, 9:
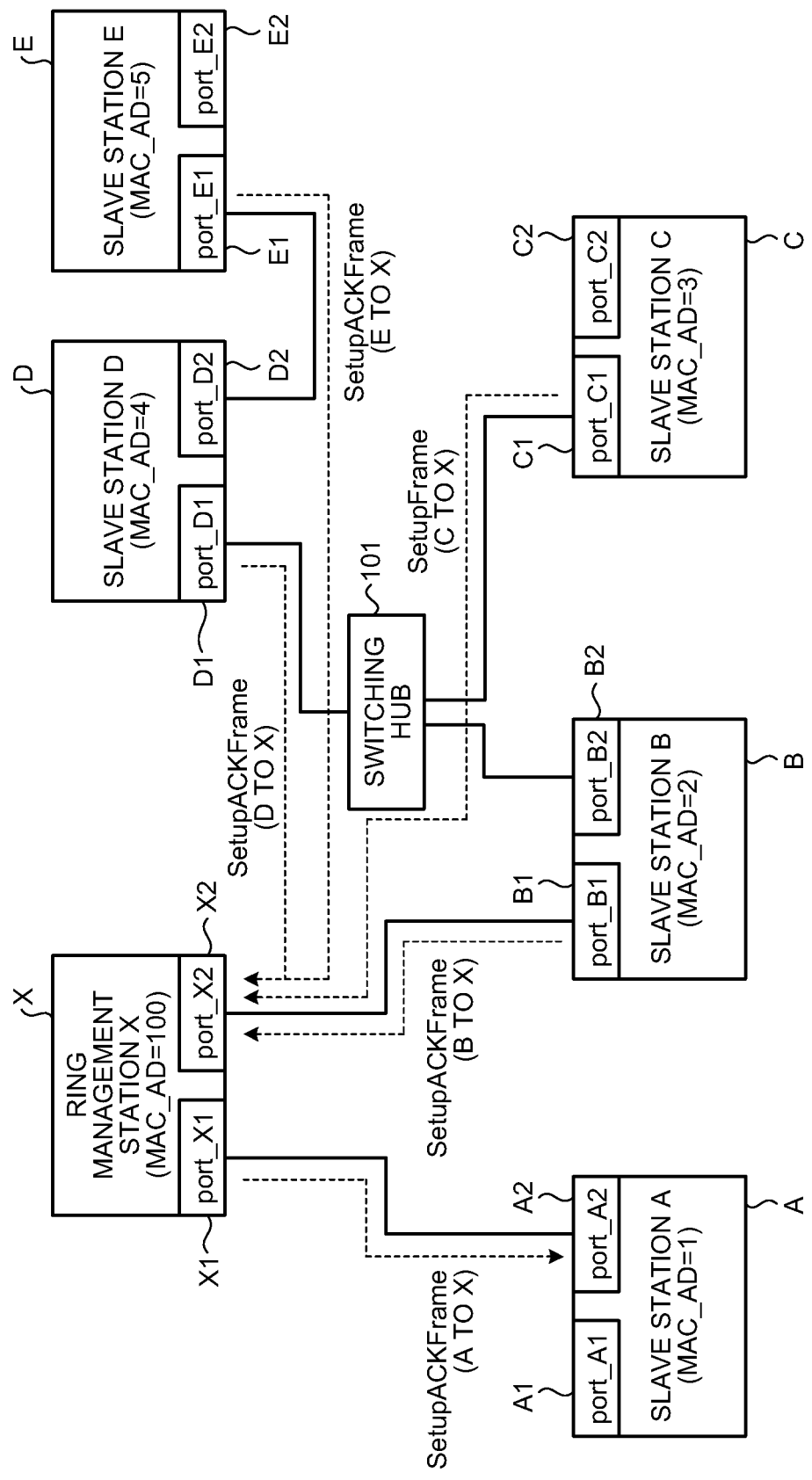

Specific processing for determining circulation order of a token shown in FIG. 7 is explained with reference to an example in which the circulation order is determined using the network presence information shown in FIG. 6. FIGS. 8-1 to 8-9 are schematic diagrams of an example of a creating process for a token circulation table.

First, the ring management station X selects the MAC address "100" of the own station and the second port "port_X2" (steps S11 to S12). As shown in FIG. 8-1, the ring management station X registers the selected MAC address and port "100 (port_X2)" of the own station in the token circulation table (step S13). Thereafter, the ring management station X performs search to determine whether a record, "SA information in a received network presence check frame" of which is "100" and "port information of a station that transmits the network presence check frame" of which is "port_X2", is present in the network presence information shown in FIG. 6. As a result, the ring management station X extracts a record 302.

Because an SA of this record 302 is "2 (the slave station B)", the ring management station X registers this SA "2" in the token circulation table (step S15). As shown in FIG. 8-2, a state in which the SA "2" is registered on the right side of the MAC address "100 (port_X2)" and connected by an arrow extending from the MAC address "100 (port_X2)" to the SA "2". The direction of the arrow indicates a lower-order level.

Thereafter, the ring management station X selects this SA "2" in the token circulation table (step S16) and performs search to determine whether a record, "SA information in a received network presence check frame" of which is "2", is present in the network presence information shown in FIG. 6 (step S17). As a result, the ring management station X extracts records 303 and 304. Because SAs of these records 303 and 304 are respectively "3 (the slave station C)" and "4 (the slave station D)", as shown in FIG. 8-3, the SA "3" and the SA "4" are registered to be arranged in parallel under the SA "2" of the token circulation table (step S19).

Subsequently, the ring management station X selects the SA "3" among the registered SAs (step S20) and performs search to determine whether a record, "SA information in a received network presence check frame" of which is "3", is present in the network presence information shown in FIG. 6 (step S21). However, because a relevant record is not present in the network presence information shown in FIG. 6, the record is not extracted (No at step S18). In other words, a communication node is not present under the SA "3". As shown in FIG. 8-4, "none" is described under the SA "3" of the token circulation table for convenience.

Subsequently, the ring management station X selects the SA "4" as another unsearched SA of the same level as the SA "3" (steps S22 to S23). The ring management station X performs search to determine whether a record, "SA information in a received network presence check frame" of which is "4", is present in the network presence information shown in FIG. 6 (step S24). As a result, the ring management station X extracts a record 305. Because an SA of this record 305 is "5 (the slave station E)", as shown in FIG. 8-5, the ring management station X registers this SA "5" under the SA "4" (step S19).

Thereafter, the ring management station X selects the registered SA "5" (step S20) and performs search to determine whether a record, "SA information in a received network presence check frame" of which is "5", is present in the network presence information shown in FIG. 6 (step S21). However, because a relevant record is not present in the network presence information shown in FIG. 6, the record is not extracted (No at step S18). In other words, no node is present under the SA "5". As shown in FIG. 8-6, "none" is described under the SA "5" of the token circulation table for convenience.

Because another unsearched SA of the same level as the SA "5" is not present (No at step S22), the ring management station X returns to the SA "4", which is the nearest SA of the higher level (step S25). Because this SA "4" is not the highest level (No at step S26) and another unsearched SA registered in the token circulation table at the same level as the SA "4" is not present (No at step S27), the ring management station X returns to the SA "2", which is the higher level nearest to the SA "4" (step S25).

However, because the SA "2" is not the highest level (No at step S26) and another unsearched SA registered in the token circulation table at the same level as the SA "2" is not present (No at step S27), the ring management station X returns to the MAC address "100", which is the higher level nearest to the SA "2" (step S25).

Because the MAC address "100" is the highest level (Yes at step S26), the ring management station X checks whether an unsearched port is present in the ring management station X (step S30). Because the first port "port_X1" is unsearched, the ring management station X selects the first port "port_X1" (step S12). As shown in FIG. 8-7, the ring management station X registers the MAC address and port "100 (port_X1)" of the own station in the token circulation table (step S13). The MAC address and first port "100 (port_X1)" of the ring management station X is arranged in parallel to the MAC address and second port "100 (port_X2)". Thereafter, the ring management station X performs search to determine whether a record, "SA information in a received network presence check frame" of which is "100" and "port information of a station that transmits the network presence check frame" of which is "port_X1", is present in the network presence information shown in FIG. 6. As a result, the ring management station X extracts the record 301.

Because an SA of this record 301 is "1 (the slave station A)", the ring management station X registers this SA "1" in the token circulation table (step S15). As shown in FIG. 8-8, the SA "1" is registered under the MAC address "100 (port_X1)".

Thereafter, the ring management station X selects this SA "1" (step S16) and performs search to determine whether a record, "SA information in a received network presence check frame" of which is "1", is present in the network presence information shown in FIG. 6 (step S17). However, because a relevant record is not present in the network presence information shown in FIG. 6, the record is not extracted (No at step S18). In other words, a node is not present under the SA "1". As shown in FIG. 8-9, "none" is described under the SA "1" of the token circulation table for convenience.

Because another unsearched SA of the same level as the SA "1" is not present (No at step S22), the ring management station X returns to the MAC address "100", which is a nearest SA of a higher level (step S25). Because the MAC address "100" is the highest level (Yes at step S26), the ring management station X checks whether an unsearched port is present in the ring management station X (step S30). Because search is already performed concerning all the ports as explained above (No at step S30), the processing for determining circulation order of a token ends. As a result, a token circulation table shown in FIG. 8-9 is obtained. From FIG. 8-9, for example, token circulation order indicated by (A) below is obtained.

Ring management station X→slave station B→slave station C→slave station D→slave station E→slave station A→ring management station X (A)

In FIG. 8-9, a token frame can be circulated from either the first port X1 or the second port X2 of the ring management station X. Therefore, token circulation order indicated by (B) below can be adopted.

Ring management station X→slave station A→slave station B→slave station C→slave station D→slave station E→ring management station X (B)

Further, in the tree structure connected to the first port X1 of the ring management station X, whichever of branching portions can be set first. Therefore, token circulation order indicated by (C) and token calculation order indicated by (D) can be adopted.

Ring management station X→slave station B→slave station D→slave station E→slave station C→slave station A→ring management station X (C)

Ring management station X→slave station A→slave station B→slave station D→slave station E→slave station C→ring management station X (D)

The token circulation order (A) to the token circulation order (D) can be drawn with a single stroke of the brush. In the path starting from the ring management station X and returning to the ring management station X, the number of communication nodes that a token frame passes (the number of times the token frame is propagated through the transmission lines among the communication nodes) is nine, which is the minimum number. In this way, the number of transmission lines through which the token frame is propagated while being circulated once is minimized, whereby circulation efficiency of the token frame is improved and wasteful communication can be suppressed. This contributes to energy saving.

The token circulation table created as explained above is stored in the token-circulation-order-information storing unit 25 as token circulation order information. Processing for establishing a logical ring in the communication system is performed based on this determined token circulation order.

Thereafter, the setup processing unit 26 of the ring management station X generates, using the token circulation table stored in the token-circulation-order-information storing unit 25, a setup frame for notifying circulation information of the transmission right of the communication nodes.

FIG. 5-7 is a schematic diagram of an example of a setup frame transmitted from the ring management station X to the slave stations. For example, in a setup frame transmitted to the slave station B, as indicated by "SetupFrame(X→B)", the MAC address "2" of the slave station B, which is a setting target, is set in a DA, the MAC address "100" of the own station is set in an SA, "Setup" is stored in frame type information, and the MAC address "3" of the slave station C, which is a communication node to which a token frame is transmitted after the slave station B, is set in token frame destination MAC address setting information. Setup frames transmitted to the other slave stations A and C to E are generated in the same manner.

As shown in FIG. 4-8, the setup processing unit 26 of the ring management station X transmits the created setup frame to the slave stations A to E via the first and second ports X1 and X2. The slave station B repeats the setup frame addressed to the slave stations C, D, and E. The slave station D repeats the setup frame addressed to the slave station E.

When the slave stations A to E receive the setup frame from the ring management station X, the control-frame response units 61 of the slave stations A to E read out a MAC address stored in "token frame destination MAC address setting information" in the setup frame and store the MAC address in the token-circulation-destination-information storing units 62 as token circulation destination information. In this way, in the first embodiment, the slave stations A to E store, as the token circulation destination information, only a MAC address of a communication node to which a token should be transmitted next. Therefore, information for circulating a token frame is minimized compared with the time when all the slave stations A to E store, in common, the token circulation table that is information concerning circulation order of all token frames.

After storing the token circulation destination information in the token-circulation-destination-information storing units 62, the control-frame response units 61 of the slave stations A to E generate setup response frames (in the figure, represented as SetupACK), which are responses to the setup frame. As shown in FIG. 4-9, the control-frame response units 61 transmit the setup response frames to the ring management station X. The slave station D repeats the setup response frame from the slave station E. The slave station B repeats the setup response frames from the slave stations C, D, and E.

FIG. 5-8 is a schematic diagram of an example of setup response frames transmitted from the slave stations. For example, in a setup response frame transmitted from the slave station A to the ring management station X, as indicated by "SetupACKFrame(A→X)", the MAC address "100" of the ring management station X is set in a DA, the MAC address "1" of the own station is set in an SA, and "SetupACK" is stored in frame type information. Setup response frames transmitted from the other slave stations B to E are generated in the same manner.

After the control-frame response units 61 of the slave stations A to E transmit the generated setup response frames to the ring management station X, the token-frame processing units 63 start observation of a token frame flowing on the transmission lines.

Thereafter, the ring management station X receives the setup response frames from the slave stations A to E and recognizes that the setup frame generated by the ring management station X normally reaches the slave stations A to E. When the setup response frames reach the ring management station X from not all of the slave stations A to E within a predetermined time, the setup processing unit 26 of the ring management station X transmits the setup frame to the slave stations from which the setup response frames are not received or all the slave stations again. Alternatively, the setup processing unit 26 determines that the power supplies for the slave stations are turned off during setup and performs the processing from the beginning in FIG. 4-1. Further, when the setup processing unit 26 is caused to operate in this way, the setup processing unit 26 starts the timer 21 during the transmission of the setup frame and counts the predetermined time. It is assumed that the setup response frames are received from all the slave stations A to E.

Subsequently, when the token-frame processing unit 27 of the ring management station X recognizes that the setup response frames are received from all the slave stations A to E in the communication system, the token-frame processing unit 27 recognizes from the token circulation order information that the own station has the transmission right. The data-frame-communication processing unit 28 transmits a data frame to the slave stations A to E.

Thereafter, the token-frame processing unit 27 of the ring management station X generates the token frame 280 according to the token circulation table of the token-circulation-order-information storing unit 25. The token-frame processing unit 27 generates, according to FIG. 8-9, a token frame for giving the transmission right to the slave station B.

FIG. 5-9 is a schematic diagram of an example of token frames generated by the communication nodes. As indicated by "TokenFrame(X→B)" of this figure, a broadcast address is set in a DA, the MAC address "100" of the own station is set in an SA, "token" is set in frame type information, and the MAC address "2" of the slave station B, which is a communication node that should acquire the next transmission right, is stored in MAC address information for token-addressed-to-own-station determination.

Thereafter, as shown in FIG. 4-10, the token-frame processing unit 27 of the ring management station X transmits the generated token frame from the first and second ports X1 and X2. Because the token frame is transmitted in broadcast, the token frame is transmitted to all the slave stations A to E in the communication system. The slave stations A to E have a function of repeating the token frame when the token frame is received. In this figure, for convenience of explanation, the token frame is drawn to be simultaneously transmitted to all the slave stations. However, actually, the token frame is repeated to the slave stations C and D by the slave station B and repeated to the slave station E by the slave station D.

When the token-frame processing units 63 of the slave stations A to E receive the token frame, the token-frame processing units 63 compare a MAC address stored in "MAC address information for token-addressed-to-own-station determination" in a data area of the token frame and MAC addresses of the own stations. The token-frame processing units 63 of the slave stations A and C to E determine that the transmission right cannot be acquired because a MAC address (2) stored in the "MAC address information for token-addressed-to-own-station determination" and the MAC addresses of the own stations (1 and 3 to 5) do not coincide with each other. On the other hand, the token-frame processing unit 63 of the slave station B determines that the transmission right is acquired because the MAC address (2) stored in the "MAC address information for token-addressed-to-own-station determination" and the MAC address (2) of the own station coincide with each other. The data-frame-communication processing unit 64 of the slave station B transmits data to a predetermined destination (e.g., the ring management station X). Thereafter, the token-frame processing unit 63 performs preparation for transmitting the token frame to pass the transmission right to the next communication node.

The token-frame processing unit 63 of the slave station B acquires token circulation destination information, i.e., a MAC address "3" of the slave station C, which obtains the transmission right after the own station, from the token-circulation-destination-information storing unit 62. As indicated by "TokenFrame(B→C)" of FIG. 5-9, the token-frame processing unit 63 sets acquired "3" in the "MAC address for token-addressed-to-own-station determination information" of the data area of the token frame and sets the MAC address "2" of the own station in the SA.

Thereafter, as shown in FIG. 4-11, the token-frame processing unit 63 of the slave station B issues a token frame from all the output ports (the first and second ports B1 and B2). Because the token frame is transmitted in broadcast, the token frame is transmitted to all the communication nodes in the communication system. The token-frame processing units 27 and 63 of the ring management station X and the slave stations A and C to E have a function of repeating the token frame when the token frame is received.

The ring management station X and the slave stations A, D, and E compare the MAC address (3) stored in "MAC address information for token-addressed-to-own-station determination" in a data area of the received token frame and MAC addresses of the own stations (100, 1, 4, and 5). Because the MAC address (3) and the MAC addresses of the own stations do not coincide with each other, the ring management station X and the slave stations A, D, and E determine that the transmission right cannot be acquired. On the other hand, the slave station C determines that the transmission right is acquired because the MAC address (3) and a MAC address of the own station coincide with each other. After transmitting data to a predetermined destination, the slave station C performs preparation for transmitting the token frame to pass the transmission right to the next communication node.

Thereafter, the token frame is transmitted to the communication nodes in order in the same manner as the processing explained above according to the token circulation table shown in FIG. 8-9. Specifically, the slave station C generates a token frame indicated by "TokenFrame(C→D)" of FIG. 5-9 and transmits the token frame in the communication system in broadcast as shown in FIG. 4-12. Consequently, the slave station D acquires the transmission right. The slave station D generates a token frame indicated by "TokenFrame(D→E)" of FIG. 5-9 and transmits the token frame in the communication system in broadcast as shown in FIG. 4-13. The slave station E acquires the transmission right. The slave station E generates a token frame indicated by "TokenFrame(E→A)" of FIG. 5-9 and transmits the token frame in the communication system in broadcast as shown in FIG. 4-14. The slave station A acquires the transmission right. The slave station A generates a token frame indicated by "TokenFrame (A→X)" of FIG. 5-9 and transmits the token frame in the communication system in broadcast as shown in FIG. 4-15. The ring management station X acquires the transmission right.

Because the token-frame processing unit 63 of the slave station A recognizes that a communication node is not connected to the first port A1 via a transmission line, the token-frame processing unit 63 issues a token frame from the second port A2. Because the token-frame processing units 63 of the slave stations C and E recognize that communication nodes are not connected to the second ports C2 and E2 via transmission lines, the token-frame processing units 63 issue token frames from the first ports C1 and E1.

Such processing is repeatedly performed. A token frame is circulated among the communication nodes in the network of the same segment according to token circulation order. A communication node that receives the token frame obtains the transmission right for data and transmits the data to a desired destination. As explained above, the establishing method for a logical ring and the communication method employing a token are performed.

According to the first embodiment, in the communication system in which the communication nodes are connected in a star shape or a line shape by the Ethernet, order for circulating a token frame for obtaining the transmission right is determined by the method of drawing with a single stroke of the brush. Therefore, it is possible to minimize the number of communication nodes (or the number of transmission lines) that the token frame passes. As a result, there is an effect that it is possible to efficiently circulate the token frame.

After establishing a logical ring, the ring management station X notifies each of the communication nodes (the slave stations A to E) in the communication system of only a MAC address of a communication node that acquires the transmission right after the communication node. Therefore, the communication nodes have only minimum information necessary for circulating the token frame. As a result, compared with the time when the slave stations A to E store all circulation orders of the token frame in the communication system, it is possible to increase the speed of processing for circulating the token frame and it is possible to reduce the capacity of a memory for storing token circulation destination information. Therefore, it is possible to reduce manufacturing cost for the apparatus.

Further, after establishing the logical ring, when responses to a setup frame transmitted to the communication nodes (the slave stations A to E) in the communication system are returned from all the communication nodes, the ring management station X issues a token frame. Therefore, there is also an effect that is it possible to recognize that the logical ring is lost because of a reason such as power-off of the communication nodes (the slave stations A to E) after the logical ring is established and before the token frame is issued.

Second Embodiment

In a second embodiment, a method of establishing a logical ring when a communication node is added anew in a communication system that circulates a token frame and performs transmission of data (a frame) is explained.

The ring management station X in the second embodiment basically has a same configuration as that shown in FIG. 2-1 in the first embodiment. Therefore, explanation of the configuration is omitted. However, the token-frame processing unit 27 further has a function of counting the number of times the own station acquires a token frame and, when the number of times reaches a predetermined number of times set in advance, causing the network-presence-check processing unit 22 to execute network presence check processing.

The setup processing unit 26 further has a function of creating a setup frame and transmitting the setup frame to only a communication node (a slave station) for which token circulation order stored in the token-circulation-order-information storing unit 25 changes before and after the network presence check processing.

Slave stations in the second embodiment basically have a same configuration as that shown in FIG. 2-2 in the first embodiment. Therefore, explanation of the configuration is omitted. However, the control-frame response unit 61 further has a function of, when token circulation destination information is stored in the token-circulation-destination-information storing unit 62, not returning a network presence acknowledge frame when the network presence check frame is received from the ring management station X.

The method of establishing a logical ring according to the second embodiment is explained below. FIGS. 9-1 to 9-11 are diagrams of an example of a processing procedure of the method of establishing a logical ring when a slave station is added anew to the communication system. In the example explained below, a slave station F is connected to the second port C2 of the slave station C in the network configuration shown in FIG. 1 in the first embodiment.

First, when the ring management station X starts issuance of a token frame in FIG. 4-10 in the first embodiment, the token-frame processing unit 27 starts counting of the number of times a token (a transmission right) is acquired. As explained in the first embodiment, the token frame is circulated in order among the communication nodes in the communication system. In FIG. 9-1, it is assumed that the ring management station X acquires the token a predetermined number of times (e.g., ten times).

The token-frame processing unit 27 of the ring management station X notifies the network-presence-check processing unit 22 that the token frame is acquired the predetermined number of times. As shown in FIG. 9-2, the network-presence-check processing unit 22 generates a network presence check frame and transmits the network presence check frame to the communication nodes (the slave stations A to E) in the communication system in broadcast as explained in the first embodiment. At the same time, the network-presence-check processing unit 22 starts the timer 21 set to a predetermined time to wait for the network presence acknowledge frame. As explained in the first embodiment, when the slave stations B and D receive the network presence check frame, the slave stations B and D reconfigure and transmit the network presence check frame.

The slave stations A to E in the communication system receives the network presence check frame broadcasted from the ring management station X. However, in a state in which this network presence check frame is received, the token circulation destination information is stored in the token-circulation-destination-information storing unit 62 of the slave stations A to E. Therefore, as shown in FIG. 9-3, the control-frame response units 61 of the slave stations A to E do not respond to the network presence check frame.

At a point when the ring management station X transmits the network presence check frame, a new communication node is not connected to the communication system. Therefore, while the timer 21 set by the network-presence-check processing unit 22 of the ring management station X counts the predetermined time, the ring management station X does not receive the network presence acknowledge frame.

When the timer 21 times out, because there is no change in the network presence information stored in the network-presence-information storing unit 23, the token-circulation-order determining unit 24 of the ring management station X does not perform processing for determining token circulation order. Because there is no change in the token circulation order as well, the setup processing unit 26 does not perform transmission processing for a setup frame. The token-frame processing unit 27 notifies the data-frame-communication processing unit 28 that the transmission right is present in the own station. The data-frame-communication processing unit 28 performs processing for transmitting data of the own station to the other communication nodes (the slave stations A to E) in the communication system. At this point, the token-frame processing unit 27 resets the number of times of acquisition of the token frame and starts counting of the number of times of acquisition of the token frame again.

Subsequently, as shown in FIG. 9-4, the token-frame processing unit 27 generates a token frame according to the token circulation order information to pass the transmission right to the slave station B and transmits the token frame from the first and second ports X1 and X2 in broadcast. Thereafter, as explained in the first embodiment, the transmission right is given in order to the slave stations A to E according to the token circulation destination information and is given to the ring management station X in the communication system according to the token circulation order information. Transmission processing for data (a frame) is performed from the communication nodes that acquire the transmission right.

At this point, as shown in FIG. 9-5, it is assumed that the slave station F is connected anew to the second port C2 of the slave station C via the cable 102. A MAC address of this slave station F is "6". Like the other slave stations A to E, the slave station F includes first and second ports F1 and F2.

When a power supply is turned on, this slave station F changes to a state of waiting for a network presence check frame from the ring management station X. Information concerning a token circulation destination that is a next transmission destination of a token frame is not stored in the token-circulation-destination-information storing unit 62. Therefore, in this state, transmission and reception of data in the communication system is not performed. In the communication system, a token frame and data (a frame) are transmitted and received between the ring management station X and the slave stations A to E.

Thereafter, when the token frame is circulated and, as shown in FIG. 9-6, the token frame is acquired a predetermined number of times (e.g., ten times) in the ring management station X, the token-frame processing unit 27 of the ring management station X notifies the network-presence-check processing unit 22 that the token frame is acquired the predetermined number of times. As shown in FIG. 9-7, the network-presence-check processing unit 22 generates a network presence check frame and transmits the network presence check frame to the communication nodes (the slave stations A to F) in the communication system in broadcast. At the same time, the network-presence-check processing unit 22 starts the timer 21 set to the predetermined time to wait for the network presence acknowledge frame.

As explained in FIG. 9-3, even if the slave stations A to E in the communication system receive the network presence check frame from the ring management station X, the token circulation destination information is stored in the token-circulation-destination-information storing units 62 of the slave stations A to E at the time of the reception of the network presence check frame. Therefore, as shown in FIG. 9-8, the control-frame response units 61 of the slave stations A to E do not respond to the network presence check frame.

On the other hand, the token circulation destination information is not stored in the token-circulation-destination-information storing unit 62 of the slave station F connected anew. Therefore, when the control-frame response unit 61 receives the network presence check frame from the ring management station X, the control-frame response unit 61 generates a network presence acknowledge frame, which is a response to the network presence check frame. As shown in FIG. 9-8, the control-frame response unit 61 transmits the generated network presence acknowledge frame (in the figure, represented as TestDataACKFrame (F1→X)) from the first port F1 to the ring management station X. In FIG. 9-8, the slave stations C and B relay the network presence acknowledge frame transmitted by the slave station F.

Figures 4, 5, 6, 7, 8, 9, 10:
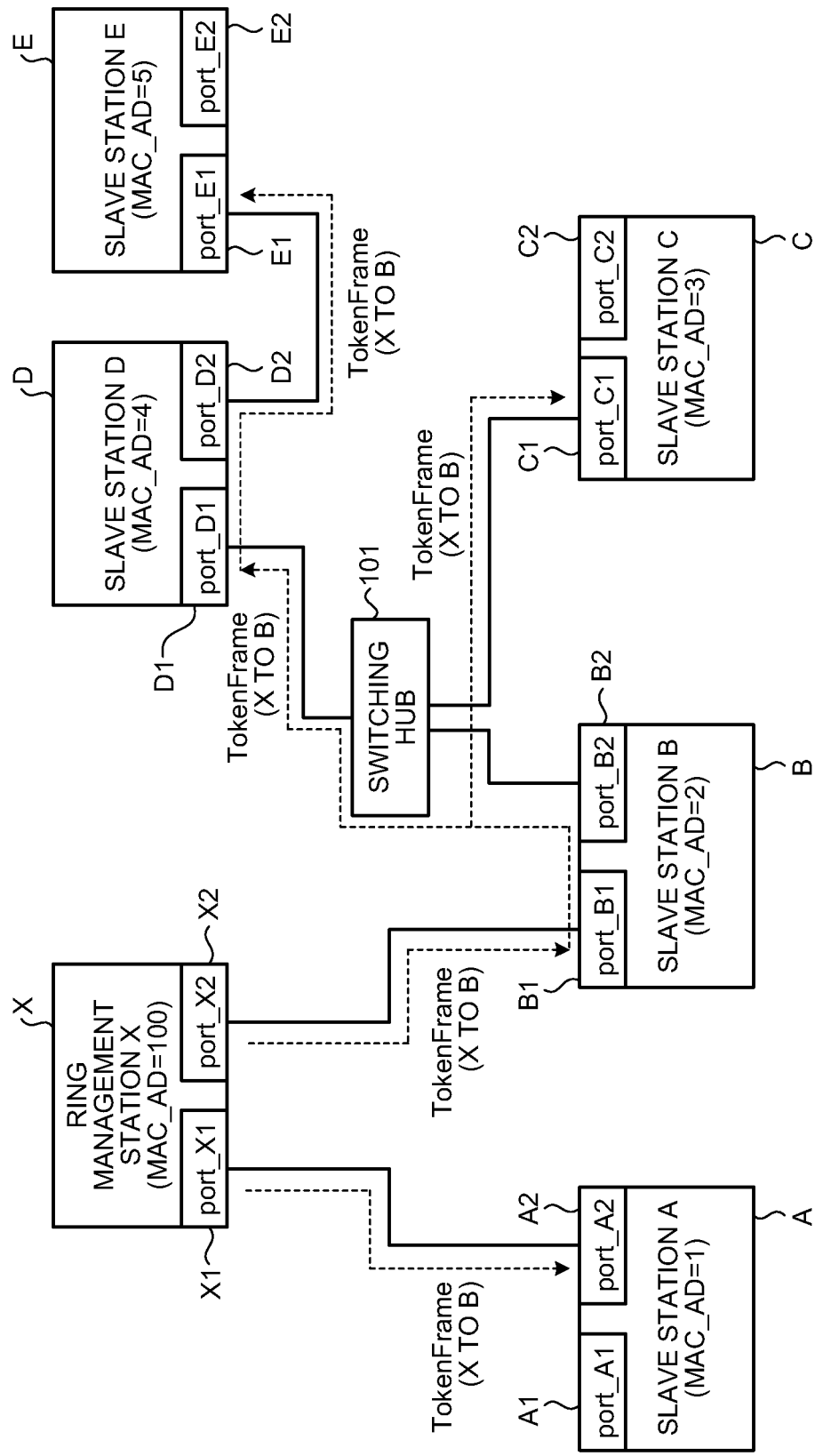

FIG. 10 is a schematic diagram of an example of the network presence acknowledge frame transmitted from the slave station F. In the network presence acknowledge frame transmitted from the first port F1 of the slave station F, the MAC address "100" of the ring management station X is set in a DA, the MAC address "6" of the own station is set in an SA, "TestDataACK" is stored in frame type information, and "3" and "port_C2" are respectively set in SA information of the received network presence check frame and port information of a station that transmits the network presence check frame.

Figures 4, 5, 6, 7, 8, 9, 10, 11:
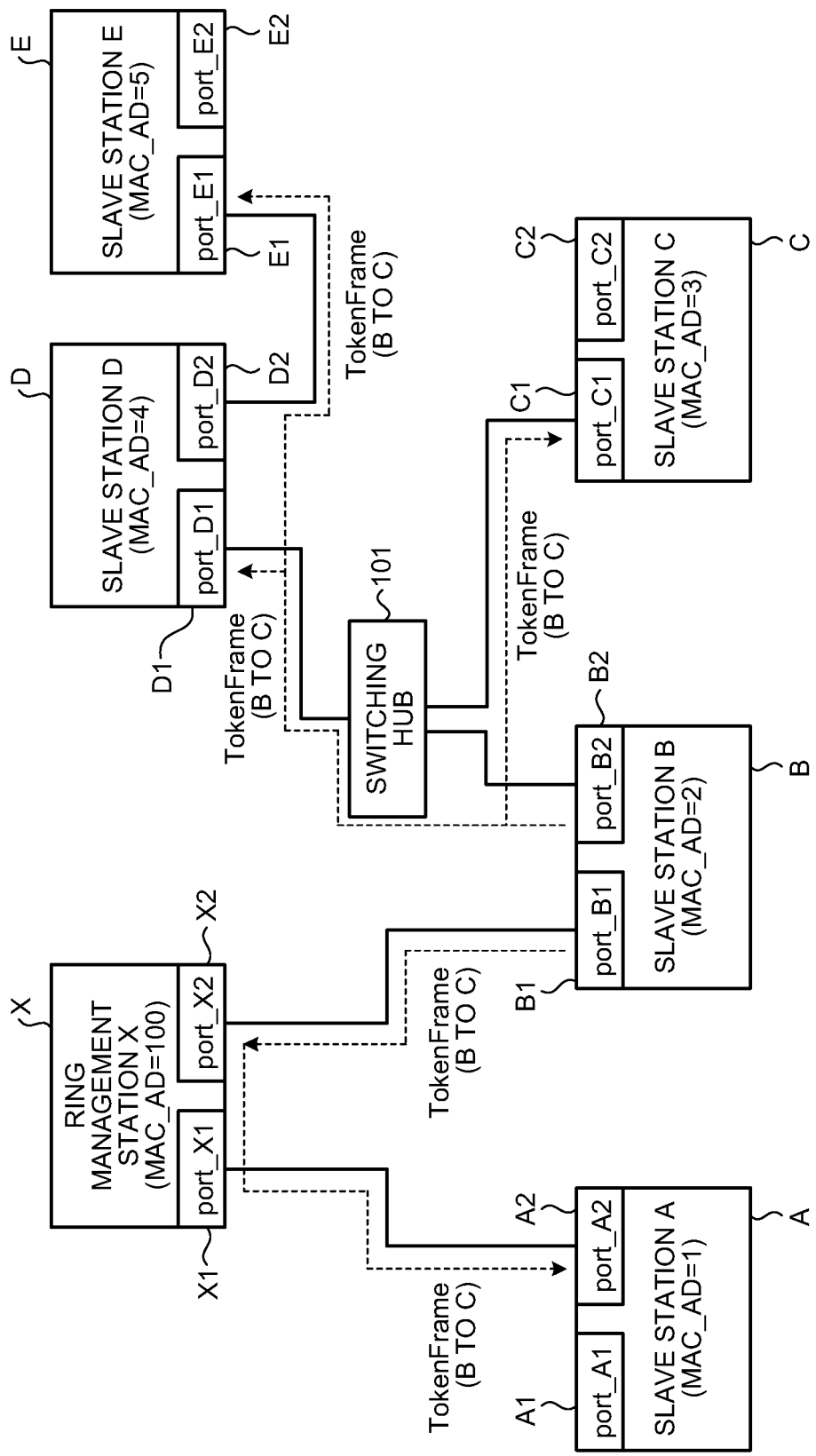

The network presence acknowledge frame transmitted from the slave station F is received by the ring management station X within a starting period of the timer 21. The network-presence-check processing unit 22 of the ring management station X extracts, from the network presence acknowledge frame received from the slave station F, the SA, the SA information in the received network presence check frame, and the port information of the station that transmits the network presence check frame and stores the SA, the SA information, and the port information in the network-presence-information storing unit 23 as network presence information. FIG. 11 is a diagram of an example of network presence information after the network presence acknowledge frame is received from the slave station F. In this network presence information, compared with the network presence information shown in FIG. 6 in the first embodiment, a record 306 concerning the slave station F is added.

When the timer 21 times out, the token-circulation-order determining unit 24 of the ring management station X detects a change in the network presence information stored in the network-presence-information storing unit 23 and performs, using the network presence information, processing for determining token circulation order according to a procedure same as that explained in the first embodiment, i.e., reconfiguration processing for a logical ring. As a result, it is assumed that new token circulation order is as indicated by (E) below.

Ring management station X→slave station B→slave station C→slave station F→slave station D→slave station E→slave station A→ring management station X (E)

Thereafter, the setup processing unit 26 of the ring management station X compares the token circulation order before the change and the new token circulation order and extracts the communication nodes for which the token circulation destination information is different from that before the change. When the token circulation order (A) explained in the first embodiment and the new token circulation order (E) are compared, because the slave station F is connected anew, token circulation destination information is set anew in the slave station F and the token circulation destination information of the slave station C immediately before the slave station F is changed.

Figures 4, 5, 6, 7, 8, 9, 10, 11, 12:
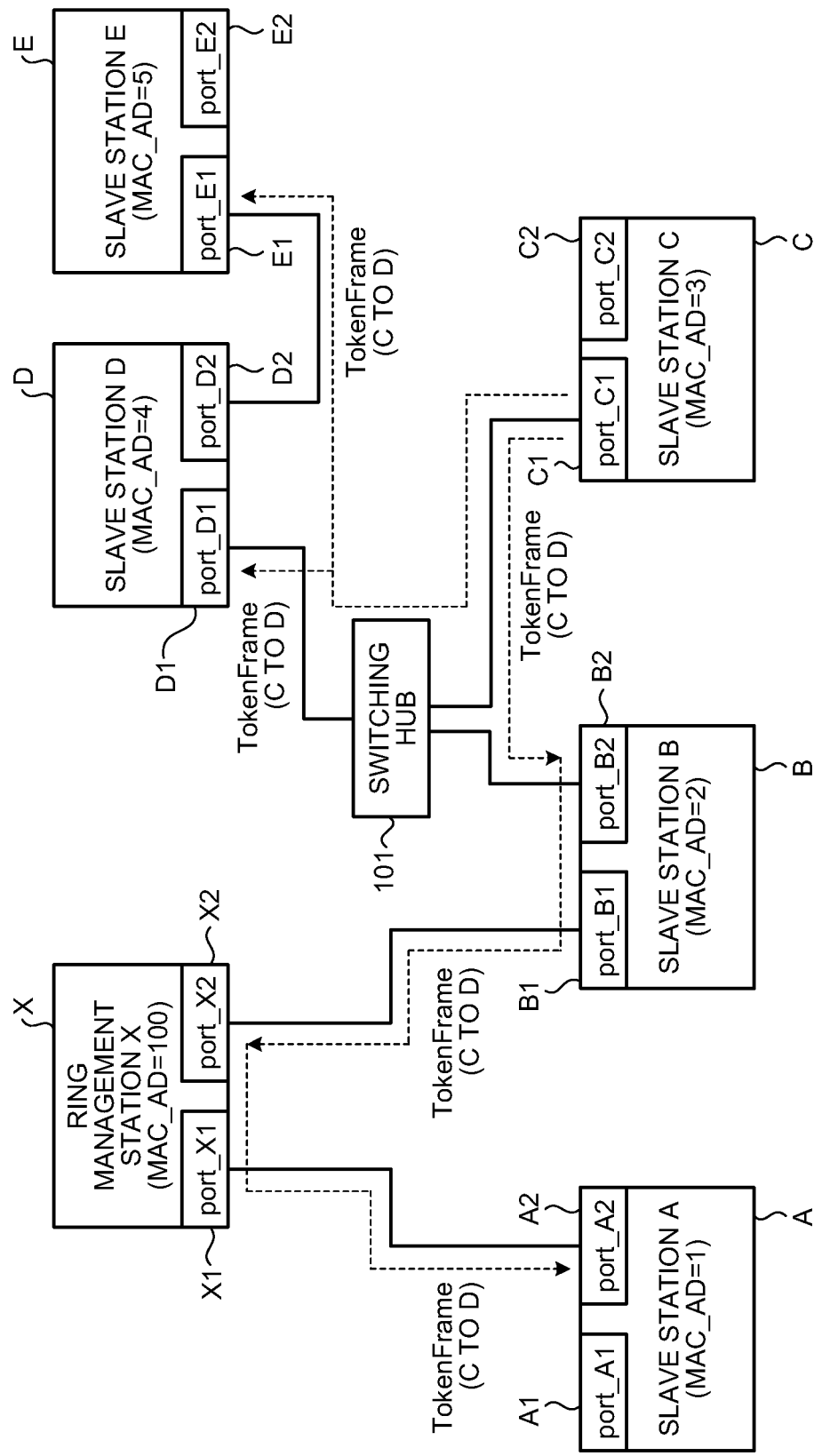

Therefore, the setup processing unit 26 creates setup frames for the slave stations C and F. FIG. 12 is a schematic diagram of an example of setup frames transmitted from the ring management station X to the slave stations C and F. In the setup frame transmitted to the slave station C, as indicated by "SetupFrame (X→C)", the MAC address "3" of the slave station C, which is a setting target, is set in a DA, the MAC address "100" of the own station is set in an SA, "Setup" is stored in frame type information, and the MAC address "6" of the slave station F, which is a communication node to which the token frame is transmitted after the slave station C, is set in token frame destination MAC address setting information.

In the setup frame transmitted to the slave station F, as indicated by "SetupFrame (X→F)", the MAC address "6" of the slave station F, which is a setting target, is set in the DA, the MAC address "100" of the own station is set in the SA, "Setup" is stored in the frame type information, and the MAC address "4" of the slave station D, which is a communication node to which the token frame is transmitted after the slave station F, is set in the token frame destination MAC address setting information.

As shown in FIG. 9-9, the setup processing unit 26 of the ring management station X transmits the created setup frames respectively to the slave stations C and F. The slave station B repeats the setup frames addressed to the slave stations C and F. The slave station C repeats the setup frame addressed to the slave station F.

When the slave stations C and F receive the setup frames from the ring management station X, the control-frame response units 61 of the slave stations C and F read out MAC addresses stored in the "token frame destination MAC address setting information" in the setup frames and store the MAC addresses in the token-circulation-destination-information storing units 62 as token circulation destination information.

After storing the token circulation destination information in the token-circulation-destination-information storing unit 62, the control-frame response units 61 of the slave stations C and F generate setup response frames (in the figure, represented as SetupACK), which are responses to the setup frames. In the setup response frame generated by the slave station C, as shown in FIG. 5-8, the MAC address of the own station is set in an SA and "SetupACK" is stored in frame type information in a data area. The setup response frame transmitted from the slave station F is generated in the same manner.

Subsequently, as shown in FIG. 9-10, the control-frame response units 61 of the slave stations C and F transmit the setup response frames to the ring management station X. The token-frame processing unit 27 starts observation of the token frame flowing on the transmission lines.

When the token-frame processing unit 27 of the ring management station X receives the setup response frames from the slave stations C and F, the token-frame processing unit 27 notifies the data-frame-communication processing unit 28 that the transmission right is present in the own station. The data-frame-communication processing unit 28 performs processing for transmitting data of the own station to the other communication nodes (slave stations A to F) in the communication system. At this point, the token-frame processing unit 27 resets the number of times of acquisition of the token frame and starts the counting of the number of times of acquisition of the token frame again.

Subsequently, as shown in FIG. 9-11, the token-frame processing unit 27 of the ring management station X generates a token frame according to the token circulation order information to pass the transmission right to the slave station B and transmits the token frame from the first and second ports X1 and X2 in broadcast. Thereafter, as explained in the first embodiment, in the slave stations A to F, according to the token circulation destination information and, in the ring management station X, according to the token circulation table (the token circulation order information), the transmission right is given in order to the communication nodes in the communication system to which the slave station F is added. Transmission processing for data (a frame) is performed from the communication nodes that obtain the transmission right.

According to the second embodiment, even when a communication node (a slave station) is connected to the communication system anew while the token frame is circulated, the ring management station X performs the logical ring reconfiguration processing when the ring management station X acquires the token frame the predetermined number of times. As a result, the ring management station X can recognize the new communication node as a station included in the communication system and perform transmission and reception of data including the new communication node.

The slave stations A to F are configured, when the token circulation destination information is already stored in the token-circulation-destination-information storing unit 62, not to respond to the network presence check frame periodically transmitted from the ring management station X. Therefore, a frame having same information as information already accumulated in the ring management station is not uselessly transmitted.

Further, the ring management station X performs the reconfiguration processing for a logical ring only when there is a change in the network presence information, determines token circulation order information again, compares the token circulation order information with the token circulation order before the redetermination, and notifies only the communication node connected anew and the communication node connected at the pre-stage of the communication node of token circulation destination information, which is a destination of a token frame transmitted next. As a result, it is possible to hold down a use band of the transmission lines and perform an efficient change compared with the time when the token circulation destination information is notified to all the communication nodes in the communication system.

Third Embodiment

In the second embodiment, a communication node connected anew to the communication system is recognized and the reconfiguration processing for a logical ring is performed while the token frame is circulated. However, in the network presence check processing for determining whether periodically-performed reconfiguration of a logical ring is necessary, it is likely that a large number of communication nodes are recognized at a time. In general, real-time properties of communication are requested in an FA network. However, when a large number of communication nodes are connected at a time, a long time is required for the reconfiguration processing for a logical ring in the ring management station. As a result, it is likely that the real-time properties are spoiled. Therefore, in a third embodiment, a method of performing, even when a large number of communication nodes are substantially simultaneously connected to a communication system at a time, reconfiguration processing for a logical ring including a new communication node without spoiling real-time properties in the communication system in which transmission and reception of data is already performed is explained.

The configuration of a ring management station in the third embodiment is basically the same as that explained in the first and second embodiments. Therefore, explanation of the same components is omitted. However, the third embodiment is different from the first and second embodiments in that the token-circulation-order determining unit 24 extracts records of a maximum number of communication nodes to be added set in advance from records stored temporally earlier (older) among records stored anew in network presence information of the network-presence-information storing unit 23 in network presence check processing performed in the intervals of communication performed using a token frame and performs determination processing for token circulation order.

The maximum number of communication nodes to be added set in the token-circulation-order determining unit 24 is determined by calculating in advance the number of communication nodes in which time required for the reconfiguration processing for a logical ring performed in the intervals of communication performed using a token frame does not spoil real-time properties of data transmission and reception in the communication system. In an example explained below, the maximum number of communication nodes to be added is set to five.

Figures 4, 5, 6, 7, 8, 9, 10, 11, 12, 13:
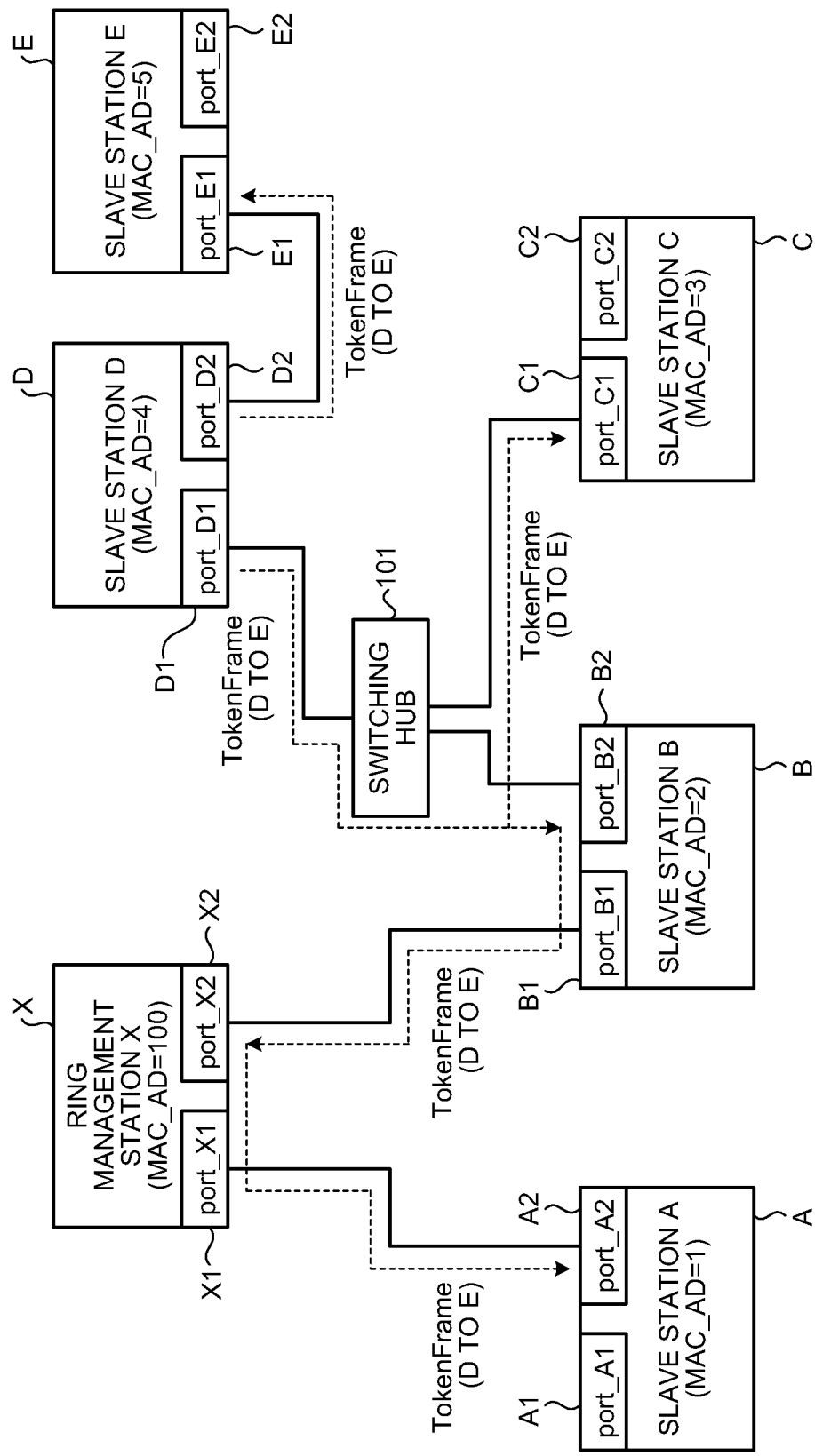

According to the determination processing for token circulation order, network presence information is stored in the network-presence-information storing unit 23 in reception order of network presence acknowledge frames. Information indicating whether a communication node is a communication node subjected to the reconfiguration processing for a logical ring is further stored. FIG. 13 is a diagram of an example of the structure of network presence information according to the third embodiment. In this network presence information, as explained with reference to FIG. 6, besides the items "SA", "SA information in a received network presence check frame", and "port information of a station that transmits the network presence check frame", an item "end of configuration processing for a logical ring" indicating whether a record is a record used during the configuration processing for a logical ring is added. When a flag is set in this item of "end of configuration processing for a logical ring" (in FIG. 13, a circle is set), this indicates that this record is already used for the reconfiguration processing for a logical ring. In other words, this means that a record in which a flag is not set is not used for the reconfiguration processing for a logical ring.

In FIG. 13, it is assumed that record concerning communication nodes, SAs of which are 21 to 30, are records added anew in the network presence check processing performed in the intervals of the communication performed using a token frame and the records are registered in order of arrival of network presence acknowledge frames to the ring management station X. The network presence acknowledge frames reach the ring management station X earlier from communication nodes closer to the ring management station X.

The configuration of a slave station in the third embodiment is the same as that explained in the first and second embodiments. Therefore, explanation of the configuration is omitted.

Figures 4, 5, 6, 7, 8, 9, 10, 11, 12, 13, 14:
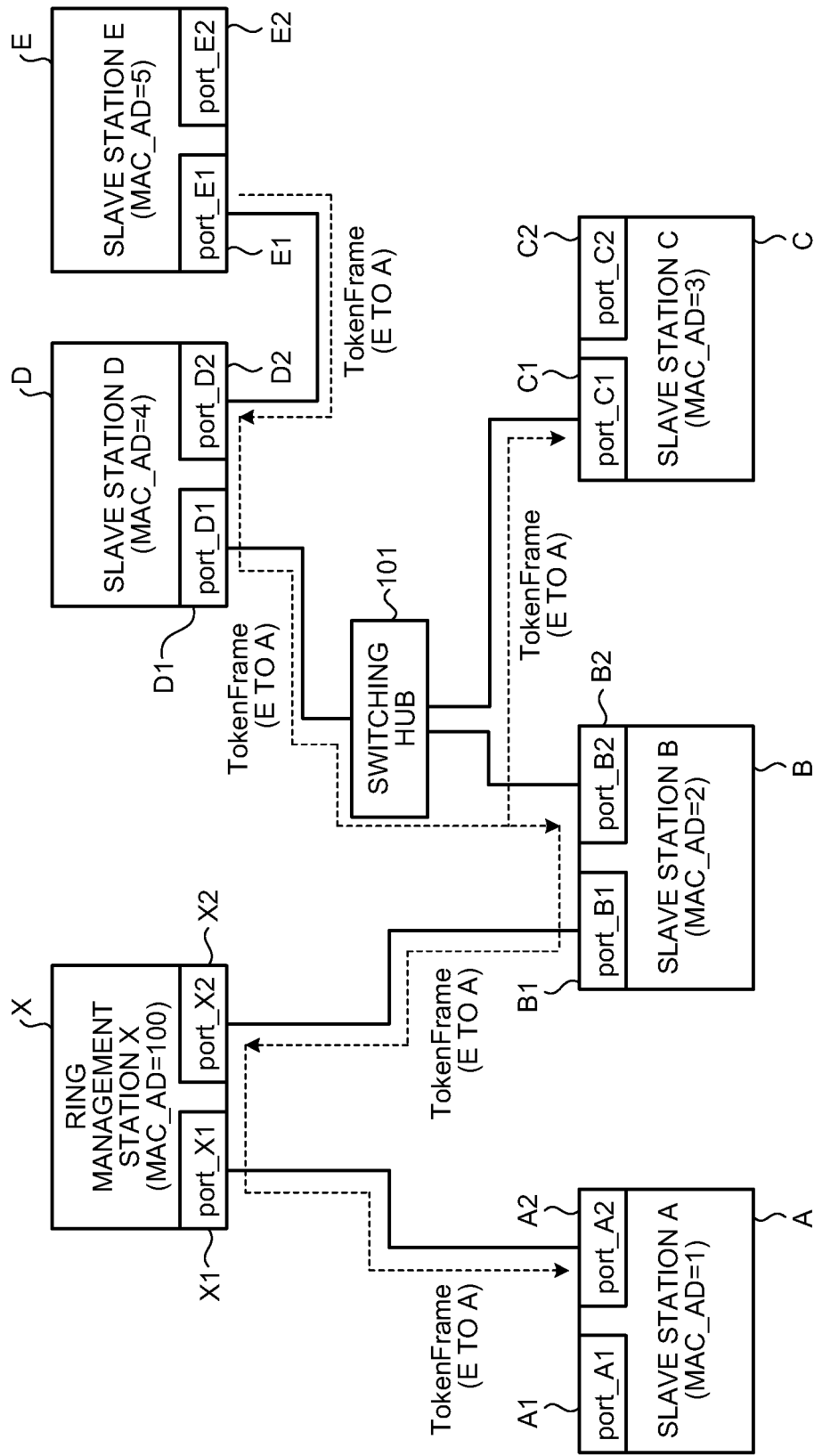

The reconfiguration processing for a logical ring according to the third embodiment is explained below. FIG. 14 is a flowchart for explaining an example of the reconfiguration processing for a logical ring by the ring management station. As shown in FIG. 9-11, the communication system includes the ring management station and the slave stations A to F.

First, the ring management station X receives a token frame in which MAC address information for token-addressed-to-own-station determination is set to the own station and acquires a token (step S51). Subsequently, the token-frame processing unit 27 of the ring management station X counts the number of times of acquisition of the token (step S52) and determines whether the number of times of acquisition of the token reaches a predetermined number of times (step S53). When the number of acquisition of the token does not reach the predetermined number of times (No at step S53), after transmitting a data frame to the slave stations A to F, the token-frame processing unit 27 generates a token frame in which a communication node at the next circulation destination is set, transmits the token frame to the communication nodes in the communication system in broadcast (step S62), and returns to step S51.

When the number of times of acquisition of the token reaches the predetermined number of times (Yes at step S53), the token-circulation-order determining unit 24 acquires a record already used for the logical ring configuration processing from the network presence information of the network-presence-information storing unit 23 (step S54). For example, in the case of FIG. 13, the token-circulation-order determining unit 24 acquires the records 301 to 306 in which the "end of configuration processing for a logical ring" flag is set.

Thereafter, the token-circulation-order determining unit 24 determines whether the number of records registered anew in the network presence information after the (re)configuration processing for a logical ring is performed is larger than the set maximum number of communication nodes to be added (step S55). When the number of records registered anew in the network presence information is equal to or smaller than the set maximum number of communication nodes to be added (No at step S55), the token-circulation-order determining unit 24 acquires all the records registered anew, i.e., all the records not used for the logical ring configuration processing from the network presence information (step S56).

On the other hand, when the number of records registered anew in the network presence information is larger than the set maximum number of communication nodes to be added (Yes at step S55), the token-circulation-order determining unit 24 acquires, from the network presence information, in order of registration in the network presence information, records of the maximum number of communication nodes to be added among the records not used for the logical ring configuration processing. For example, in the case of FIG. 13, the token-circulation-order determining unit 24 acquires five records 307 among the records in which the "end of configuration processing for a logical ring" flag is not set. As a result, the remaining records 308 are not used for the logical ring configuration processing.

Thereafter, the token-circulation-order determining unit 24 sets the "end of configuration processing for a logical ring" flag in the records acquired at step S56 or step S57 in the network presence information (step S58). For example, the token-circulation-order determining unit 24 sets the "end of configuration processing for a logical ring" flag in the records 307 shown in FIG. 13.

Subsequently, the token-circulation-order determining unit 24 performs the token circulation order determination processing explained in the first embodiment using the acquired records (step S59). The setup processing unit 26 performs, according to the determined token circulation order information, setup processing for notifying the slave stations, which need notification of a token circulation destination, of the token circulation destination information (step S60). In this setup processing, a setup frame is not notified to the communication nodes (slave stations) registered in the network presence information but not used for the reconfiguration processing for a logical ring (determination processing for token circulation order). Thereafter, the token-frame processing unit 27 resets the number of times the token is acquired (step S61). The data-frame-communication processing unit 28 transmits a data frame to the slave stations. Subsequently, the token-frame processing unit 63 generates a token frame in which a communication node at the next circulation destination is set and transmits the token frame to the communication node in the communication system in broadcast (step S62). The ring management station X returns to step S51 and the processing explained above is repeatedly performed.

As a result, for example, in the example shown in FIG. 13, when the number of times the token is acquired reaches the predetermined number of times, the ring management station X performs the reconfiguration processing for a logical ring using the records 301 to 307 already subjected to the logical ring configuration processing and the record 308 registered in the network presence information last time but not used for the logical ring configuration processing.

According to the third embodiment, in the network presence check processing for determining whether the periodically-performed reconfiguration of a logical ring is necessary, even when a large number of communication nodes are recognized at a time, the configuration processing for a logical ring (the token circulation order determination processing and the setup processing) using records in the network presence information of the communication nodes already subjected to the logical ring configuration processing and the communication nodes in a range of the maximum number of communication nodes to be added among communication nodes added anew. Consequently, there is an effect that it is possible to prevent time required for the logical ring configuration processing from spoiling real-time properties in transmission and reception of data of the communication system.

Fourth Embodiment

During transmission and reception of data performed using a token frame, in some case, a token frame or a data frame disappears because of the influence of external noise or the like. In a system in the past that performs communication using a token frame, when disappearance of a frame occurs, a management station reissues a token frame. However, this token frame is set to start from the management station. Therefore, communication nodes having the transmission right after a communication node to which the disappeared frame is transmitted cannot obtain the transmission right for one transmission. The management station cannot receive data equally from the communication nodes. In such a system in which disappearance of a frame frequently occurs, there is a problem in that deviation occurs in transmission of data from the communication nodes to the management station and affects accuracy of an arithmetic operation, for example, when a feedback arithmetic operation is performed using data from the communication nodes. In a fourth embodiment, a communication system is explained that can equally perform data transmission to the management station from the communication nodes even when a frame disappears.

Figures 4, 5, 6, 7, 8, 9, 10, 11, 12, 13, 14, 15:
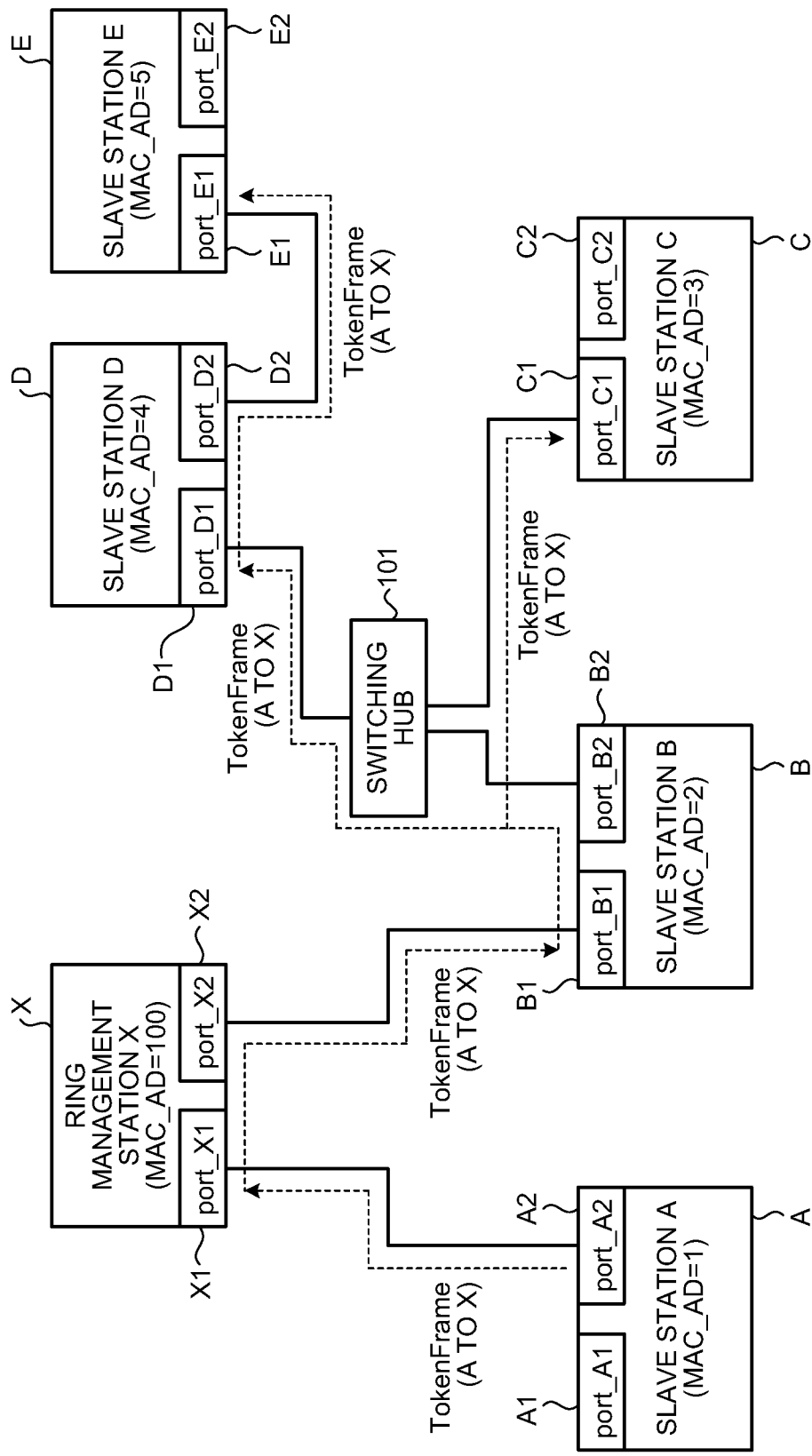
Figures 1, 8:
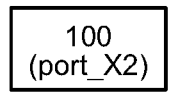
Figures 2, 8:
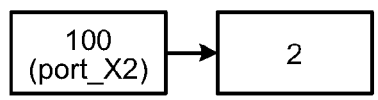
Figures 3, 8:
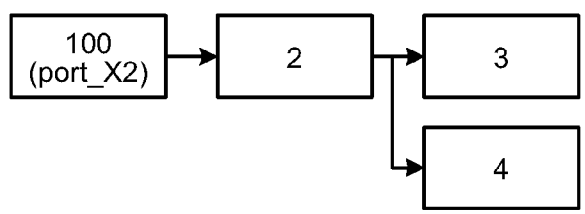
Figures 4, 8:
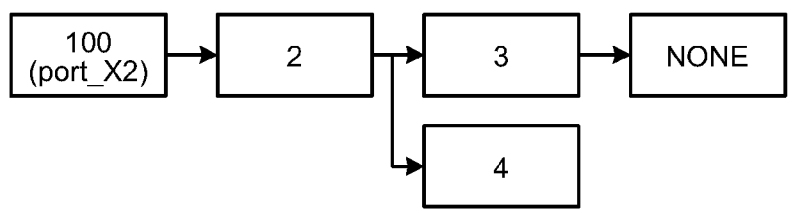
Figures 5, 8:
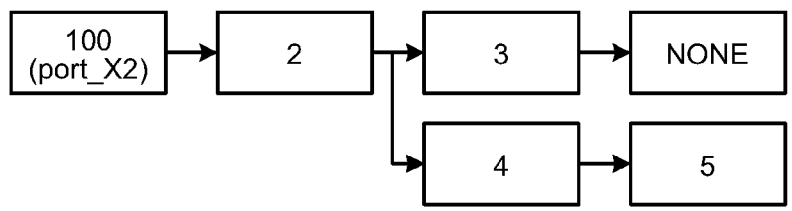
Figures 6, 8:
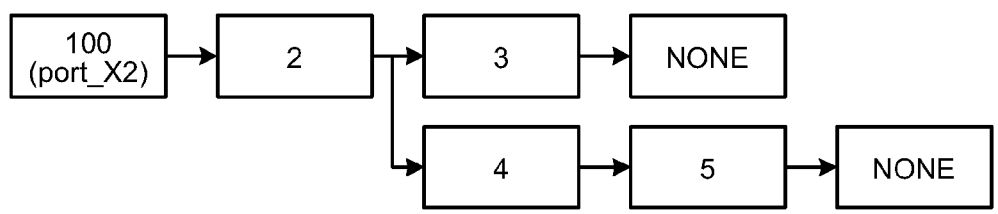
Figures 7, 8:
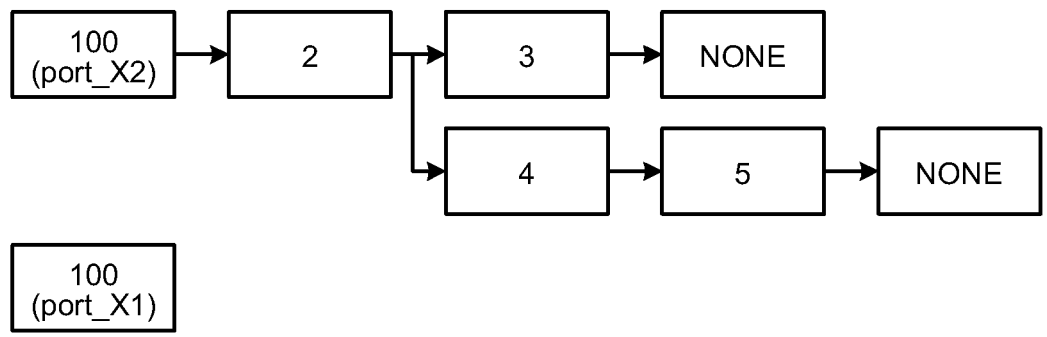
Figure 8:
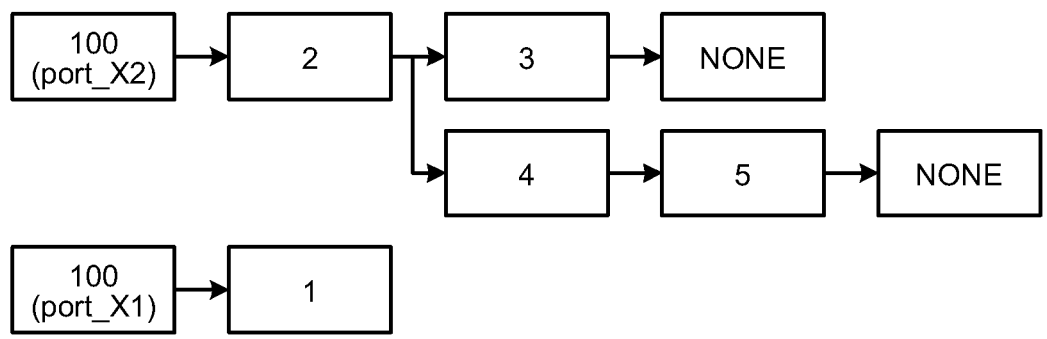
Figures 8, 9:
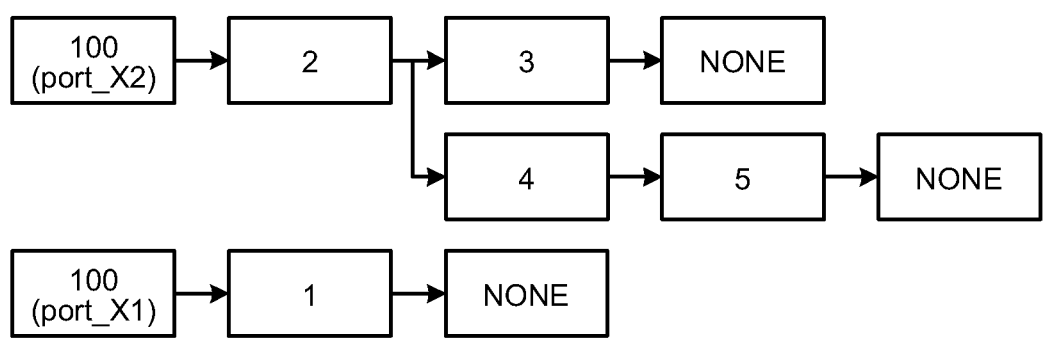
Figures 3, 9:
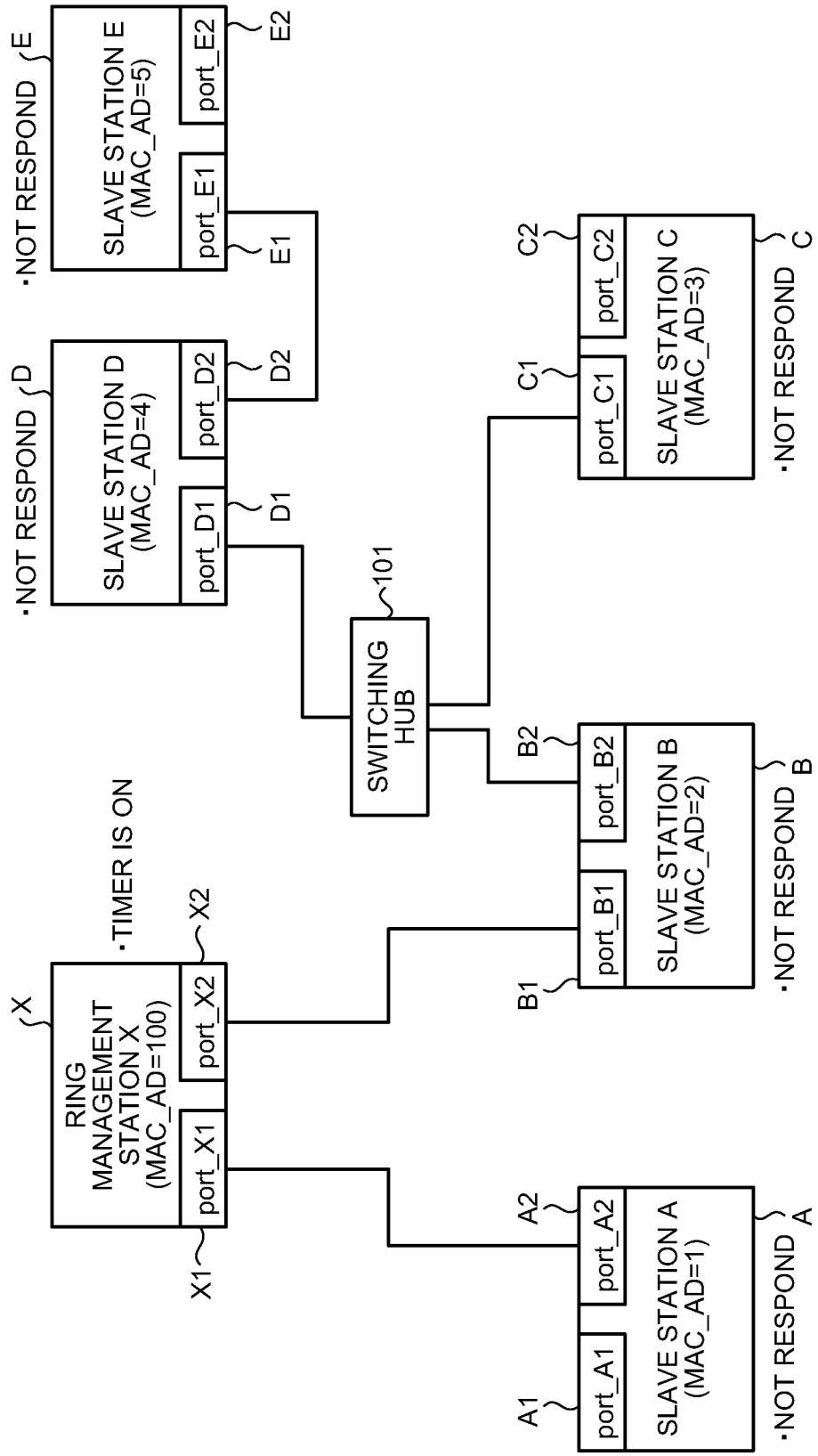
Figures 4, 9:
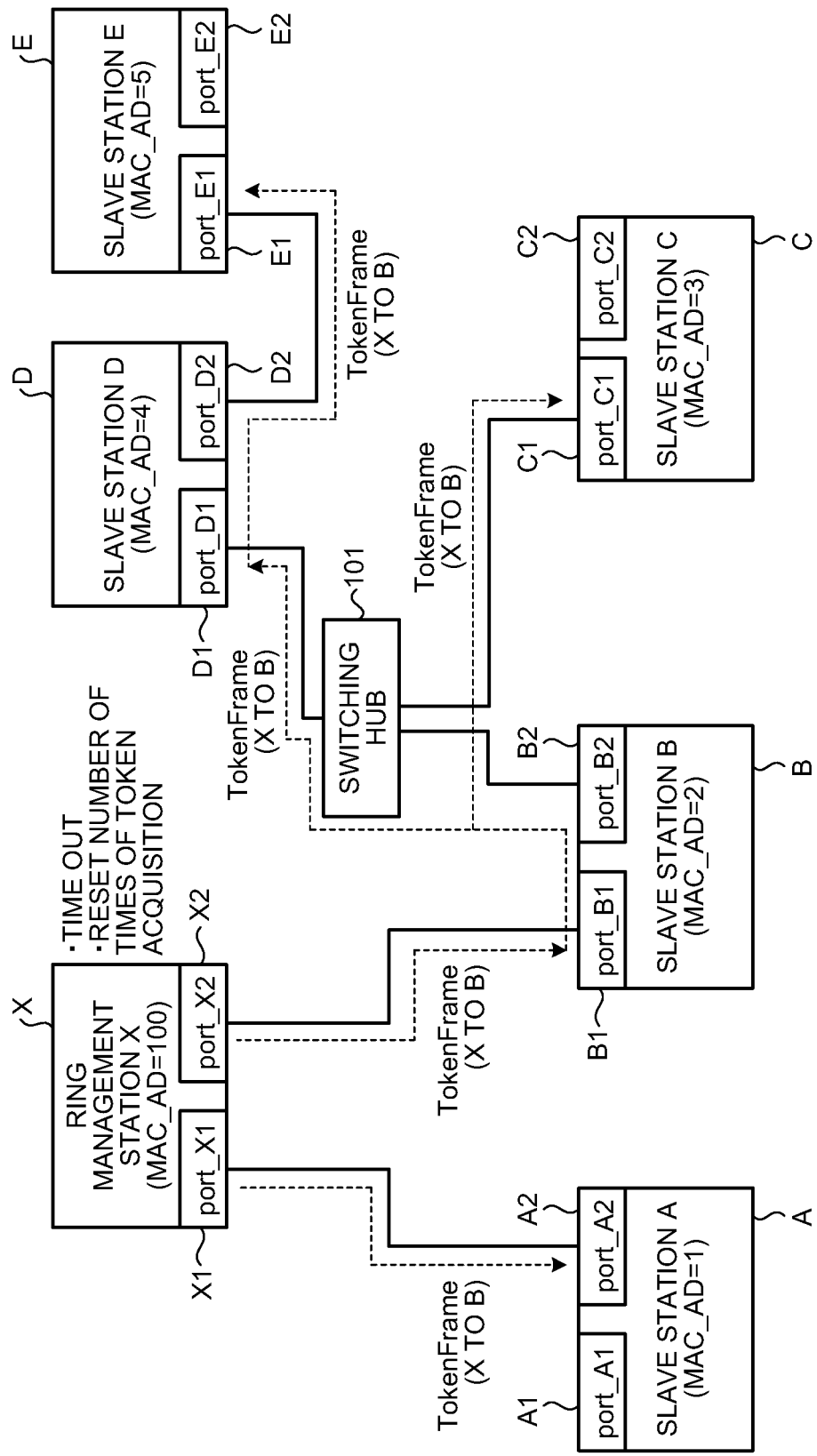
Figures 5, 9:
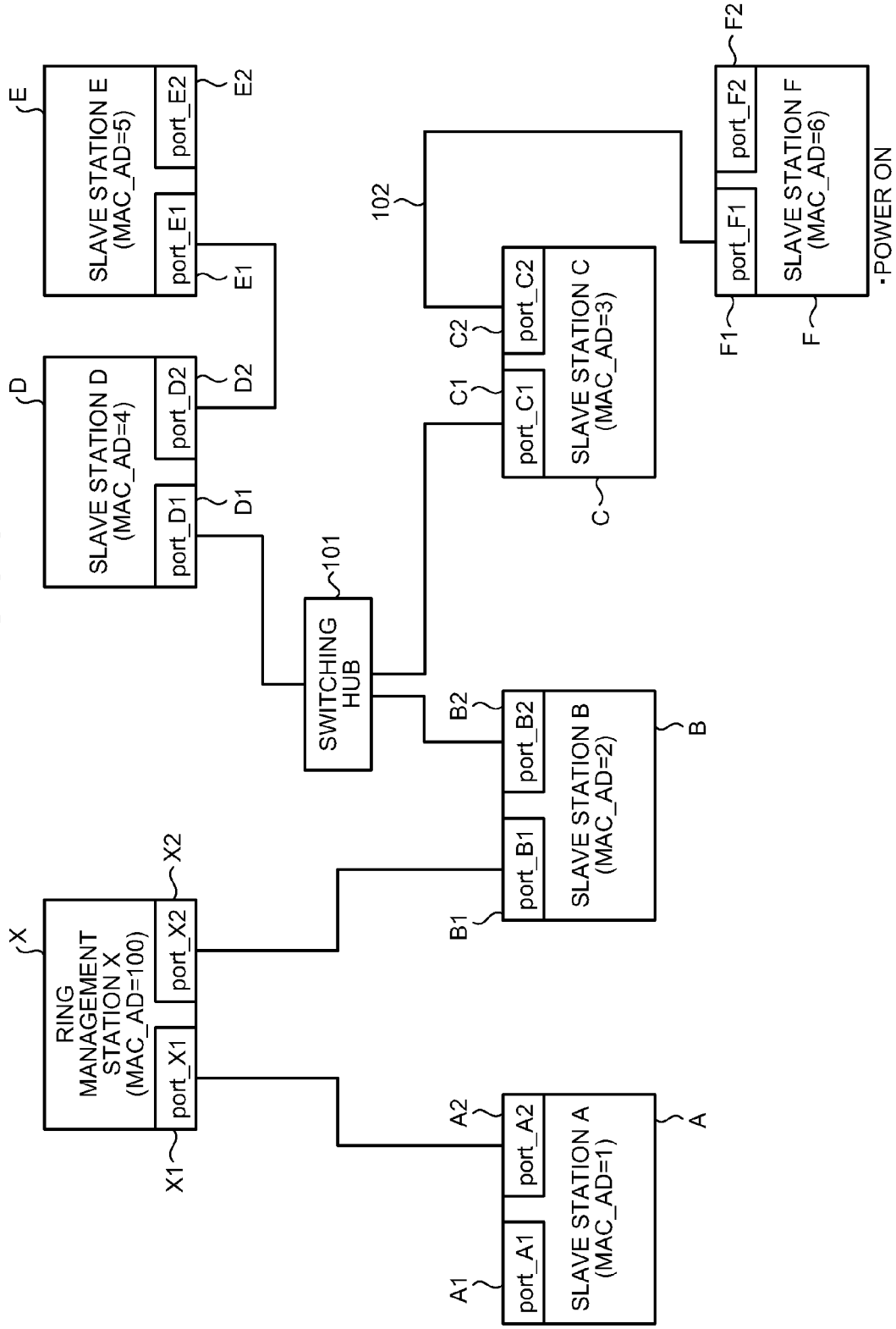
Figures 6, 9:
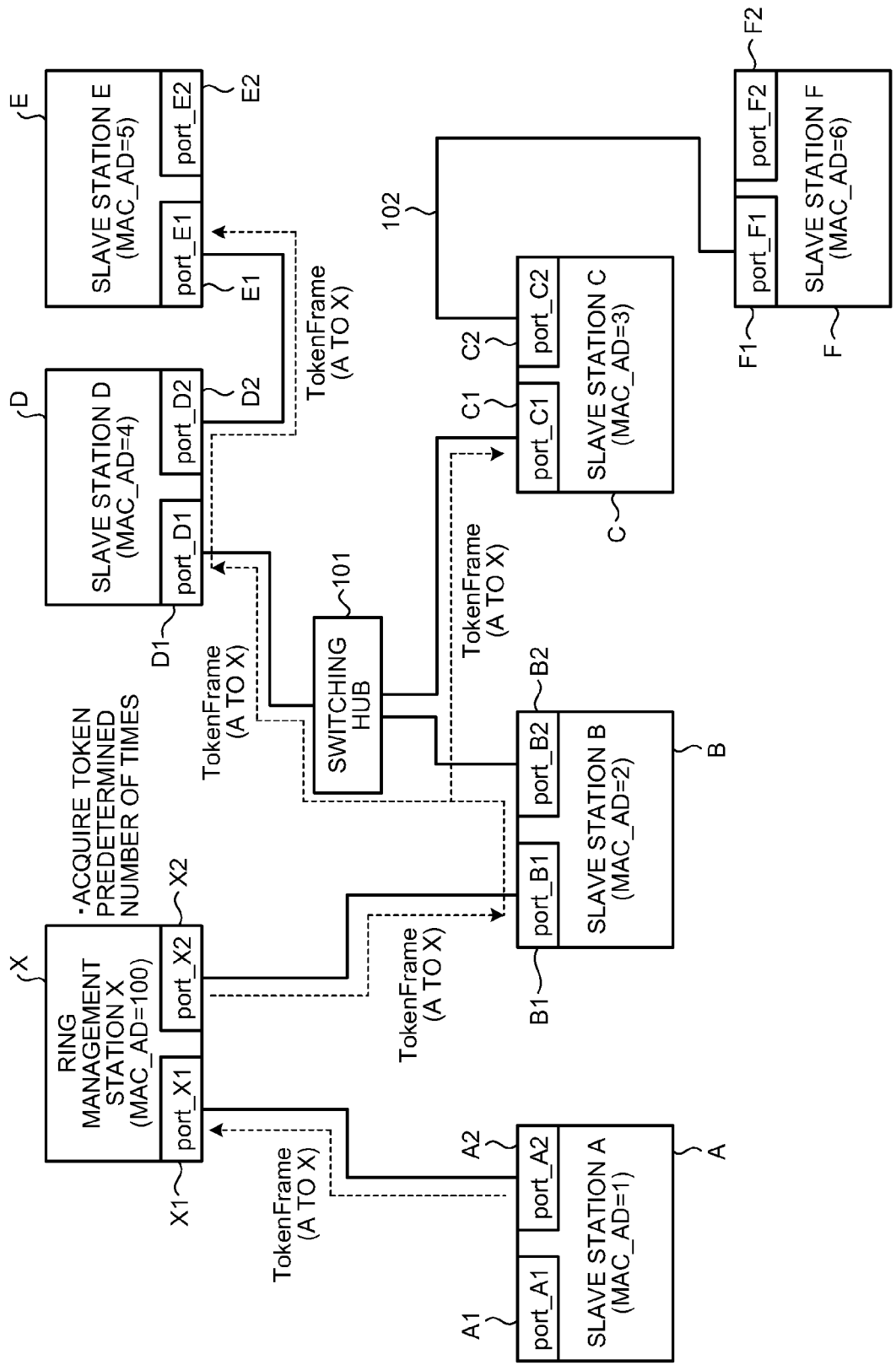
Figures 7, 9:
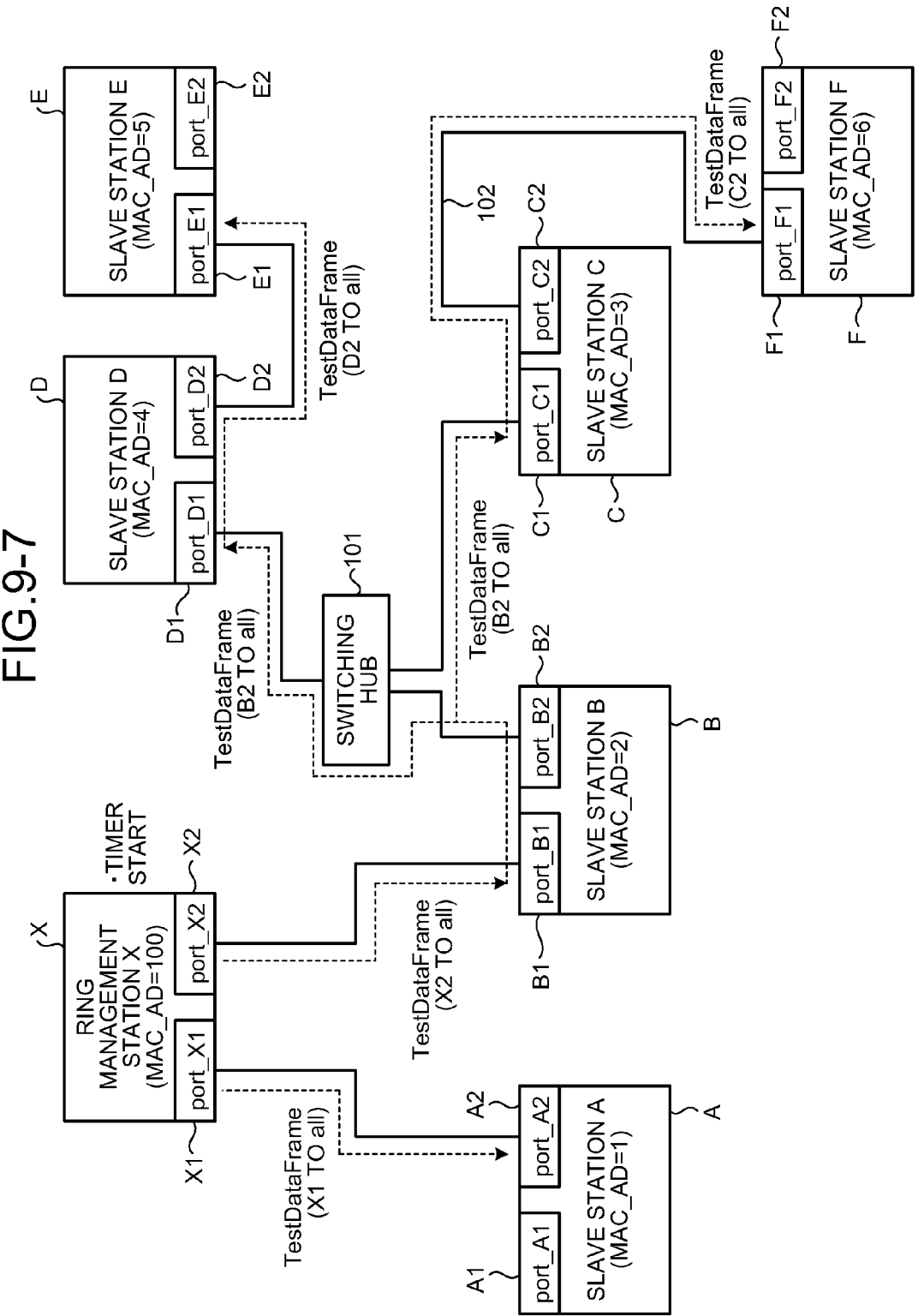
Figures 9, 10:
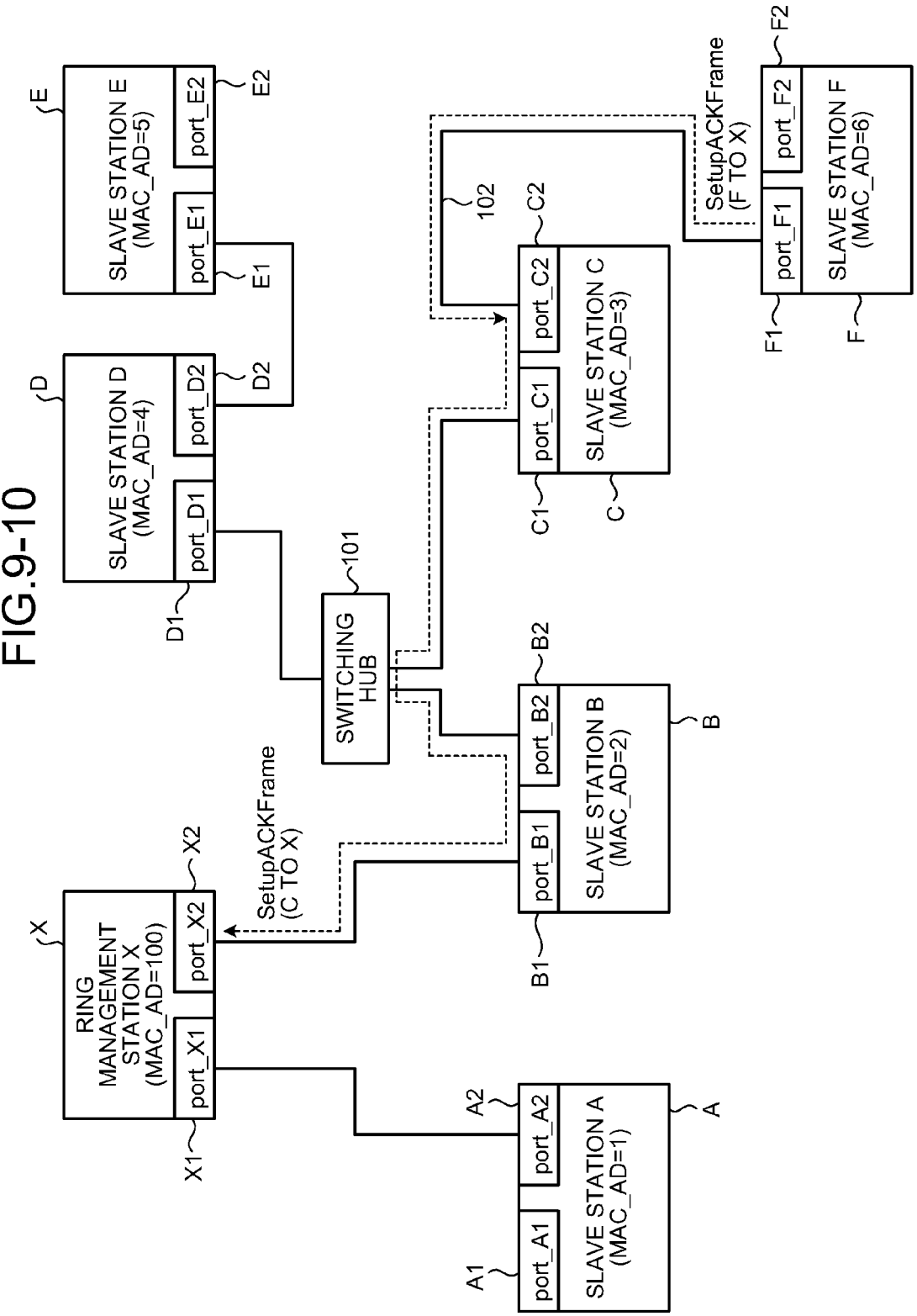
Figures 9, 10, 11:
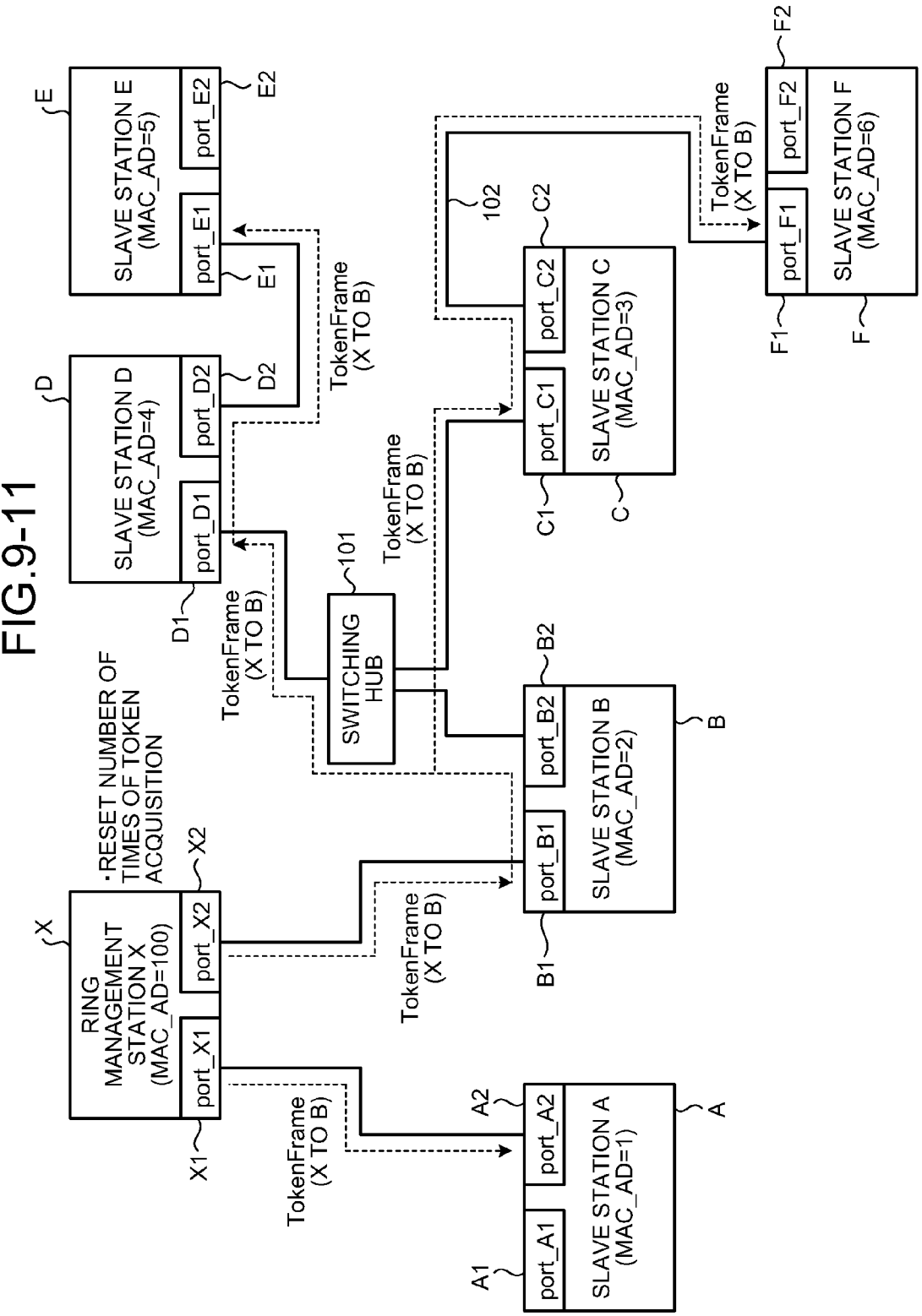
Figure 14:
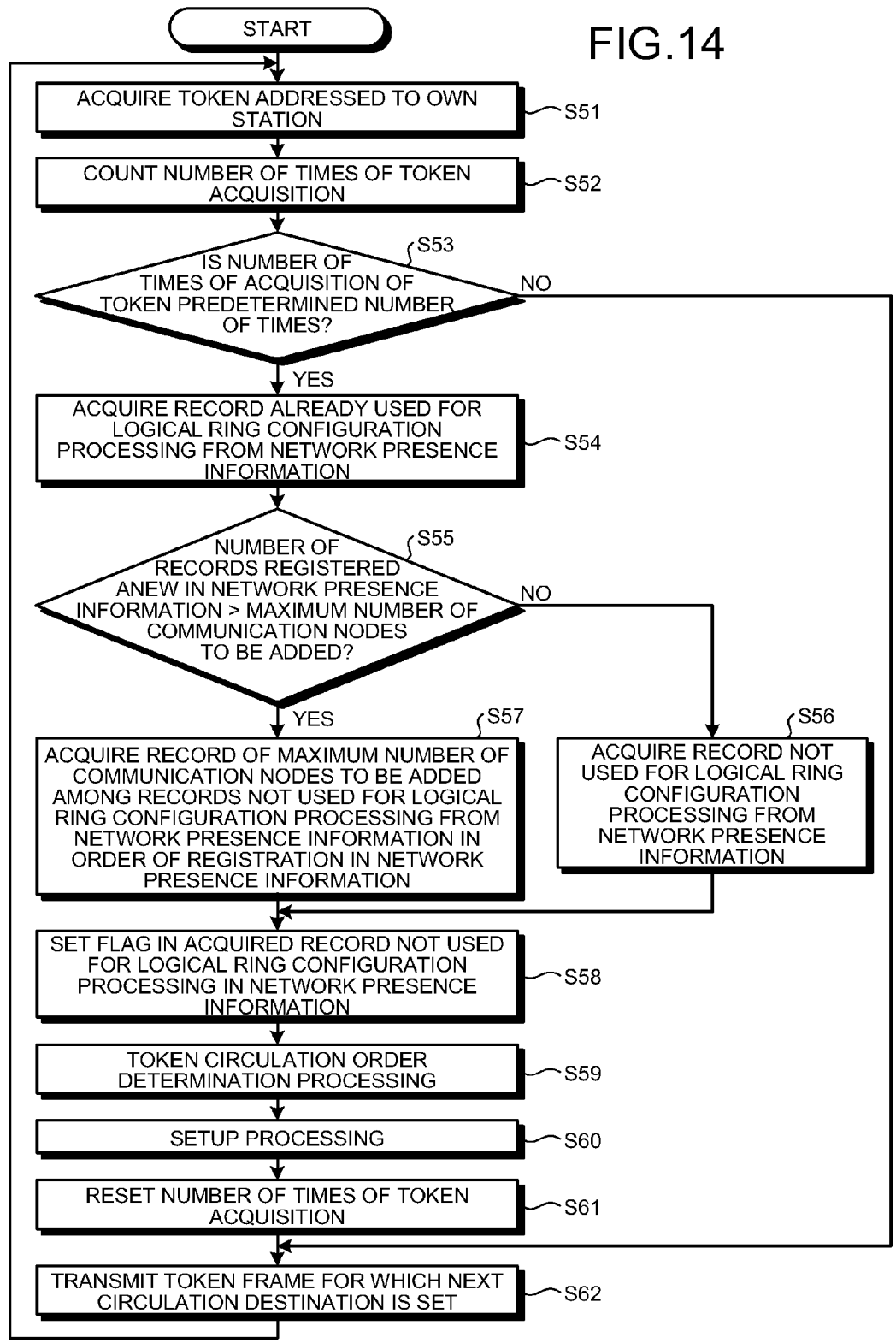
Figure 15:
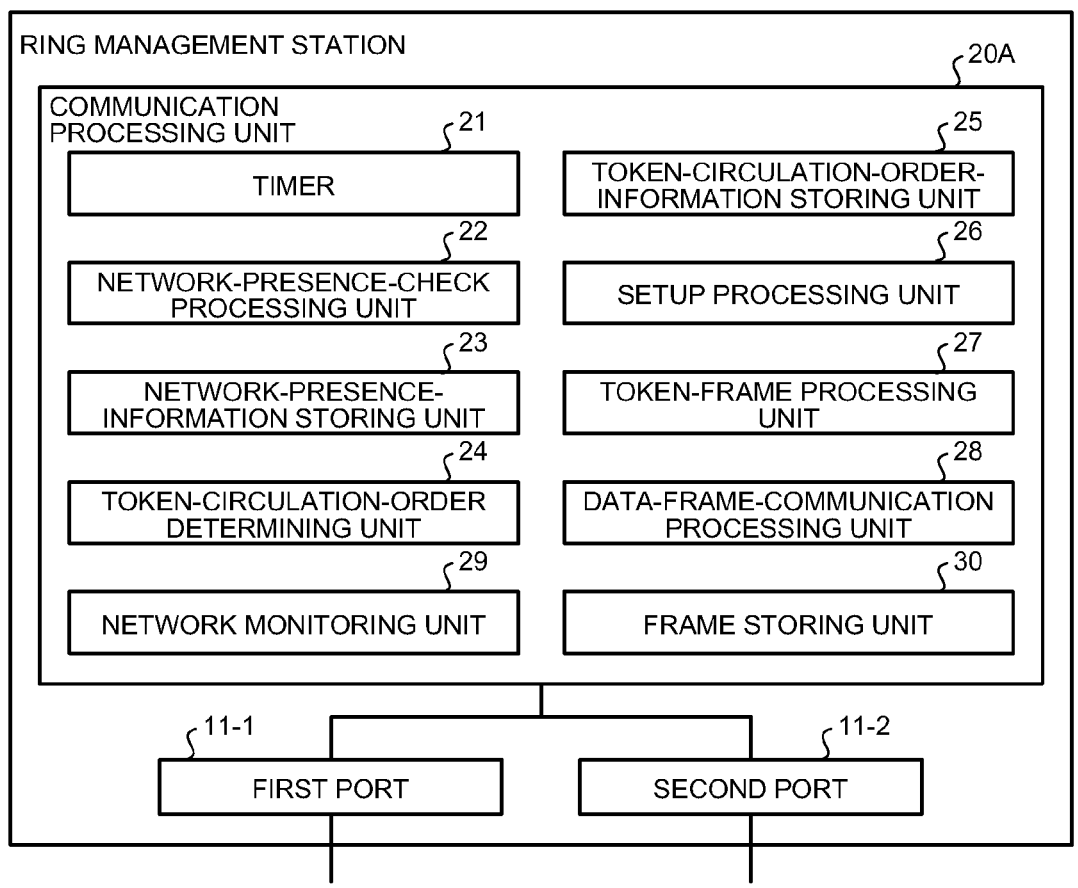

FIG. 15 is a schematic block diagram of an example of a functional configuration of the ring management station according to the fourth embodiment. In the configuration shown in FIG. 2-1 in the first embodiment, the ring management station X further includes a network monitoring unit 29 and a frame storing unit 30 in a communication processing unit 20A.

When a frame flowing in a network is input to the first port 11-1 or the second port 11-2, the network monitoring unit 29 stores the frame in the frame storing unit 30, starts the timer 21, and monitors the frame flowing in the network. When a frame is input to the first port 11-1 or the second port 11-2 until a predetermined time elapses after the timer 21 is started, the network monitoring unit 29 stores the frame input anew in the frame storing unit 30, resets the timer 21, and counts time anew. When a frame is not input to the first port 11-1 or the second port 11-2 until the predetermined time elapses after the timer 21 is started, the network monitoring unit 29 determines that a frame disappears in the network (the communication system), generates token frame reissue information, which is a MAC address of a communication node to which the transmission right is given next, and passes the token frame reissue information to the token-frame processing unit 27. The token frame reissue information is obtained by acquiring, from the token circulation order information, a MAC address of a communication node that acquires the transmission right after an SA of the frame stored in the frame storing unit 30.

The frame storing unit 30 stores a frame flowing in the network and input to the ring management station X. To generate the token frame reissue information, it is sufficient if there is an SA of a frame acquired by the ring management station X among frames flowing in the network. Therefore, rather than storing the frame itself, the SA of the frame can be stored. This makes it possible to suppress a capacity for storing information.

When the token-frame processing unit 27 receives the token frame reissue information from the network monitoring unit 29, the token-frame processing unit 27 sets, in the MAC address information for token-addressed-to-own-station determination of the token frame, the token frame reissue information, i.e., a MAC address of a communication node to which the transmission right should be given next, generates a token frame, and transmits the token frame. When the token frame reissue information is the MCA address of the own station, the token-frame processing unit 27 does not generate a token frame and performs processing assuming that the own station obtains the transmission right. Components same as those shown in FIG. 2-1 are denoted by the same reference numerals and signs and explanation of the components is omitted.

The configuration of a slave station is basically the same as that explained with reference to FIG. 2-2 in the first embodiment. However, it is assumed that the slave station transmits all output frames in broadcast or multicast. When the frames are transmitted in multicast, it is assumed that all communication nodes included in the communication system are set as one group in advance. When all the frames are transmitted in broadcast or multicast, as in the token frame shown in FIG. 3-5, it is assumed that, for example, "MAC address information for frame-addressed-to-own-station determination" is provided in a data area to make it possible to discriminate to which communication node a frame to be broadcasted or multicasted is transmitted.

Figures 7, 16:
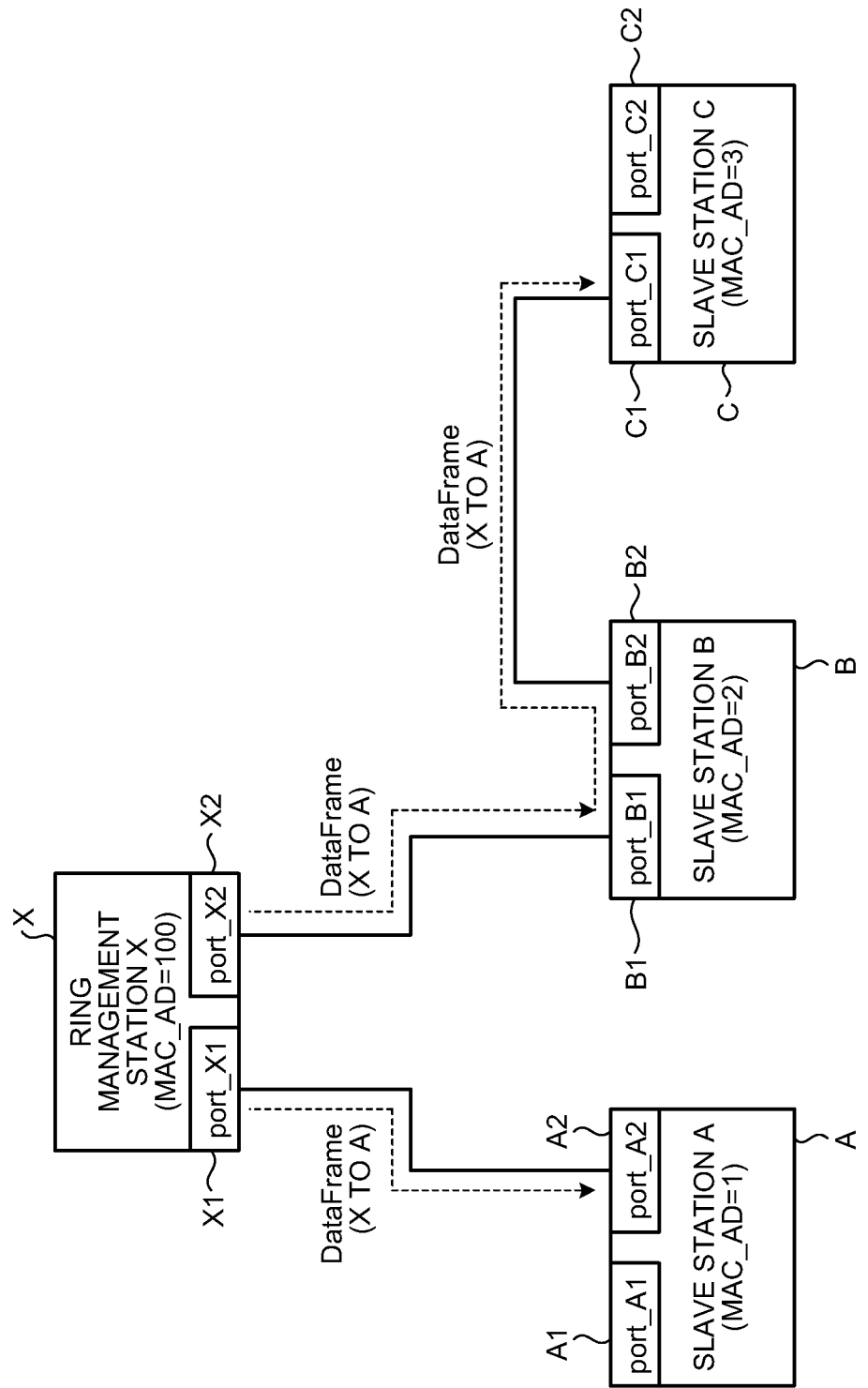
Figures 8, 16:
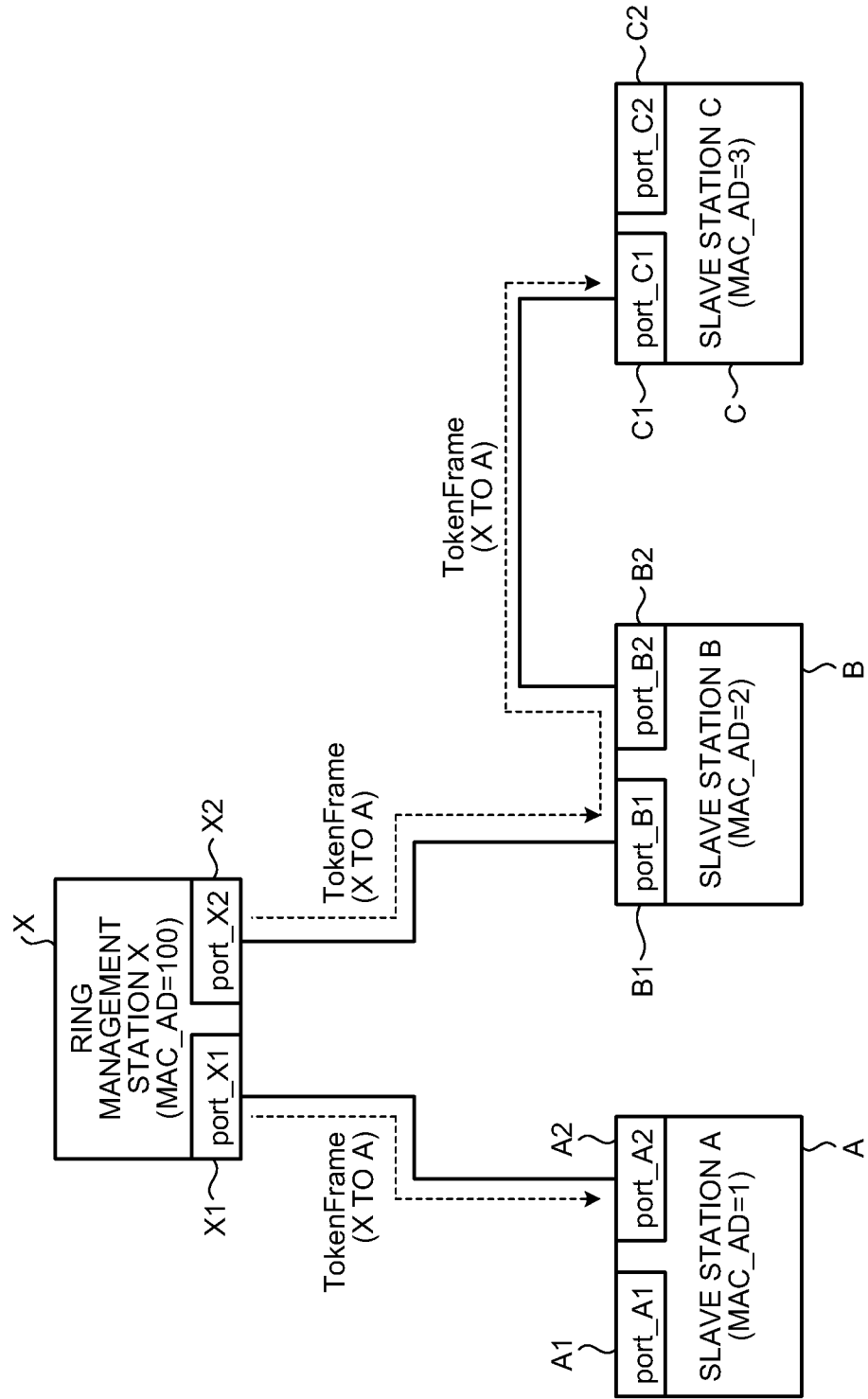

Reissue processing for a token frame is explained below. FIGS. 16-1 to 16-8 are schematic diagrams of an example of a procedure of reissue processing for a token frame according to the fourth embodiment. This communication system includes, as shown in FIG. 16-1, a network of the same segment including the ring management station X and the slave stations A to C. More specifically, this communication system has a configuration in which the slave station A is connected to the first port X1 of the ring management station X and the slave stations B and C are connected to the second port X2 of the ring management station X in a line shape. It is assumed that circulation order of a token in this communication system is set as indicated by (F) below.

Ring management station X→slave station A→slave station B→slave station C→ring management station X (F)

First, as shown in FIG. 16-1, in this communication system, after the ring management station X that acquires a token frame transmits necessary data to the slave stations A to C, the ring management station X issues a token frame to give the transmission right to the slave station A. At this point, the network monitoring unit 29 of the ring management station X starts the timer 21.

Subsequently, the slave station A receives the token frame and recognize that the own station acquires the transmission right. As shown in FIG. 16-2, when the slave station A transmits a data frame (in the figure, represented as DataFrame (A→X)) in broadcast, the data reaches the ring management station X. The network monitoring unit 29 of the ring management station X stores a frame input from the first port X1 in the frame storing unit 30 and resets the timer 21. Thereafter, it is assumed that the token frame circulates and transmission of data normally ends in the same manner in the slave stations B and C. FIG. 16-3 is a diagram of a state after the slave station C normally transmits data. At this point, a data frame transmitted by the slave station C is stored in the frame storing unit 30 of the ring management station X. The network monitoring unit 29 resets the timer 21.

Thereafter, as shown in FIG. 16-4, the slave station C that transmits the data frame transmits a token frame to give the transmission right to the ring management station X. It is assumed that this token frame disappears in the transmission line 111 between the slave station C and the slave station B. Therefore, the token frame does not reach the slave station B and, as a result, does not reach the ring management station X either. As shown in FIG. 16-5, a state in which a frame does not flow in the network lasts until a predetermined time elapses after the timer 21 is started.

Subsequently, as shown in FIG. 16-6, the network monitoring unit 29 of the ring management station X detects that the timer 21 is time over and determines, using the frame stored in the frame storing unit 30 and the token circulation order information stored in the token-circulation-order-information storing unit 25, to which slave station data of the slave stations has been able to be normally transmitted. Specifically, the network monitoring unit 29 of the ring management station X acquires the SA of the frame stored in the frame storing unit 30 and acquires, from the token circulation order information, a MAC address of a communication node to which the transmission right is given after this SA. The network monitoring unit 29 generates the acquired MAC address as token frame reissue information and passes the MAC address to the token-frame processing unit 27.

In this example, because the data frame transmitted by the slave station C is stored in the frame storing unit 30, the network monitoring unit 29 determines that data transmission normally ends up to the slave station C. As indicated by the token circulation order (F), the network monitoring unit 29 recognizes that the own station (the ring management station X) obtains the transmission right after the slave station C, generates token frame reissue information having the MAC address "100" of the own station, and passes the token frame reissue information to the token-frame processing unit 27.

Because the destination of the token frame is the own station, the token-frame processing unit 27 of the ring management station X recognizes that the own station obtains the transmission right. Subsequently, as shown in FIG. 16-7, the ring management station X performs transmission processing for data. Thereafter, as shown in FIG. 16-8, the ring management station X generates a token frame for passing the transmission right to the slave station A and transmits the token frame.

As explained above, when the token frame disappears without reaching the ring management station X (when the frame disappears after the data frame reaches the ring management station X), the network monitoring unit 29 of the ring management station X specifies a communication node that normally ends data transmission. A token frame is reissued to a communication node that obtains the transmission right after the communication node.

Figures 1, 17:
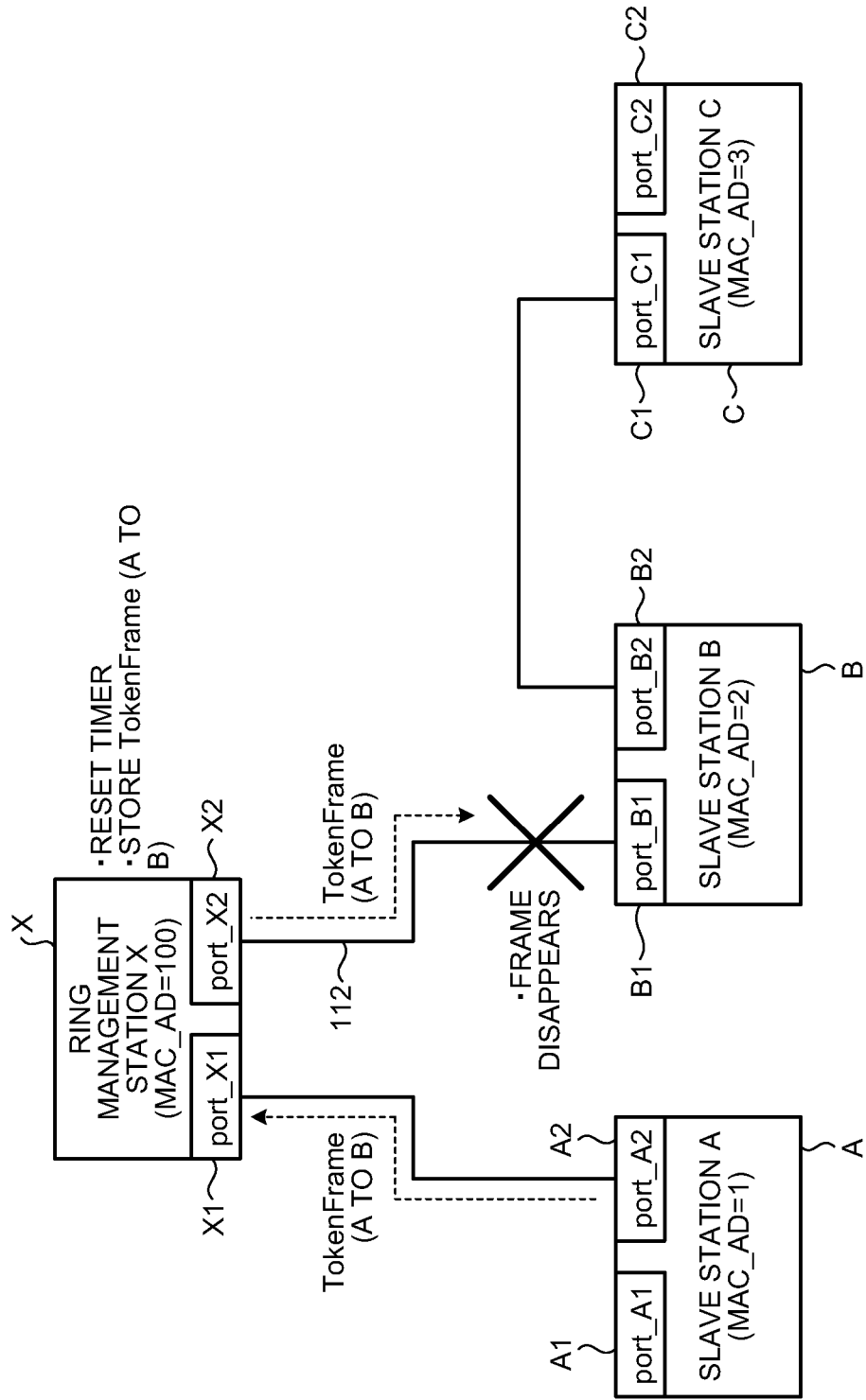
Figures 2, 17:
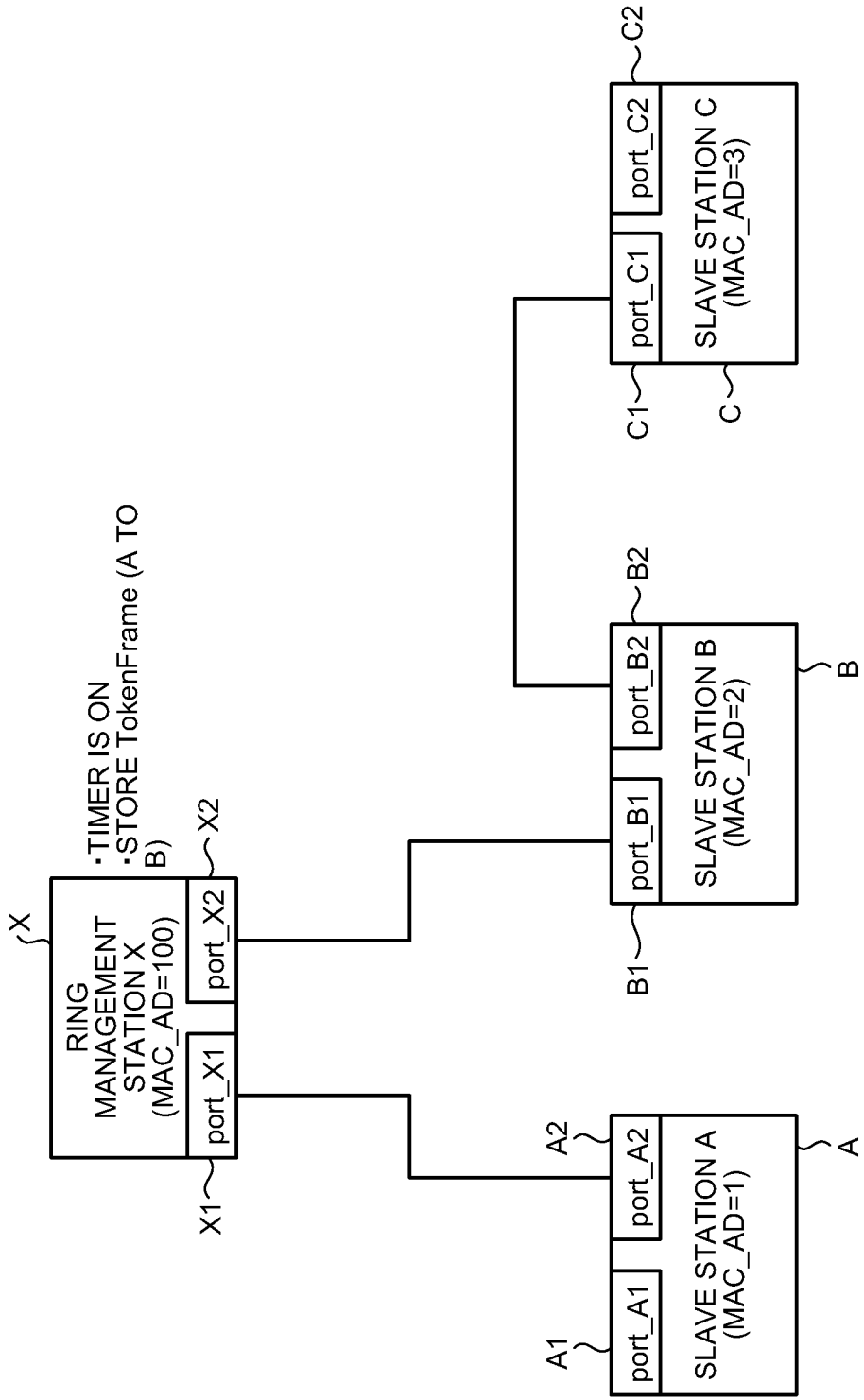
Figures 4, 17:
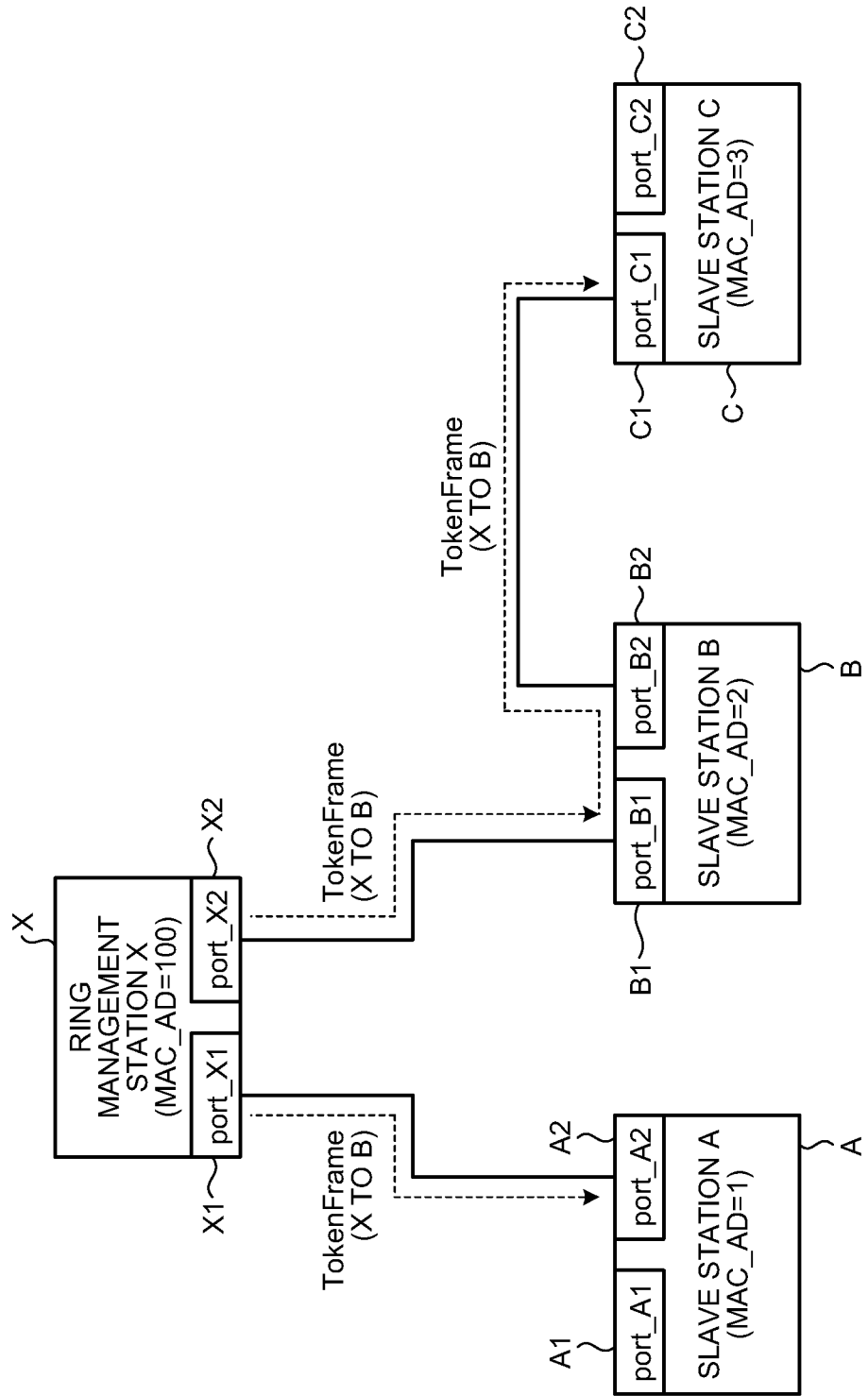
Figures 5, 17:
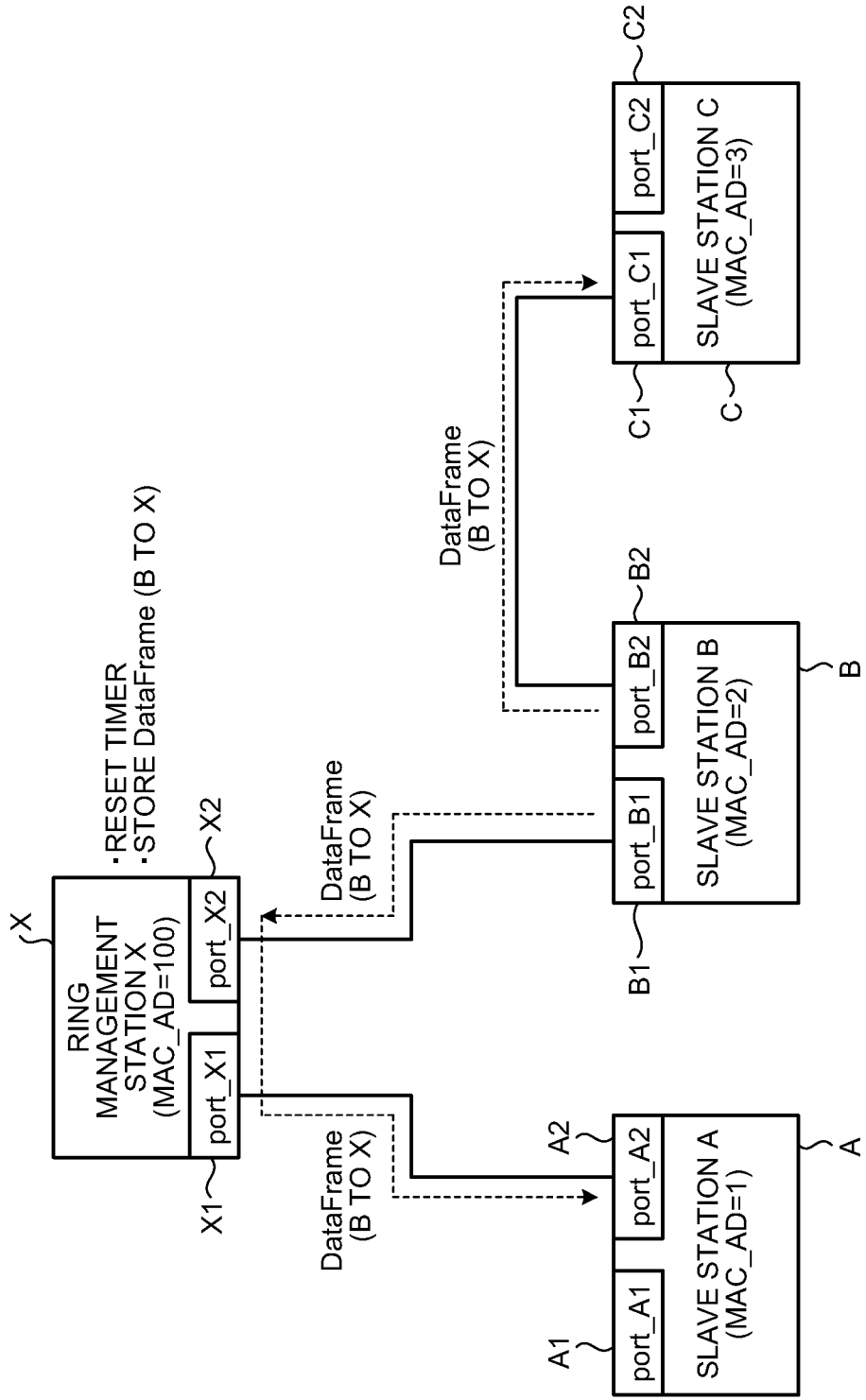

Another example of the reissue processing for a token frame at the time when a token frame disappears during communication performed using the token frame is explained. FIGS. 17-1 to 17-5 are schematic diagrams of another example of the procedure of the reissue processing for a token frame according to the fourth embodiment. In this example, as in the example explained above, it is assumed that the communication system has a same configuration as that shown in FIGS. 16-1 to 16-8 and token circulation order is the one indicated by (F) above.

First, as shown in FIG. 17-1, after the slave station A that acquires the transmission right normally transmits data, the slave station A transmits a token frame to pass the transmission right to the slave station B. However, as shown in FIG. 17-1, it is assumed that the token frame disappears on the transmission line 112 between the ring management station X and the slave station B. At this point, the network monitoring unit 29 of the ring management station X stores the token frame issued by the slave station A in the frame storing unit 30 and resets the timer 21.

Thereafter, as shown in FIG. 17-2, when a state in which a frame does not flow lasts a predetermined time or more, as shown in FIG. 17-3, the network monitoring unit 29 of the ring management station X detects that the timer 21 is time over and determines, using the frame stored in the frame storing unit 30 and the token circulation order information stored in the token-circulation-order-information storing unit 25, to which slave station data of the slave stations has been able to be normally transmitted. Specifically, the network monitoring unit 29 of the ring management station X acquires the SA of the frame stored in the frame storing unit 30 and acquires, from the token circulation order information, a MAC address of a communication node to which the transmission right is given after this SA. The network monitoring unit 29 generates the acquired MAC address as token frame reissue information and passes the MAC address to the token-frame processing unit 27.

In this example, because the token frame transmitted by the slave station A is stored in the frame storing unit 30, the network monitoring unit 29 determines that the data transmission normally ends up to the slave station A. As indicated by the token circulation order (F), the network monitoring unit 29 recognizes that the slave station B obtains the transmission right after the slave station A, generates token frame reissue information having the MAC address "2" of the slave station B, and passes the token frame reissue information to the token-frame processing unit 27.

Thereafter, the token-frame processing unit 27 of the ring management station X generates, based on the token frame reissue information, a token frame in which the MAC address "2" of the slave station B included in the token frame reissue information is set in the MAC address information for token-addressed-to-own-station determination. As shown in FIG. 17-4, the token-frame processing unit 27 transmits the token frame in broadcast. An SA of this token frame is the MAC address of the ring management station X.

Thereafter, as shown in FIG. 17-5, when the slave station B receives the token frame from the ring management station X, the slave station B obtains the transmission right and outputs data of the own station to the network. The slave station B transmits the token frame to give the transmission right to the next communication node.

In this way, when the token frame disappears after reaching the ring management station X, the ring management station X specifies a communication node that normally ends data transmission, i.e., a communication node corresponding to an SA of a token frame received last. A token frame is reissued to a communication node that obtains the transmission right after the communication node.

As explained above, the ring management station X monitors disappearance of a frame in the communication system and stores a frame acquired last. This makes it possible to give the transmission right to a communication node at a token circulation destination next to a communication node that normally transmits data last.

According to the fourth embodiment, when a frame disappears halfway, a token frame is not reissued from the ring management station X. Rather, a communication node in which data transmission is normally performed last before the frame disappearance and a token frame is reissued to a communication node to which the transmission right is given after the communication node. As a result, there is an effect that the ring management station X can receive data from the slave stations A to C before and after the frame disappearance.

Fifth Embodiment

In the fourth embodiment, the reissue processing for a token frame performed when a frame disappears is explained. For example, when a communication node in the communication system is left off from the communication system because of power-off or the like, it is possible to cope with the left-off using the method explained in the fourth embodiment. Specifically, the ring management station X reissues a token frame to the left-off communication node. After the issuance of the token frame, when there is no response even when a predetermined time elapses, a token frame only has to be issued to a communication node to which the transmission right is given after the left-off communication node.

However, in this method, until the left-off communication node is left on by power-on again, the same reissue processing for a token frame is repeated every time token frame circulation order comes to the position of the communication node.

In the Ethernet, communication nodes are often connected in a line shape. When left-ff occurs in a higher-order communication node close to the ring management station among the communication nodes connected in a line shape in this way, communication nodes lower in order than the communication node cannot perform communication either. In such a case, even if the reissue processing for a token is performed, a frame does not flow of the communication system as long as a higher-order communication node is left off. Therefore, useless processing is repeated until the reissue processing reaches a lowest-order communication node in the line. When a plurality of communication nodes are left off, the reissue processing for a token frame is performed a plurality of times while the token frame circulates once.

In this way, after the ring management station issues a token frame, when no response is received for the predetermined time, if the method explained in the fourth embodiment is used to cope with this problem, in some case, the request for real-time properties in the communication system is not satisfied. Therefore, in the fifth embodiment, processing performed when the communication nodes included in the communication system are left off by power-off is explained.

The configuration of the ring management station in the fifth embodiment is basically the same as that explained in the fourth embodiment. However, the network monitoring unit 29 further has a function of starting the timer 21 as well when a token frame is reissued, determining, when transmission of a frame is not performed for a predetermined time from a communication node to which the token frame is reissued, that the communication node is in a power-off state, and instructing execution of the network presence check processing by the network-presence-check processing unit 22.

Figure 18:
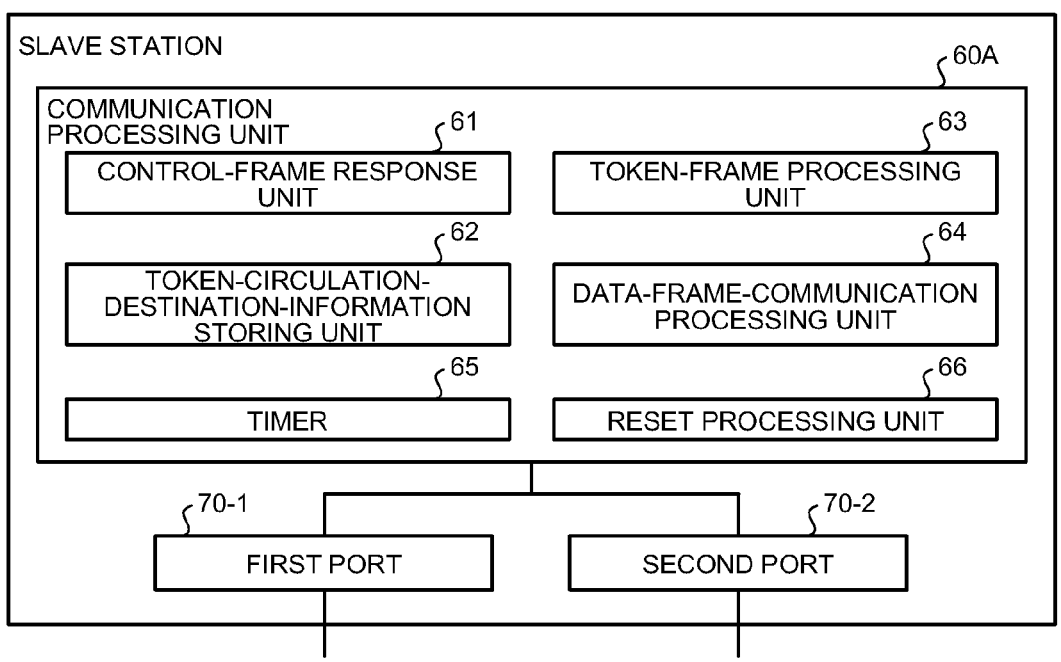
FIG. 18 is a schematic block diagram of an example of a functional configuration of a slave station according to a fifth embodiment.

FIG. 18 is a schematic block diagram of an example of a functional configuration of a slave station according to the fifth embodiment. The slave station further includes, in the configuration shown in FIG. 2-2 in the first embodiment, a timer 65 and a reset processing unit 66 in a communication processing unit 60A.

The timer 65 is started by the reset processing unit 66 and has a function of measuring a predetermined time. In the fifth embodiment, the timer 65 counts time until the predetermined time elapses after data from the ring management station X is received by the data-frame-communication processing unit 28. The data from the ring management station X can be, for example, transfer of the transmission right or update data transmitted from the ring management station X to the slave station. It is assumed that a period of the update data transmitted from the ring management station X to the slave station is measured.

The reset processing unit 66 starts the timer 65 when, for example, data to be updated from the ring management station X to the slave station is received, determines, when the update data from the ring management station X is not received for the predetermined time, that the ring management station X is in an absent state, and performs reset processing for erasing the token circulation destination information stored in the token-circulation-destination-information storing unit 62. Time of the timer 65 set by the reset processing unit 66 is set longer than an average time in which a token frame circulates in the communication system once and set to about the double of time of the timer 21 started by the network monitoring unit 29 of the ring management station X.

Figures 1, 19:
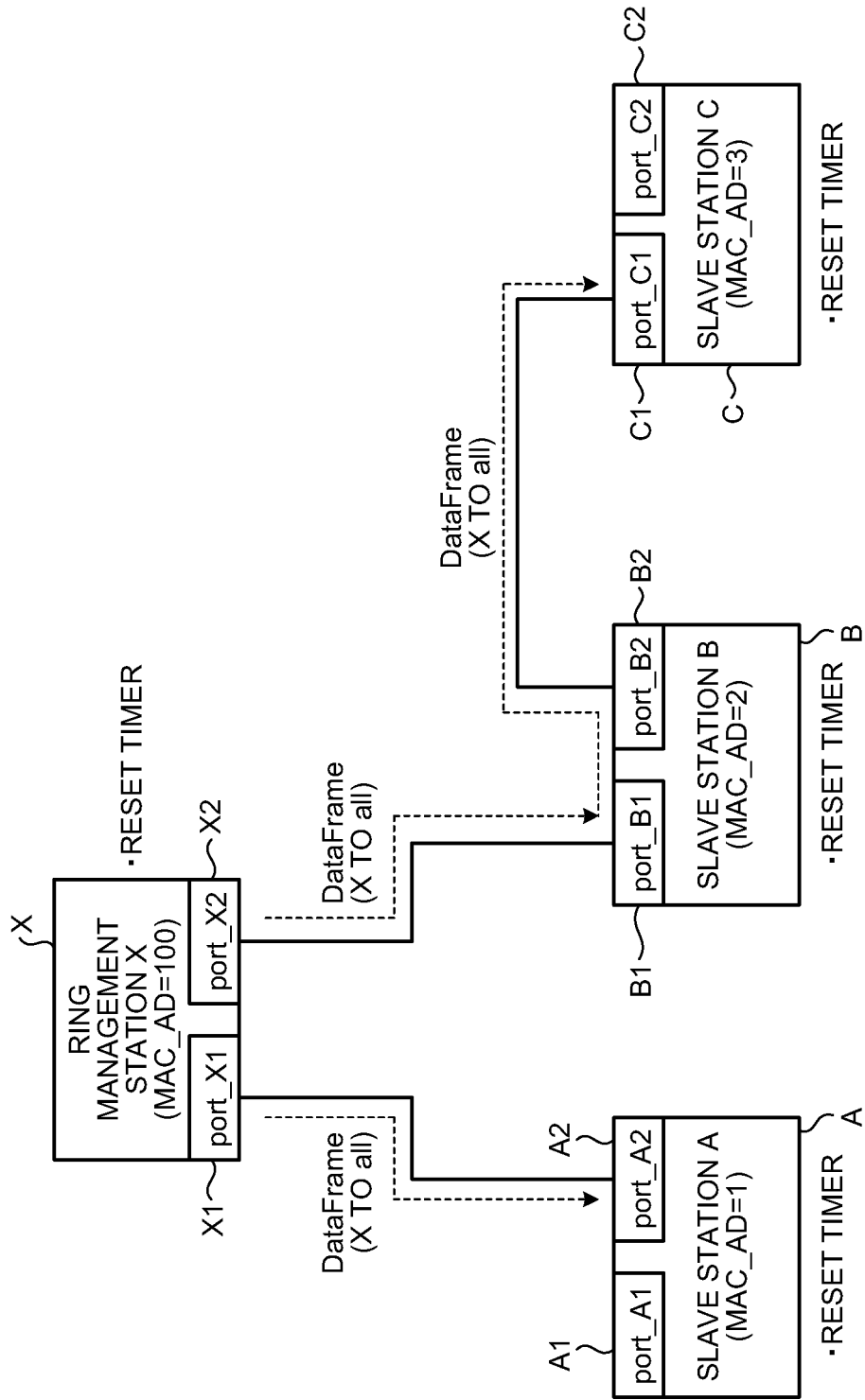
Figures 3, 19:
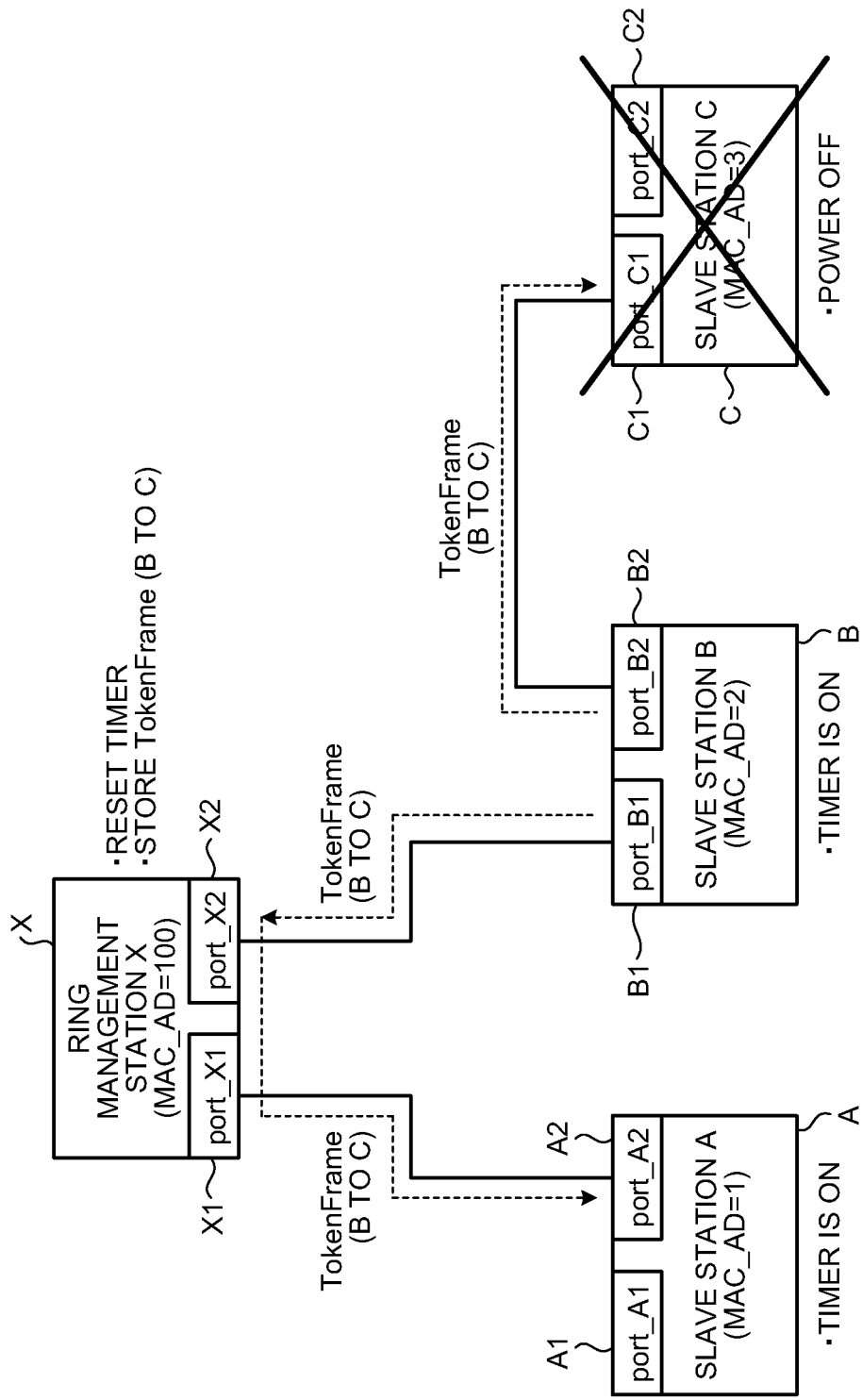
Figures 5, 19:
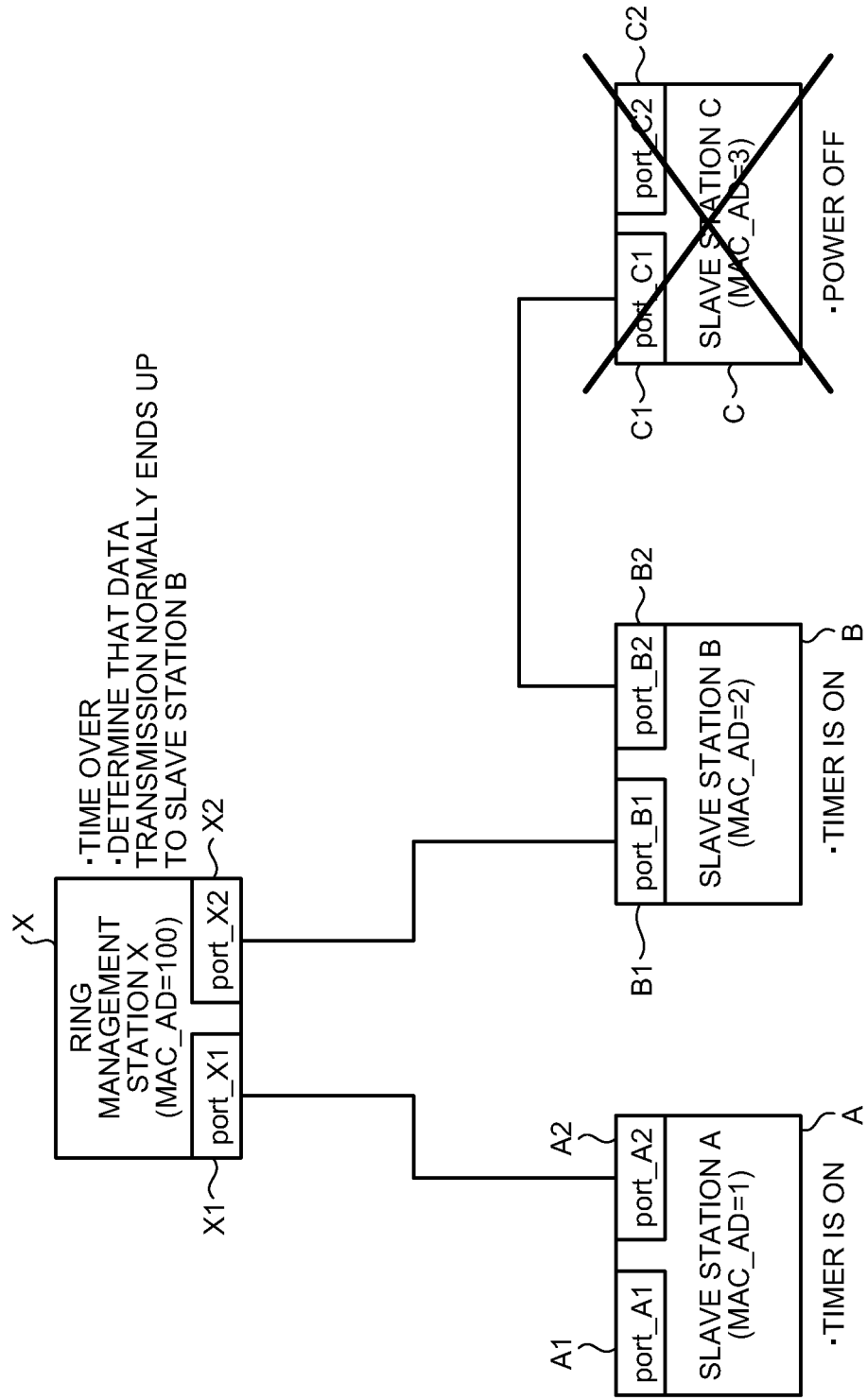
Figures 6, 19:
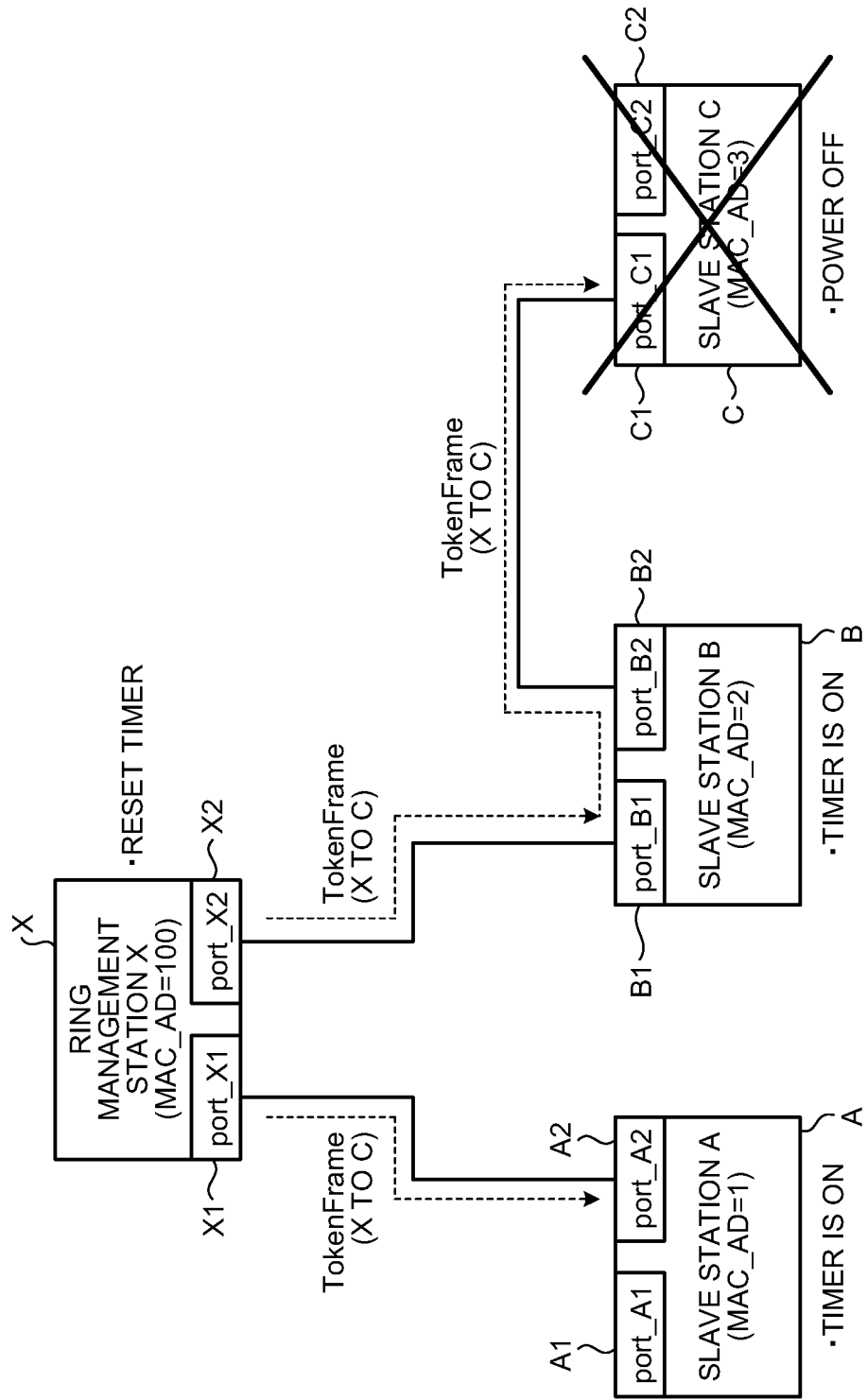
Figures 8, 19:
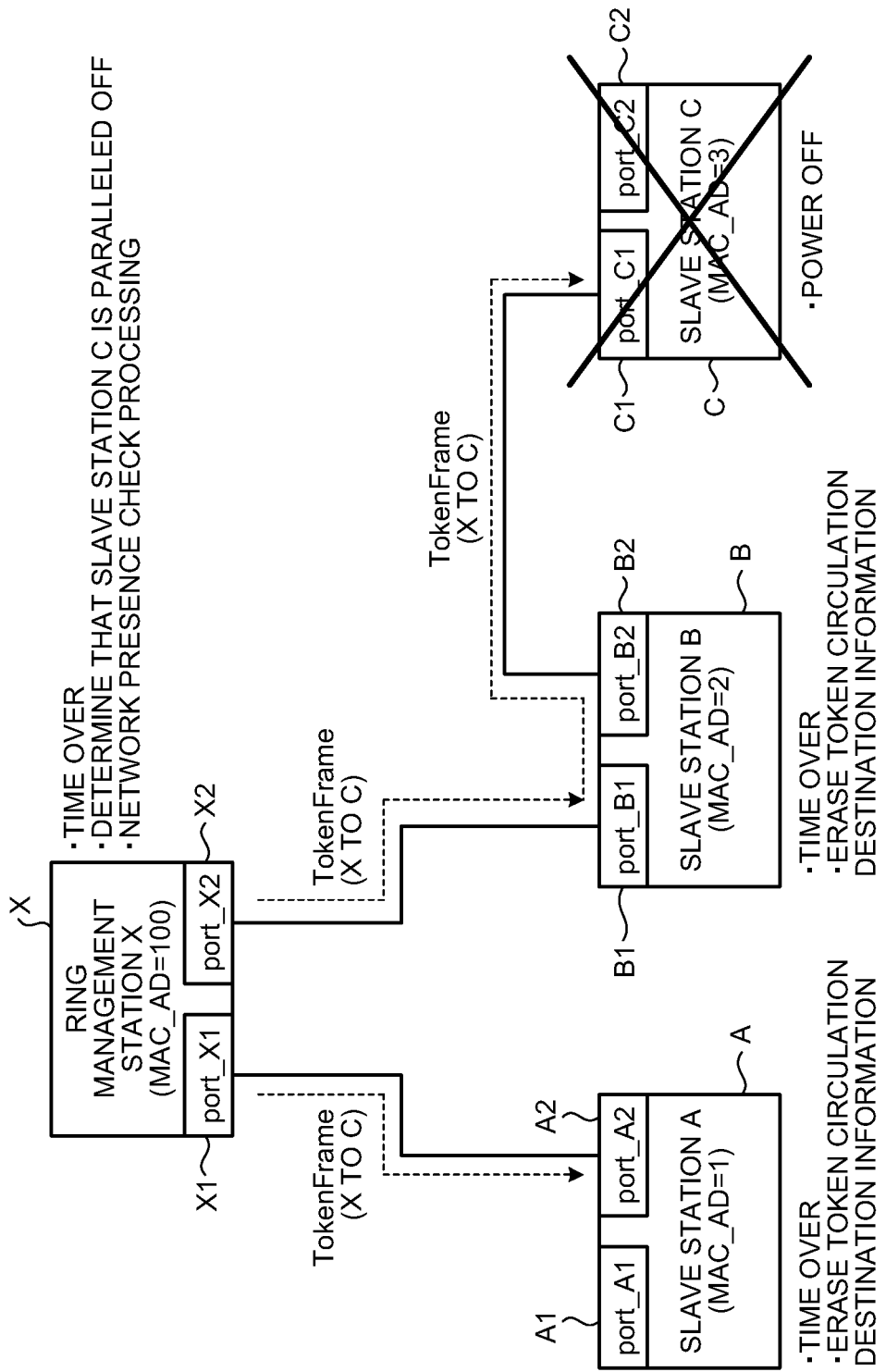
Figures 9, 19:
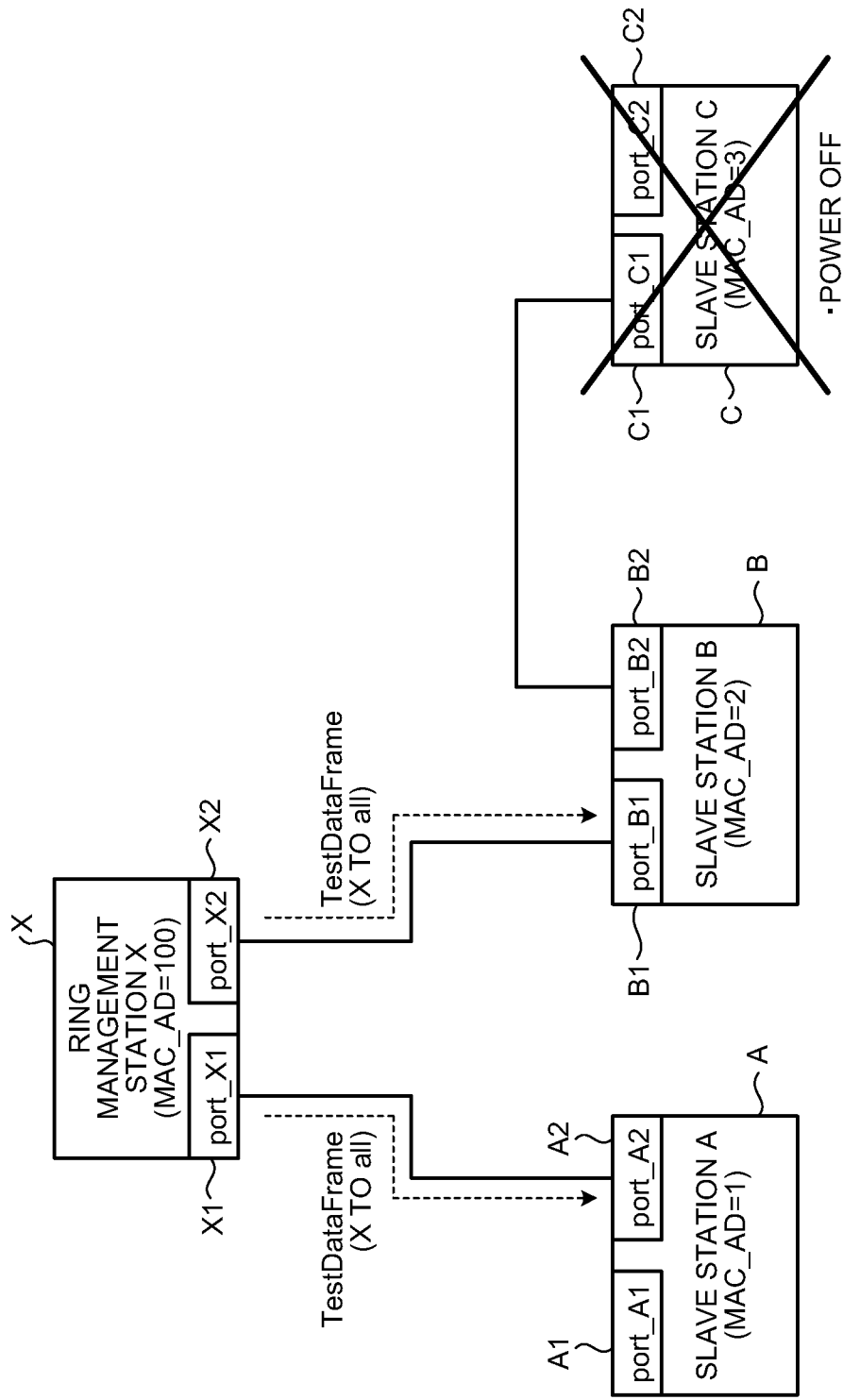
Figures 10, 19:
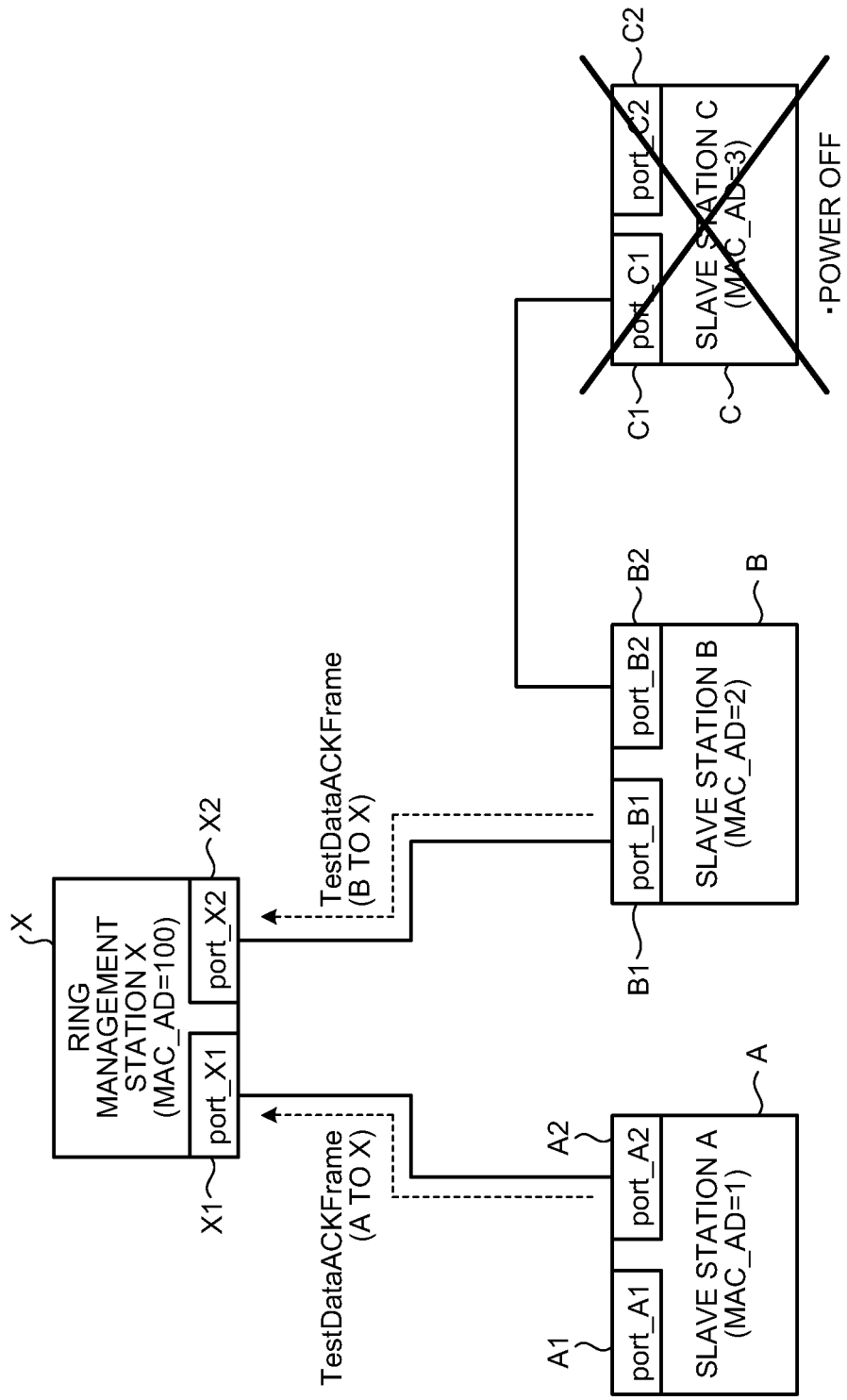

The reconfiguration processing for a logical ring is explained below. FIGS. 19-1 to 19-9 are schematic diagrams of an example of procedures of the determination processing for leaving-off the slave station and the reconfiguration processing for a logical ring according to the fifth embodiment. In this example, as in the example explained above, the communication system has a same configuration as that shown in FIGS. 16-1 to 16-8. Token circulation order is that indicated by (F) above.

First, as shown in FIG. 19-1, in a state in which communication is performed by circulating a token frame, the ring management station X receives the token frame, acquires a transmission right, and transmits data to the slave stations A to C. When the reset processing units 66 of the slave stations A to C receive the data from the ring management station X, the reset processing units 66 start the timers 65. Thereafter, as shown in FIG. 19-2, it is assumed that the power supply for the slave station C is turned off.

Subsequently, as shown in FIG. 19-3, the token frame circulates to the slave station B. After transmitting data of the own station, the slave station B transmits the token frame to pass the transmission right to the slave station C. At this point, the network monitoring unit 29 of the ring management station X stores this token frame in the frame storing unit 30 and resets the timer 21. Because the power supply for the slave station C is off, the slave station C cannot receive the token frame. As a result, as shown in FIG. 19-4, a state in which a frame does not flow in the communication system lasts.

Thereafter, as shown in FIG. 19-5, when the state in which a frame does not flow lasts for the predetermined time or more, the network monitoring unit 29 of the ring management station X detects that the timer 21 is in a state of time over and determines, based on information of the frame stored in the frame storing unit 30, to which slave station data has been able to be normally transmitted. Because the token frame transmitted by the slave station B is stored, the network monitoring unit 29 determines that data of the slave stations has been able to be normally transmitted up to data of the slave station B and recognizes, using the token circulation order information of the token-circulation-order-information storing unit 25, that a circulation destination of the token frame after the slave station B is the slave station C. As shown in FIG. 19-6, the ring management station X generates a token frame for passing the transmission right to the slave station C and transmits the token frame. At this point, the network monitoring unit 29 of the ring management station X starts the timer 21 again.

As explained above, as shown in FIG. 19-7, because the power supply for the slave station C is in the off state, the slave station C cannot receive the token frame. The state in which a frame does not flow in the communication system lasts after the ring management station X transmits the token frame for giving the transmission right to the slave station C.

Thereafter, as shown in FIG. 19-8, when the state in which a flow does not flow lasts for the predetermined time or more, the network monitoring unit 29 of the ring management station X detects that the timer 21 is in a state of time over. The network monitoring unit 29 detects that a frame is not transmitted from the slave station C at an issue destination of the token frame, determines that the slave station C is left off from the communication system, and instructs the network-presence-check processing unit 22 to execute the network presence check processing.

On the other hand, as shown in FIG. 19-8, when a state in which update data from the ring management station X is not received lasts for the predetermined time, the reset processing units 66 of the other slave stations A and B detect that the timers 65 are in a state of time over and perform reset processing for erasing the token circulation destination information stored in the token-circulation-destination-information storing unit 62.

Thereafter, as shown in FIG. 19-9, the network-presence-check processing unit 22 of the ring management station X transmits a network presence check frame. As shown in FIG. 19-10, because the token circulation destination information of the token-circulation-destination-information storing unit 62 is erased, the control-frame response units 61 of the slave stations A and B perform response processing to the network presence check frame transmitted from the ring management station X. As explained in the first embodiment, the control-frame response units 61 perform the processing for configuring a logical ring (the reconfiguration processing for a logical ring).

In the above explanation, the timers 65 are provided in the slave stations A to C. When the update data is not received from the ring management station X for the predetermined time or more, the reset processing units 66 erase the token circulation destination information of the token-circulation-destination-information storing unit 62. However, the token circulation destination information of the slave stations A to C can be erased by other methods. For example, it is also possible that, when the network monitoring unit 29 of the ring management station X determines that leaving-off of a slave station occurs, the network monitoring unit 29 generates a reset frame for forcibly causing all the slave stations to forget the token circulation destination information and the data-frame-communication processing unit 28 transmits the reset frame to the communication nodes in the communication system in broadcast.

According to the fifth embodiment, when a frame stops flowing in the communication system during transmission and reception processing for data performed using a token frame, the ring management station X transits the token frame to the communication node next to a communication node to which the data is normally transmitted. Thereafter, when a frame does not flow in the communication system even when the predetermined time elapses, the ring management station X determines that a communication node at a reissue destination of the token frame is left off because of a reason such as power-off and reconfigures a logical ring. As a result, for example, there is an effect that communication can be resumed earlier compared with the time when a token frame is reissued to the communication node next to the communication node determined as being left off.

In particular, in the Ethernet, in general, communication nodes are connected in a star shape. However, as an industrial network, saving of wires is requested and communication nodes are often connected in a line shape. When a communication node close to a ring management station side of the communication nodes connected in a line shape in this way is left off, all the communication nodes lower in order than the communication node cannot perform communication. In such a case, as explained above, when there is no response even if a token frame is reissued to the left-off communication node using the method in the fourth embodiment, there is no response even if a token frame is reissued to a communication node having the transmission right after the left-off communication node. when power supplies for a plurality of communication nodes are turned off, processing for reissuing a token frame to a communication node next to a communication node, a power supply for which is turned off, is repeatedly performed a plurality of times and real-time properties of communication are spoiled. In such a case, as explained in the fifth embodiment, the reconfiguration processing for a logical ring is performed. This makes it possible to minimize a delay and perform communication having real-time properties in a new network configuration.

The embodiments explained above can be applied to a communication system such as an FA system in which real-time properties of communication are requested.

A data communication method in the ring management station and the slave station explained above can be realized by executing, with a computer such as a programmable controller or a personal computer including a CPU (central processing unit), programs in which respective processing procedures are written. In this case, the CPU (control means) of the computer executes the processing steps of the data communication method explained above according to the programs. These programs are recorded in a computer-readable recording medium such as a hard disk, a floppy disk, a CD (Compact Disk)-ROM (Read Only Memory), an MO (Magneto-Optical disk), or a DVD (Digital Versatile Disk or Digital Video Disk) and executed by being read out from the recording medium by the computer. These programs can also be distributed via a network (a communication line) such as the Internet.

Further, the ring management station can be a communication management circuit obtained by realizing the processing units described in the embodiments with a circuit that executes processing according to the processing procedures. Similarly, the slave station can also be a communication circuit obtained by realizing the processing units described in the embodiments with a circuit that executes processing according to the processing procedures.

Furthermore, the ring management station can be an LSI (Large-Scale Integration) obtained by manufacturing the processing units described in the embodiments to execute processing according to the processing procedures. Similarly, the slave station can also be an LSI obtained by manufacturing the processing units described in the embodiments to execute processing according to the processing procedures.

INDUSTRIAL APPLICABILITY

As explained above, the data communication system according to the present invention is useful for a network system connected by the Ethernet in which real-time properties of data communication are requested.

The invention claimed is:

1. A communication management apparatus that manages transmission of data in a network in which a plurality of communication nodes are connected in a star shape or a line shape by an Ethernet, the communication management apparatus comprising:
a network-presence-check processing unit that performs a network presence check processing of acquiring, from the plurality of communication nodes, information concerning connection between the communication nodes, wherein the network-presence-check processing unit is configured to:
create a network presence check frame and transmit the network present check frame in a broadcast, and
generate network presence information from information included in a network presence acknowledge frame;
a token-circulation-order determining unit that determines token circulation order indicating an order of circulating a token frame for acquiring a transmission right of data between the communication nodes using information acquired by the network presence check processing, wherein the token-circulation-order determining unit is configured to establish a logical ring such that the number of communication nodes that a token as a transmission right passes while circulating once is minimized;
a setup processing unit that notifies, based on the token circulation order, each of the communication nodes in the network of token circulation destination information indicating a communication node that acquires the transmission right next,
wherein the setup processing unit is configured to:
generate a setup frame including information concerning a communication node to which the transmission right is given after the communication using token circulation order information; and
transmit the setup frame to the communication nodes;
a data-frame-communication processing unit that receives a data frame from other communication nodes and, when the transmission right is acquired, transmits the data frame,
wherein the data-frame-communication processing unit is configured to calculate, at a predetermined period, data set in the communication nodes; and
a token-frame processing unit that determines whether the transmission right is obtained by analyzing the received token frame and, when the transmission right is obtained, after transmission of a data frame by the data-frame-communication processing unit, transmits another token frame in which, based on the token circulation order, information on a communication node that acquires the transmission right next is set,
wherein the setup processing unit is configured to determine whether setup response frames, which are responses to the setup frame, are received from all the communication nodes, and when the setup response frames are received from all the communication nodes, the setup processing unit is configured to notify the token-frame processing unit to that effect, and
wherein the setup frame comprises address information of a next communication node that acquires the token frame next with respect to a respective communication node without including the token circulation order, and
wherein individual setup frames are transmitted from the setup processing unit to the plurality of communication nodes that form the logical ring.

2. The communication management apparatus according to claim 1, wherein the setup processing unit notifies each of the communication nodes in the network of the token circulation destination information and, after confirming that a response is received from all the communication nodes that are notified of the token circulation destination information, instructs the token-frame processing unit to generate the token frame.

3. The communication management apparatus according to claim 1, wherein, when the communication management apparatus receives the transmission right a predetermined number of times, the network-presence-check processing unit further has a function of performing the network presence check processing.

4. The communication management apparatus of claim 1, wherein the token-circulation-order determining unit is further configured to generate a routing table based on the determined token circulation order, wherein the generated routing table forms a path leading from the communication management apparatus to a lowest-order communication node of the stations the plurality of communication nodes and iteratively back to the communication management apparatus by covering the communication nodes on each level prior to moving to a higher level leading from the lowest-order communication node back to the communication management apparatus.

5. The communication management apparatus of claim 4, wherein the routing table comprises port numbers of the communication nodes.

6. The communication management apparatus of claim 1, wherein the set up processing unit determines the communication node that acquires the transmission right next with respect to said each of the communication nodes based on the determined token circulation order which is a path leading from the communication management apparatus to a lowest order communication node of the plurality of communication nodes and iteratively back to the communication management apparatus by covering the communication nodes on each level prior to moving to a higher level leading from the lowest-order communication node back to the communication management apparatus.

7. A communication node arranged in a network in which a plurality of communication nodes are connected in a star shape or a line shape by an Ethernet cable, the communication node performing transmission of data when the communication node acquires a token frame fed according to token circulation order determined by a communication management apparatus, which is one of the communication nodes, the communication node comprising:

a token-circulation-destination-information storing unit that stores information concerning a token circulation destination that is a communication node to which a transmission right is given next;

a data-frame-communication processing unit configured to transmit a data frame when the transmission right is acquired and receive another data frame from other communication nodes, wherein the data-frame-communication processing unit is configured to perform transmission and reception processing for the data frame between the communication management apparatus and the other communication nodes;

a token-frame processing unit that compares transmission right acquiring apparatus information indicating a communication node that acquires the transmission right next, which is included in the token frame received from the other communication nodes, and an address of the communication node, determines whether the transmission right is obtained, and, when the transmission right is obtained and transmission processing for a frame by the data-frame-communication processing unit ends, transmits a token frame in which the token circulation destination information stored in the token-circulation-destination-information storing unit is set as the transmission right acquiring apparatus information, wherein a setup frame comprises address information of a next communication node that acquires the token frame next with respect to a respective communication node without including a token circulation order, and wherein individual setup frames are transmitted from the communication management apparatus to the plurality of communication nodes that form a logical ring.

8. A data communication method for a plurality of communication nodes in a communication system, the communication system including a communication management apparatus that is one of the communication nodes and manages transmission of data in a network in which the communication nodes are connected in a star shape or a line shape by an Ethernet cable and slave stations that are other communication nodes in the network, the data communication method comprising:

transmitting, by the communication management apparatus, a token frame in the network in broadcast, the token frame storing transmission right acquiring apparatus information that is a communication node that acquires a transmission right next according to token circulation order determined by the communication management apparatus by expanding, in a tree shape, a connection relation among the slave stations connected to the communication management apparatus and selecting in order the communication nodes connected in the tree shape; and receiving, by the slave station, the token frame, determining whether the transmission right acquiring apparatus of the transmission right acquiring apparatus information included in the token frame is the transmission right acquiring apparatus, when the transmission right acquiring apparatus of the transmission right acquiring apparatus information is the slave station, determining that the slave station acquires the transmission right and transmitting a data frame, and, when the transmission right acquiring apparatus of the transmission right acquiring apparatus information is not the transmission right acquiring apparatus, repeating the token frame, wherein the transmitting the token frame and the receiving the token frame are repeated to circulate, in order of the token circulation order, the token frame to all the communication nodes connected to the network, and wherein a setup frame comprises address information of a next communication node that acquires the token frame next with respect to a respective communication node without including the token circulation order, and wherein individual setup frames are transmitted from the communication management apparatus to the plurality of communication nodes that form a logical ring.

9. The data communication method according to claim 8, wherein, in the transmitting the token frame, in the case of the communication management apparatus, the transmission right acquiring apparatus information is acquired from the token circulation order and, in the case of each of the slave stations, the transmission right acquiring apparatus information is acquired from information concerning a token circulation destination that is a communication node to which the transmission right is given after the slave station notified in advance by the communication management apparatus.

10. The data communication method according to claim 8, further comprising, before the transmitting the token frame:

the communication management apparatus transmitting, when a power supply is turned on, a network presence check frame including an address of the own apparatus in broadcast to the slave station present in the network;

the slave station generating, when the network presence check frame is received, a network presence acknowledge frame including a transmission source address of the network presence check frame and addressed to an address of the communication management apparatus included in the network presence check frame, transmitting the network presence acknowledge frame, rewriting the transmission source address of the received network presence check frame to an address of the slave station, and transferring the network presence check frame;

the communication management apparatus generating, when the network presence acknowledge frame is received, network presence information including a transmission source address and the transmission source address of the network presence check frame received by the slave station from the network presence acknowledge frame;

the communication management apparatus determining, when a predetermined time elapses after the network presence check frame is transmitted, the token circulation order by using the transmission source address of the network presence check frame in the network presence information and the transmission source address of the network presence acknowledge frame;

the communication management apparatus transmitting in broadcast, after the determination of the token circulation order, a setup frame for notifying each of the slave stations in the network of information concerning a token circulation destination that is a communication node to which the transmission right is given after the slave station;

the slave station storing the token circulation destination information when the setup frame is received and transmitting a setup response frame to the communication management apparatus; and the communication management apparatus generating the token frame according to the token circulation order when the setup response frame is received from all the communication apparatuses in the network.

11. The data communication method according to claim 10, further comprising:

the communication management apparatus storing information including a transmission source address of a frame input to a port of the communication management apparatus; and the communication management apparatus acquiring, when a frame is not input to the port of the apparatus for a predetermined time or more, from the network circulation order, a communication node that obtains the transmission right after the stored transmission source address of the frame and reissuing the token frame to the acquired communication node.

12. The data communication method according to claim 11, wherein, in the reissuing a token frame, when a communication node that obtains the transmission right next is the communication management apparatus, the communication management apparatus transmits, without reissuing the token frame, a data frame assuming that the transmission right is acquired.

13. The data communication method according to claim 11, wherein, after the reissuing a new token frame, when a frame is not received for a predetermined time or more from the communication node to which the new token frame is reissued, the communication management apparatus shifts the processing to the transmitting the network presence check frame.

* * * * *